US008430735B2

(12) United States Patent
Oberberger

(10) Patent No.: US 8,430,735 B2
(45) **Date of Patent: *Apr. 30, 2013**

(54) GAMING SYSTEM AND METHOD PROVIDING AN INTERACTIVE GAME WITH AUTOMATIC WAGERS

(75) Inventor: Michael Oberberger, Reno, NV (US)

(73) Assignee: IGT, Reno, NV (US)

( * ) Notice: Subject to any disclaimer, the term of this patent is extended or adjusted under 35 U.S.C. 154(b) by 191 days.

This patent is subject to a terminal disclaimer.

(21) Appl. No.: 13/093,382

(22) Filed: Apr. 25, 2011

(65) Prior Publication Data

US 2011/0201413 A1 Aug. 18, 2011

Related U.S. Application Data

(63) Continuation of application No. 11/767,970, filed on Jun. 25, 2007, now Pat. No. 7,950,993, which is a continuation-in-part of application No. 11/557,872, filed on Nov. 8, 2006, now Pat. No. 7,931,531.

(51) Int. Cl.
*A63F 13/00* (2006.01)

(52) U.S. Cl.
USPC ........................ 463/16; 463/6; 463/7; 463/25

(58) Field of Classification Search .................. 463/6, 7, 463/16, 25, 59, 60
See application file for complete search history.

(56) References Cited

U.S. PATENT DOCUMENTS

| | | | |
|---|---|---|---|
| 3,853,324 | A | 12/1974 | Reiner et al. |
| 3,877,700 | A | 4/1975 | Moe |
| 3,923,305 | A | 12/1975 | Reiner et al. |
| 4,012,046 | A | 3/1977 | Liket |
| 4,129,304 | A | 12/1978 | Mager |
| 4,363,485 | A | 12/1982 | Edwall |
| 4,550,916 | A | 11/1985 | Oritz |
| 4,582,324 | A | 4/1986 | Koza et al. |
| 4,586,707 | A | 5/1986 | McNeight et al. |

(Continued)

FOREIGN PATENT DOCUMENTS

| | | |
|---|---|---|
| EP | 0 375 190 | 6/1990 |
| EP | 1 624 421 | 2/2007 |

(Continued)

OTHER PUBLICATIONS

Christiansen, Eugene Martin, "Gaming and Entertainment—An Imperfect Union?", Cornell Hotel & Restaurant Administration Quarterly, Apr. 1995, Section: vol. 36, No. 2, p. 79, ISSN: 0010-8804. (19 pages).

(Continued)

*Primary Examiner* — Arthur O. Hall
*Assistant Examiner* — Allen Chan
(74) *Attorney, Agent, or Firm* — Neal, Gerber & Eisenberg LLP

(57) ABSTRACT

A gaming system including a plurality of gaming machines or devices. The gaming machines include an interactive game and a wager triggering event. Upon the occurrence of the wager triggering event during play of the interactive game, the gaming machine causes the placement of a wager component and randomly determines a wagering outcome. Upon completion of the interactive game, the gaming machine provides the player with an interactive game outcome and provides the player with any awards based on any determined wagering outcomes. The players are ranked in the interactive game. Upon a triggering event, the gaming system provides one or more ranked players of the interactive game an award from funds derived from a marketing or advertising account.

28 Claims, 39 Drawing Sheets

U.S. PATENT DOCUMENTS 4,593,904 A 6/1986 Graves
4,615,527 A 10/1986 Moss
4,618,150 A 10/1986 Kimura
4,621,814 A 11/1986 Stepan et al.
4,652,998 A 3/1987 Koza et al.
4,666,160 A 5/1987 Hamilton
4,695,053 A 9/1987 Vazquez, Jr. et al.
4,756,532 A 7/1988 Kamille
4,773,647 A 9/1988 Okada et al.
4,781,377 A 11/1988 McVean et al.
4,805,907 A 2/1989 Hagiwara
4,926,327 A 5/1990 Sidley
4,936,588 A 6/1990 Rader et al.
4,948,133 A 8/1990 Helm et al.
4,964,642 A 10/1990 Kamille
5,001,632 A 3/1991 Hall-Tipping
5,042,809 A 8/1991 Richardson
5,083,271 A 1/1992 Thacher et al.
5,083,800 A 1/1992 Lockton
5,114,155 A 5/1992 Tillery et al.
5,116,055 A 5/1992 Tracy
5,205,555 A 4/1993 Humano
5,259,613 A 11/1993 Marnell, II
5,280,909 A 1/1994 Tracy
5,299,810 A 4/1994 Pierce et al.
5,308,065 A 5/1994 Bridgeman et al.
5,340,317 A 8/1994 Freeman
5,342,047 A 8/1994 Heidel et al.
5,342,049 A 8/1994 Wichinsky et al.
5,342,058 A 8/1994 Giovannetti
5,409,225 A 4/1995 Kelly et al.
5,411,268 A 5/1995 Nelson et al.
5,411,271 A 5/1995 Mirando
5,429,361 A 7/1995 Raven et al.
5,531,440 A 7/1996 Babrowski et al.
5,536,016 A 7/1996 Thompson
5,542,669 A 8/1996 Charron et al.
5,544,892 A 8/1996 Breeding
5,550,561 A 8/1996 Ziarno
5,560,603 A 10/1996 Seelig et al.
5,590,197 A 12/1996 Chen et al.
5,594,661 A 1/1997 Bruner et al.
5,611,535 A 3/1997 Tiberio
5,618,045 A 4/1997 Kagan et al.
5,628,684 A 5/1997 Bouedec
5,643,087 A 7/1997 Marcus et al.
5,643,088 A 7/1997 Vaughn et al.
5,645,281 A 7/1997 Hesse et al.
5,645,486 A 7/1997 Nagao et al.
5,647,798 A 7/1997 Falciglia
5,667,217 A 9/1997 Kelly et al.
5,676,371 A 10/1997 Kelly et al.
5,697,611 A 12/1997 Kelly et al.
5,700,007 A 12/1997 Kelly et al.
5,700,008 A 12/1997 Lawlor et al.
5,704,612 A 1/1998 Kelly et al.
5,707,285 A 1/1998 Place et al.
5,722,891 A 3/1998 Inoue
5,733,193 A 3/1998 Allard et al.
5,743,523 A 4/1998 Kelly et al.
5,743,532 A 4/1998 Lafferty
5,752,882 A 5/1998 Acres et al.
5,755,621 A 5/1998 Marks et al.
5,761,647 A 6/1998 Boushy
5,766,074 A 6/1998 Cannon et al.
5,769,424 A 6/1998 Kelly et al.
5,769,716 A 6/1998 Saffari et al.
5,772,509 A 6/1998 Weiss
5,779,544 A 7/1998 Seelig et al.
5,788,573 A 8/1998 Baerlocher et al.
5,803,451 A 9/1998 Kelly et al.
5,810,354 A 9/1998 Banyai
5,816,918 A 10/1998 Kelly et al.
5,823,872 A 10/1998 Prather et al.
5,823,874 A 10/1998 Adams
5,833,536 A 11/1998 Davids et al.
5,836,586 A 11/1998 Marks et al.
5,848,932 A 12/1998 Adams
5,850,447 A 12/1998 Peyret
5,851,148 A 12/1998 Brune et al.
5,860,648 A 1/1999 Petermeier et al.
5,871,398 A 2/1999 Schneier et al.
5,873,781 A 2/1999 Keane
5,882,258 A 3/1999 Kelly et al.
5,882,261 A 3/1999 Adams
5,888,115 A 3/1999 Shoemaker, Jr. et al.
5,910,046 A 6/1999 Wada et al.
5,935,002 A 8/1999 Falciglia
5,941,770 A 8/1999 Miers et al.
5,951,397 A 9/1999 Dickinson
5,967,514 A 10/1999 Kelly et al.
5,993,315 A 11/1999 Strider et al.
5,997,400 A 12/1999 Seelig et al.
6,007,426 A 12/1999 Kelly et al.
6,012,722 A 1/2000 Petermeier et al.
6,015,344 A 1/2000 Kelly et al.
6,015,346 A 1/2000 Bennett
6,019,369 A 2/2000 Nakagawa et al.
6,019,374 A 2/2000 Breeding
6,033,307 A 3/2000 Vancura
6,047,963 A 4/2000 Pierce et al.
6,048,271 A 4/2000 Barcelou
6,050,895 A 4/2000 Luciano, Jr. et al.
6,062,981 A 5/2000 Luciano, Jr. et al.
6,077,163 A 6/2000 Walker et al.
6,089,976 A 7/2000 Schneider et al.
6,089,977 A 7/2000 Bennett
6,102,400 A 8/2000 Scott et al.
6,102,402 A 8/2000 Scott et al.
6,102,798 A 8/2000 Bennett
6,110,039 A 8/2000 Oh
6,110,043 A 8/2000 Olsen
6,113,495 A 9/2000 Walker et al.
6,117,007 A 9/2000 Matsuyama et al.
6,117,008 A 9/2000 Machiguchi
6,120,031 A 9/2000 Adams
6,126,541 A 10/2000 Fuchs
6,126,542 A 10/2000 Fier
6,126,547 A 10/2000 Ishimoto
6,135,453 A 10/2000 Srichayaporn
6,135,884 A 10/2000 Hedrick et al.
6,135,885 A 10/2000 Lermsiaux
6,139,013 A 10/2000 Pierce et al.
6,142,873 A 11/2000 Weiss et al.
6,146,273 A 11/2000 Olsen
6,149,156 A 11/2000 Feola
6,155,925 A 12/2000 Giobbi et al.
6,159,095 A 12/2000 Frohm et al.
6,159,097 A 12/2000 Gura
6,165,070 A 12/2000 Nolte et al.
6,174,235 B1 1/2001 Walker et al.
6,174,237 B1 1/2001 Stephenson
6,190,255 B1 2/2001 Thomas et al.
6,193,606 B1 2/2001 Walker et al.
6,210,279 B1 4/2001 Dickinson
6,220,593 B1 4/2001 Pierce et al.
6,220,961 B1 4/2001 Keane et al.
6,224,482 B1 5/2001 Bennett
6,224,483 B1 5/2001 Mayeroff
6,224,484 B1 5/2001 Okuda et al.
6,227,971 B1 5/2001 Weiss
6,231,442 B1 5/2001 Mayeroff
6,234,896 B1 5/2001 Walker et al.
6,234,897 B1 5/2001 Frohm et al.
6,238,288 B1 5/2001 Walker et al.
6,251,013 B1 6/2001 Bennett
6,261,177 B1 7/2001 Bennett
6,267,669 B1 7/2001 Luciano, Jr. et al.
6,270,411 B1 8/2001 Gura et al.
6,279,910 B1 8/2001 De Keller
6,287,194 B1 9/2001 Okada et al.
6,290,603 B1 9/2001 Luciano, Jr.
6,293,866 B1 9/2001 Walker et al.
6,302,790 B1 10/2001 Brossard
6,309,299 B1 10/2001 Weiss
6,309,300 B1 10/2001 Glavich
6,312,334 B1 11/2001 Yoseloff

| | | | |
|---|---|---|---|
| 6,315,660 | B1 | 11/2001 | Demar et al. |
| 6,319,127 | B1 | 11/2001 | Walker et al. |
| 6,322,309 | B1 | 11/2001 | Thomas et al. |
| 6,328,649 | B1 | 12/2001 | Randall et al. |
| 6,346,043 | B1 | 2/2002 | Colin et al. |
| 6,347,996 | B1 | 2/2002 | Gilmore et al. |
| 6,364,765 | B1 | 4/2002 | Walker et al. |
| 6,364,766 | B1 | 4/2002 | Anderson et al. |
| 6,364,768 | B1 | 4/2002 | Acres et al. |
| 6,375,187 | B1 | 4/2002 | Baerlocher |
| 6,375,568 | B1 | 4/2002 | Roffman et al. |
| 6,375,570 | B1 | 4/2002 | Poole |
| 6,379,245 | B2 | 4/2002 | De Keller |
| 6,386,974 | B1 | 5/2002 | Adams |
| 6,406,369 | B1 | 6/2002 | Baerlocher et al. |
| 6,413,160 | B1 | 7/2002 | Vancura |
| 6,413,161 | B1 | 7/2002 | Baerlocher et al. |
| 6,435,511 | B1 | 8/2002 | Vancura et al. |
| 6,443,837 | B1 | 9/2002 | Jaffe et al. |
| 6,454,651 | B1 | 9/2002 | Yoseloff |
| 6,467,771 | B1 | 10/2002 | deKeller |
| 6,488,580 | B1 | 12/2002 | Robb |
| 6,500,068 | B2 | 12/2002 | Walker et al. |
| 6,506,118 | B1 | 1/2003 | Baerlocher et al. |
| 6,522,312 | B2 | 2/2003 | Ohshima et al. |
| 6,537,150 | B1 | 3/2003 | Luciano et al. |
| 6,554,704 | B2 | 4/2003 | Nicastro et al. |
| 6,572,473 | B1 | 6/2003 | Baerlocher |
| 6,582,306 | B1 | 6/2003 | Kaminkow |
| 6,599,193 | B2 | 7/2003 | Baerlocher et al. |
| 6,602,137 | B2 | 8/2003 | Kaminkow et al. |
| 6,605,002 | B2 | 8/2003 | Baerlocher |
| 6,607,438 | B2 | 8/2003 | Baerlocher et al. |
| 6,632,140 | B2 | 10/2003 | Berman et al. |
| 6,632,141 | B2 | 10/2003 | Webb et al. |
| 6,645,075 | B1 | 11/2003 | Gatto et al. |
| 6,648,754 | B2 | 11/2003 | Baerlocher et al. |
| 6,656,040 | B1 | 12/2003 | Brosnan et al. |
| 6,692,003 | B2 | 2/2004 | Potter et al. |
| 6,719,631 | B1 | 4/2004 | Tulley et al. |
| 6,722,976 | B2 | 4/2004 | Adams |
| 6,726,565 | B2 | 4/2004 | Hughs-Baird |
| 6,733,386 | B2 | 5/2004 | Cuddy et al. |
| 6,761,632 | B2 | 7/2004 | Bansemer et al. |
| 6,767,284 | B1 | 7/2004 | Koza |
| 6,769,983 | B2 | 8/2004 | Slomiany |
| 6,780,103 | B2 | 8/2004 | Bansemer et al. |
| 6,780,105 | B1 | 8/2004 | Kaminkow |
| 6,780,111 | B2 | 8/2004 | Cannon et al. |
| 6,786,824 | B2 | 9/2004 | Cannon |
| 6,790,140 | B1 | 9/2004 | Niwa |
| 6,793,575 | B2 | 9/2004 | Brown et al. |
| 6,811,482 | B2 | 11/2004 | Letovsky |
| 6,817,948 | B2 | 11/2004 | Pascal et al. |
| 6,832,959 | B2 | 12/2004 | Baerlocher |
| 6,837,793 | B2 | 1/2005 | McClintic |
| 6,852,027 | B2 | 2/2005 | Kaminkow et al. |
| 6,857,961 | B2 | 2/2005 | Soltys et al. |
| 6,863,606 | B1 | 3/2005 | Berg et al. |
| 6,869,357 | B2 | 3/2005 | Adams et al. |
| 6,893,341 | B2 | 5/2005 | Walker et al. |
| 6,902,478 | B2 | 6/2005 | McClintic |
| 6,908,390 | B2 | 6/2005 | Nguyen et al. |
| 6,923,720 | B2 | 8/2005 | Loose |
| 6,942,568 | B2 | 9/2005 | Baerlocher |
| 6,942,571 | B1 | 9/2005 | McAllister et al. |
| 6,976,676 | B2 | 12/2005 | Adams |
| 6,984,174 | B2 | 1/2006 | Cannon et al. |
| 7,052,392 | B2 | 5/2006 | Tessmer et al. |
| 7,056,210 | B2 | 6/2006 | Bansemer et al. |
| 7,156,735 | B2 | 1/2007 | Brosnan et al. |
| 7,175,524 | B2 | 2/2007 | Bansemer et al. |
| 7,192,344 | B2 | 3/2007 | Baerlocher |
| 7,198,572 | B2 | 4/2007 | Walker et al. |
| 7,241,219 | B2 | 7/2007 | Walker et al. |
| 7,241,221 | B1 | 7/2007 | Luciano, Jr. et al. |
| 7,361,091 | B2 | 4/2008 | Letovsky |
| 7,931,531 | B2 | 4/2011 | Oberberger |
| 2001/0024971 | A1 | 9/2001 | Brossard |
| 2001/0049298 | A1 | 12/2001 | Bennett |
| 2002/0016201 | A1 | 2/2002 | Bennett et al. |
| 2002/0034980 | A1 | 3/2002 | Lemmons et al. |
| 2002/0049084 | A1 | 4/2002 | Hugh-Baird et al. |
| 2002/0107065 | A1 | 8/2002 | Rowe |
| 2002/0128055 | A1 | 9/2002 | Adams |
| 2002/0147040 | A1 | 10/2002 | Walker et al. |
| 2002/0151342 | A1 | 10/2002 | Tracy et al. |
| 2002/0160825 | A1 | 10/2002 | Nicastro et al. |
| 2002/0170068 | A1 | 11/2002 | Rafey et al. |
| 2003/0013519 | A1 | 1/2003 | Bennett |
| 2003/0060264 | A1 | 3/2003 | Chilton et al. |
| 2003/0060266 | A1 | 3/2003 | Baerlocher |
| 2003/0060275 | A1 | 3/2003 | Hughs-Baird |
| 2003/0064773 | A1 | 4/2003 | Baerlocher et al. |
| 2003/0069057 | A1 | 4/2003 | DeFrees-Parrott |
| 2003/0069068 | A1 | 4/2003 | Kaminkow |
| 2003/0078091 | A1 | 4/2003 | Brandstetter et al. |
| 2003/0104854 | A1 | 6/2003 | Cannon |
| 2003/0104860 | A1 | 6/2003 | Cannon et al. |
| 2003/0114209 | A1 | 6/2003 | Ritner, Jr. et al. |
| 2003/0114218 | A1 | 6/2003 | McClintic |
| 2003/0114219 | A1 | 6/2003 | McClintic |
| 2003/0114220 | A1 | 6/2003 | McClintic |
| 2003/0119576 | A1 | 6/2003 | McClintic et al. |
| 2003/0119581 | A1 | 6/2003 | Cannon et al. |
| 2003/0125102 | A1 | 7/2003 | Cannon |
| 2003/0125107 | A1 | 7/2003 | Cannon |
| 2003/0130041 | A1 | 7/2003 | Pascal et al. |
| 2003/0144053 | A1 | 7/2003 | Michaelson |
| 2003/0171144 | A1 | 9/2003 | Letovsky |
| 2003/0176219 | A1 | 9/2003 | Manfredi et al. |
| 2003/0181231 | A1 | 9/2003 | Vancura et al. |
| 2003/0186745 | A1 | 10/2003 | Nguyen et al. |
| 2003/0199321 | A1 | 10/2003 | Williams |
| 2003/0211881 | A1 | 11/2003 | Walker et al. |
| 2003/0220138 | A1 | 11/2003 | Walker et al. |
| 2003/0228901 | A1 | 12/2003 | Walker et al. |
| 2004/0005918 | A1 | 1/2004 | Walker et al. |
| 2004/0048644 | A1 | 3/2004 | Gerrard et al. |
| 2004/0048659 | A1 | 3/2004 | Seelig et al. |
| 2004/0063492 | A1 | 4/2004 | Baerlocher |
| 2004/0106446 | A1 | 6/2004 | Cannon et al. |
| 2004/0116173 | A1 | 6/2004 | Baerlocher |
| 2004/0116174 | A1 | 6/2004 | Baerlocher et al. |
| 2004/0121839 | A1 | 6/2004 | Webb |
| 2004/0162130 | A1 | 8/2004 | Walker et al. |
| 2004/0176157 | A1 | 9/2004 | Walker et al. |
| 2004/0198490 | A1 | 10/2004 | Bansemer et al. |
| 2004/0204218 | A1 | 10/2004 | Hughs-Baird |
| 2004/0204226 | A1 | 10/2004 | Foster et al. |
| 2005/0020340 | A1 | 1/2005 | Cannon |
| 2005/0026664 | A1 | 2/2005 | Bansemer et al. |
| 2005/0043088 | A1 | 2/2005 | Nguyen et al. |
| 2005/0043089 | A1 | 2/2005 | Nguyen et al. |
| 2005/0043094 | A1 | 2/2005 | Nguyen et al. |
| 2005/0044575 | A1 | 2/2005 | Der Kuyl |
| 2005/0054429 | A1 | 3/2005 | Baerlocher et al. |
| 2005/0059446 | A1 | 3/2005 | Kaminkow |
| 2005/0060050 | A1 | 3/2005 | Baerlocher et al. |
| 2005/0085294 | A1 | 4/2005 | Walker et al. |
| 2005/0096125 | A1 | 5/2005 | LeMay |
| 2005/0181853 | A1 | 8/2005 | Baerlocher |
| 2005/0233794 | A1 | 10/2005 | Cannon et al. |
| 2006/0030399 | A1 | 2/2006 | Baerlocher |
| 2006/0030959 | A1 | 2/2006 | Duhamel |
| 2006/0030960 | A1 | 2/2006 | Duhamel et al. |
| 2006/0040735 | A1 | 2/2006 | Baerlocher |
| 2006/0082056 | A1 | 4/2006 | Kane et al. |
| 2006/0128453 | A1 | 6/2006 | Hoffman |
| 2006/0128457 | A1 | 6/2006 | Cannon |
| 2006/0128472 | A1 | 6/2006 | Beavers |
| 2006/0138728 | A1 | 6/2006 | Gordon et al. |
| 2006/0160600 | A1 | 7/2006 | Hill et al. |
| 2006/0160608 | A1 | 7/2006 | Hill et al. |
| 2006/0165254 | A1 | 7/2006 | Fujimoto et al. |
| 2006/0177109 | A1 | 8/2006 | Storch |
| 2006/0178185 | A1 | 8/2006 | Weis |
| 2006/0232012 | A1 | 10/2006 | Boyer |

| | | | |
|---|---|---|---|
| 2006/0247012 | A1 | 11/2006 | Walker et al. |
| 2006/0247955 | A1 | 11/2006 | Humphrey |
| 2006/0252497 | A1 | 11/2006 | Walker et al. |
| 2006/0252498 | A1 | 11/2006 | Walker et al. |
| 2006/0252521 | A1 | 11/2006 | Gururajan et al. |
| 2007/0054726 | A1 | 3/2007 | Muir et al. |
| 2007/0099688 | A1 | 5/2007 | Brosnan et al. |
| 2007/0129142 | A1 | 6/2007 | Walker et al. |
| 2007/0129143 | A1 | 6/2007 | Walker et al. |
| 2007/0191091 | A1 | 8/2007 | Walker et al. |
| 2008/0015004 | A1 | 1/2008 | Gatto et al. |
| 2009/0061996 | A1 | 3/2009 | Walker et al. |

FOREIGN PATENT DOCUMENTS

| | | |
|---|---|---|
| GB | 1 242 298 | 8/1971 |
| GB | 2 066 991 | 7/1981 |
| GB | 2 097 160 | 12/1981 |
| GB | 2 100 905 | 1/1983 |
| GB | 2 182 186 | 5/1987 |
| GB | 2 191 030 | 12/1987 |
| GB | 2 207 268 | 1/1989 |
| GB | 2 226 436 | 6/1990 |
| GB | 2 242 300 | 9/1991 |
| GB | 2 258 164 | 2/1993 |
| GB | 2 262 642 | 6/1993 |
| GB | 2 387 950 | 10/2003 |
| NZ | 508626 | 11/2001 |
| WO | WO 96/25725 | 8/1996 |
| WO | WO 98/51384 | 11/1998 |
| WO | WO 01/15450 | 3/2001 |
| WO | WO 02/17250 | 2/2002 |
| WO | WO 2006/017068 | 2/2006 |
| WO | WO 2006/074010 | 7/2006 |
| WO | WO 2006/088498 | 8/2006 |
| WO | WO 2006/096752 | 9/2006 |

OTHER PUBLICATIONS

Cyclone Advertisements, written by Innovative Concepts in Entertainment, Inc., published prior to Sep. 13, 2002.

Donkey Kong Definition [online] [retrieved on Sep. 18, 2007, available prior to Jun. 25, 2007]. Retrieved from the Internet at <URL: http://en.wikipedia.org/wiki/Donkey_Kong>.

Evenson, Laura, "Back in the Game Nolan Bushnell, creator of Atari and 'Pong' has come up with TeamNet and TouchN", The San Francisco Chronicle, Aug. 23, 1996, Section: Daily Datebook, p. D1. (4 pages).

Fey, Slot Machines, A Pictorial History of the First 100 Years, Liberty Belle Books, 1983, pp. 215, 219.

Hoyle's Rules of Games Book pp. 34-63, written by Edmond Hoyle, published 1976-1983.

Jackpot Party Brochures and Articles written by WMS Gaming, Inc., published in 1998.

Mikohn Ripley's Believe It or Not Article, written by Strictly Slots, published in Jun. 2001.

Mountain Coin Machine Distributing—Redemption Games—Cyclone™ Advertisement [online] [retrieved on Feb. 28, 2002, available prior to Jun. 25, 2007]. Retrieved from the Internet at <URL: www.mountaincoin.com>.

Ms. Pac-Man Definition [online] [retrieved on Sep. 18, 2007, available prior to Jun. 25, 2007]. Retrieved from the Internet at <URL: http://en.wikipedia.org/wiki/Ms._Pacman>.

Pac-Man Definition [online] [retrieved on Sep. 18, 2007, available prior to Jun. 25, 2007]. Retrieved from the Internet at <URL: http://en.wikipedia.org/wiki/Pacman>.

Press Your Luck Article, written by Strictly Slots, published in 2000.

Primetime Amusements Redemption Games Advertisement [online] [retrieved on Feb. 28, 2002, available prior to Jun. 25, 2007]. Retrieved from the Internet at <URL: http://www.primetimeamusements.com/redemption.htm>.

Super Mario Bros. Definition [online] [retrieved on Sep. 18, 2007, available prior to Jun. 25, 2007]. Retrieved from the Internet at <URL: http://en.wikipedia.org/wiki/Super_Mario_Brothers>.

Table Games Advertisement Brochure, published by ShuffleMaster in 2000.

"Takasago Denki to offer Video-On-Demand Game Machines", COMLINE Daily News Computers, Apr. 4, 1995. (1 page).

Tang, Nelson, "The Original Friends Drinking Game," Jan. 2, 1996, available at http://web.archive.org/web/19991008145735/friends-cafe.hypermart.net/drinkinggame/original.html. (3 pages).

The Inside Straight Article, written by IGT, published in 2002.

Tickets'n'Tunes Advertisement online] [retrieved on Feb. 28, 2002, available prior to Jun. 25, 2007]. Retrieved from the Internet at <URL: www.rgb.com>.

Weiner Distributing ICE Cyclone™ Web Page online] [retrieved on Feb. 28, 2002, available prior to Jun. 25, 2007]. Retrieved from the Internet at <URL: www.weinerd.com>.

Letter from James E. Armstrong IV of Edwards Wildman dated Oct. 17, 2011 regarding Third Party Submission Pursuant to 37 C.F.R. 1.99 filed for U.S. Appl. No. 13/093,382 (1 page).

Third Party Submission Pursuant to 37 C.F.R. 1.99 filed for U.S. Appl. No. 13/093,382, dated Oct. 18, 2011 (3 pages).

FIG. 4D
16
Congratulations!
You finished course
#1.
Your wagering outcome is 10!
Now try course #2.
You won 50 points in
the driving game.
Funds Remaining
Wager Component
Credits Won
Points Won
18
2
10
50
20
21
22
23

FIG. 4H
16
Congratulations!
You finished
course #3.
Your wagering outcome is 8!
Try course #4.
Funds Remaining
Wager Component
Credits Won
Points Won
14
2
38
160
20
21
22
23

FIG. 4J
16
Sorry! You crashed.
You won 200 points in the driving game. Your interactive game rank is #2.
Congratulations - You win 38 credits for the randomly determined wagering outcomes!
You have credits remaining- Play new game ?
Funds Remaining
14
Wager Component
2
Credits Won
38
Points Won
200
20
21
22
23

GAMING SYSTEM AND METHOD PROVIDING AN INTERACTIVE GAME WITH AUTOMATIC WAGERS

PRIORITY CLAIM

This application is a continuation of, claims priority to and the benefit of U.S. patent application Ser. No. 11/767,970, filed on Jun. 25, 2007, which is a continuation-in-part application of, claims priority to and the benefit of U.S. patent application Ser. No. 11/557,872 filed on Nov. 8, 2006, the entire contents of each are incorporated by reference herein.

COPYRIGHT NOTICE

A portion of the disclosure of this patent document contains or may contain material which is subject to copyright protection. The copyright owner has no objection to the reproduction by anyone of the patent document or the patent disclosure in exactly the form it appears in the Patent and Trademark Office patent file or records, but otherwise reserves all copyright rights whatsoever.

BACKGROUND

Primary wagering games of gaming machines in most jurisdictions are games of luck, not games of skill. For instance, in slot machines, the player must make a wager on the slot game to begin the slot game, and the gaming machine randomly determines the outcome for the slot game. The outcome may be a winning outcome or a losing outcome. The outcome determines whether the player obtains an award according to the paytable of the slot machine.

One reason slot machines are popular is because an amateur, novice or inexperienced player can play most slot machines at the player's own pace, with no required skills, strategy or risk evaluation and perform as well as a seasoned or experienced slot game player. Most slot machines are set to pay back on average between 80 and 99 percent of the amounts that the players wager. In most modern slot machines, a processor controlling the gaming machine randomly determines the outcomes and thus the awards. In other slot machines, a central server determines the awards and sends the awards to a plurality of gaming machines.

Certain wagering gaming machines such as video poker and blackjack involve certain player strategy or decision-making. The player decides which cards to hold in draw-type poker games and whether to take additional cards in blackjack-type card games. These games generally require a certain level of strategy to be successful.

Wagering games of gaming machines in certain jurisdictions are required to involve a skill event such as an event requiring player dexterity to be successful. These games cannot turn purely upon a random outcome. These gaming machines require strategy or timing of inputs by the player to determine success and failure. If the player does not play optimally, the actual payout percentage of the gaming machine will decrease accordingly.

Primary wagering games which are purely skill games or partial skill games present certain problems for game designers and gaming establishments. First, skill games can be mastered by players having a high level of skill, substantial practice or both. To combat the mastering of such games and to make the economics work, a game designer may have to make the skill game relatively difficult. The difficulty level may be too great for inexperienced or average players to have a sufficient level of success and enjoyment at the gaming machines. Such players may not have a good gaming experience and may not repeat play on these gaming machines.

Skill games, on the other hand, are generally interactive and are enjoyable for certain people to play. Many people have especially grown accustomed to and comfortable with playing arcade skill games, home video skill games, computer skill games, handheld device skill games, and data network (e.g., internet) skill games. Many known wagering games do not appeal to such people who have played such skill based games which reward skill and strategy. Some of these people may not want to play wagering games of conventional gaming machines which are purely based on randomly generated outcomes and involve no skill or little skill. Some of these people also enjoy the competitive nature of skill games which are not provided by known conventional wagering games of gaming machines.

Accordingly, a need exists for a gaming system, gaming machine, and method better meeting such players' needs in a casino or a gaming environment.

SUMMARY

The present disclosure provides a gaming device, system and method which enables players to play an interactive game and make wager components that occur during the interactive game, where the wagering outcome for each of the wager components is independent from the interactive game. In one embodiment, the present disclosure provides at least one gaming machine or device which includes an interactive game. The interactive game is in one embodiment a skill based game initiated by the player. In one embodiment, the player funds the gaming machine. For example, the player may fund the gaming machine with an amount of credits and choose the amount or value of the wager components. During play of the interactive game, upon the occurrence of a wager triggering event, the gaming machine causes a wagering event to occur. The wagering event includes a placement of a wager component and a random determination of a wagering outcome for that wagering event. Multiple wagering events can occur during the play of the interactive game. In one embodiment, upon completion of the interactive game, the gaming machine: (a) provides the player with any wagering awards based on the determined wagering outcomes for the wagering events that occurred during or in association with the play of the interactive game; and (b) displays the determined interactive game outcome that is based on how the player did in the interactive game. In certain embodiments, the interactive game outcome is independent of the wagering events. That is, the interactive game outcome is based, at least in part, on the inputs of the player and is not based on an amount of a wager component or a wagering outcome. In certain embodiments, the wagering outcomes are randomly determined independently of the interactive game inputs and the interactive game outcome.

More specifically, in one embodiment, the player initiates both an interactive game session and a wagering session upon making a specified input at the gaming machine. In one embodiment, the player makes an initial funding of the gaming machine to initiate the interactive game. In other embodiments, the player selects apertures such as a maximum amount of credits which may be wagered in association with the interactive game. For example, a player may select to fund the gaming machine with an initial fund and determine the amount of the wager components. In one embodiment, when a player wins awards associated with the wagering outcomes, the awards are added to the initial funds. As long as there are credits left in the fund, the player may continue to play the interactive game. Each time a wager triggering event occurs, the gaming machine or system automatically removes the wager component amount from the fund. Wager components are invoked at stages during the interactive game's progression. In one embodiment, to place the wager component within the same interactive game session, the player must be able to reach the next marker. The marker may be any suitable marker, such as an increased point accumulation, a visible or audible milestone within a video game or an amount of time. In one embodiment, the marker is reached based, at least in part, on the player's skill. The wagering outcome of each wager component is determined in a manner consistent with games of chance and is not linked to or dependent on the skill or strategy demonstrated during the interactive game or competition game. The interactive game continues until the player either loses at a decisive state of the competition game, elects to stop playing, runs out of funds or finishes the interactive game. At that point, the player has at least two measures of the player's performance. One is an award of points (or other suitable measure) based on the player's achievement in the competition or interactive game. The other is the more traditional cash or credit award the player acquired as wagering outcomes of the series of wager components invoked during the competition or interactive game. With respect to the wagering outcomes, the difference between a skilled and unskilled player playing the interactive game is that the skilled player in certain embodiments is more likely to wager more wager components in a given interactive game session as a result of being able to play a session for a longer period or otherwise doing better in the interactive game. In such embodiments, to wager the same number of wager components, the unskilled player would just play more interactive game sessions. Thus, the present disclosure provides solutions for the above problems relating to employing skill based games in a wagering environment.

For example, the interactive game is a maze game where the player moves an animated symbol to try to accumulate stationary symbols while navigating around a maze without encountering other enemy animated symbols. A player inserts the initial fund of $10 and selects a wager component amount of $0.10. The wager triggering event is the accumulation of a stationary symbol. That is, each time the animated symbol accumulates a stationary symbol, the gaming machine automatically removes $0.10 from the player's fund and randomly generates a wagering outcome. If the wagering outcome is a losing outcome, after a first wagering event, the player's fund is $9.90. If the player's outcome is winning, the gaming machine and/or system determines an award for the player, such as $0.50. The gaming machine and/or system then adds the wagering award to the initial funds, which would be $10.40 (10.00−0.10+0.50). In addition to the wagering outcome, as the player makes inputs, in one embodiment the gaming machine and/or system provides the player points for interactive game that are based on the player inputs and are independent of any wagering outcomes. In one embodiment, the player is enabled to play the interactive game until the player's fund amount is depleted, the game ends or the player elects to stop playing. At the end of the game the gaming machine provides the player with the player's fund which is independent of the interactive game outcome (if the player has credits left) and an interactive game outcome that is independent of any credits won or lost for wagering events.

The interactive game outcome in one embodiment is based on a comparison of how the player did in the interactive game versus other players. The interactive game outcome in another embodiment is based on a comparison of how the player did in the interactive game versus a predefined set of criteria.

In one embodiment, a player may win an additional award based on the interactive game outcome. In one embodiment, upon a triggering event, the gaming system provides one or more players of the interactive game an additional award based on certain criteria. For example, the triggering event is a time period, such as a week. The gaming system sends all of the player's information and interactive game outcomes to another gaming system. Upon the expiration of the week, the other gaming system determines the top five players and causes the top five players to be awarded a prize. In another example, when a player achieves a certain point score, the gaming system provides the player an additional award. In another example, the gaming system provides players who are currently ranked at a certain rank an additional award. In one embodiment, the awards for the interactive game may be funded, at least in part, from a marketing or an advertising account. That is, one or more awards for the interactive game outcome or for an interactive game ranking are funded, at least partially, via an amount provided by one or more marketing and/or advertising departments, such as a gaming establishment's marketing department and are not considered part of the paytable or the payback percentage of the gaming machine. These marketing dollars are based on money set aside by the gaming establishment to attract players to the gaming establishment and are not based on a paytable. It should be appreciated that the interactive game awards are not limited to monetary awards but may be any suitable award such as but not limited to tickets to events, vacations, resort comps (i.e., a free hotel room or meal) or physical objects, such as cars.

In alternative embodiments, the interactive game outcomes can be provided to the player at times other than upon completion of the interactive game such as upon completion of each stage of the interactive game (including the last stage). The gaming machine provides the player with: (a) any awards based on the determined wagering outcomes for the wager triggering events that occurred during or in association with the play of that stage of the interactive game; and (b) the determined interactive game outcome based on how the player did in that stage of the interactive game.

It should be appreciated that the wager triggering event may be any suitable event that occurs during or in association with the interactive game. In one embodiment, the wager triggering event is a time interval. For example, the wager triggering event is the passing of five seconds during play of the interactive game. Therefore, every five seconds during the interactive game the gaming machine causes a placement of a wager component and determines a wagering outcome. In another embodiment, the wager triggering event is an event in the interactive game. For example, every time the player accomplishes an event, such as a skill event, such as shooting at and hitting a target or winning a certain amount of points, the gaming machine causes a placement of a wager component and determines a wagering outcome. In certain embodiments, the gaming system includes a plurality of different wager triggering events. It should be appreciated that the wager triggering event may be any suitable event.

In one embodiment, the interactive game is a car racing game. The gaming device enables the player to use one or more input devices to maneuver around a race track. The wager triggering events are checkpoints in the race track. For example, a wager triggering event is a quarter lap (i.e., making it one fourth of the way around the race track). The gaming system enables the player to play the interactive game. When the player maneuvers the car one-quarter lap, the wagering event occurs. The gaming device automatically causes placement of the wager component and determines a wagering outcome. This process continues until the interactive game ends. At the end of the interactive game, the gaming system provides the player two different types of outcomes or awards. The gaming system provides the player one or more wagering outcomes and/or any associated awards. The gaming system also provides the player with an interactive game outcome or displays the interactive game outcome to the player. In one embodiment, the interactive game outcome includes the points for the interactive game and a rank for the interactive game. At the end of the interactive game or upon an occurrence of a triggering event, in one embodiment the gaming system provides the player an interactive game award funded by marketing dollars if the interactive game outcome meets certain criteria.

The interactive game may be any suitable interactive skill game, interactive partial skill game or interactive pseudo skill game. The interactive game may include any suitable type and any suitable number of skill events, such as hand-eye coordination events or dexterity events. For example, the interactive game is any suitable type of racing or competitive game, a sports-based game or a shooting game. In other embodiments, the interactive game involves mental skill, knowledge, logical deduction, strategy or a combination thereof. For example, the interactive game may be a trivia game or a memory game. Such games may also have a skill element.

In one embodiment, the interactive game is a conventional arcade game. In this embodiment, the gaming device includes an arcade game. In one embodiment, the gaming device is physically similar in appearance and function to a conventional arcade game or arcade machine. The gaming device includes additional inputs of a conventional slot or other wagering gaming device such as player bet or wager inputs, player tracking card input(s), monetary acceptors, and cash out buttons.

The interactive game may end or terminate in any suitable manner. In one embodiment, the player must achieve certain events to continue play of the interactive game. For example, the player has to shoot 10 out of 20 targets in a first stage of a game to continue to a next stage of a game. In one embodiment, the interactive game continues as long as the player has initiated the interactive game with funds to place the next wager component. In this embodiment, the interactive game ends when these funds run out. In another embodiment, the gaming machine enables the player to place more funds to continue the game. In one embodiment, the gaming machine pauses or freezes the interactive game and enables the player to insert more credits to continue play. In one embodiment, the interactive game continues until the player finishes with the interactive game. In one embodiment, the player may elect to stop playing the interactive game at any stage. It should be appreciated that the interactive game may begin based on another suitable input by the player.

The interactive game outcome for each player may be based on a place or a rank obtained by that player, such as a first place finish or second place finish against the gaming machine in the interactive game, such as in a racing game. In other embodiments, the interactive game outcome is based on an accumulated number of points obtained by that player, such as points earned for a number of targets hit by that player in a shooting game or a number of questions answered correctly by the player in a trivia game. In one embodiment, the ranking each player receives in the interactive game is based on that player's performance in the interactive game relative to the other players' performance in the interactive game. For example, a player who achieves 80 points in the interactive game will be ranked higher than a player who achieves 76 points in the interactive game.

It should be appreciated that the wager component or microwager may be determined in any suitable manner. In one embodiment, the gaming machines or gaming system determine the wager component and it is the same for each player for each game. For example, the wager component is $0.25. Every time a wager triggering event occurs, the wagering event occurs and the gaming machine causes the placement of a $0.25 wager component and determines a wagering outcome. In one such embodiment, the gaming machine enables the player to select a maximum amount for each wager component. In another embodiment, the gaming machine enables the player to select an amount for the wager component and determines a wagering outcome based, at least in part, on the wager component. In one embodiment, this is set for the entire interactive game. For example, the player may choose to set the wager components in the values of fractions of a cent, such as ¼ of a cent, $0.01, $0.05, $0.10, $0.25, $0.35 or $0.50 or any other suitable amount. In another embodiment, the amount of a credit is set, for example $0.05, and the gaming machine enables the player to select a number of credits to be included in each wager component. Therefore, the gaming machine enables the player to customize the gaming experience. In one such embodiment, the gaming machine enables the player to select a maximum amount to wager. In another embodiment, the amount of the wager component may be based on a factor or element. For example, the amount of the wager component may be based on a player ranking from a player tracking system. In one embodiment, one or more of the wagering components are different amounts. In one such embodiment, which wagering component is automatically wagered is randomly determined. In another embodiment, which wagering component is automatically wagered is based on an event. For example, the interactive game includes a plurality of different wager triggering events and which wager component is wagered is based on which wager triggering event occurred.

It should be appreciated that the gaming devices may include any suitable meters. In one embodiment, the gaming system or device maintains the total cumulative credits, funds or stake in one meter and the interactive game outcome, such as a number of points or a player ranking, in a separate meter. The interactive game and the wagering outcomes and wagering awards are therefore completely independent. In another embodiment, the gaming system or device includes a total cumulative credits, funds or stake meter, a wager component meter, and a separate points meter. It should be appreciated that the meters may be displayed in any suitable manner. In one embodiment, one or more of the meters are displayed at the bottom of the display device displaying the interactive game. Therefore, the player does not have to look away from the interactive game to gauge how the player is performing. In another embodiment, one or more of the credit meters are displayed on or around an object in the interactive game. For example, if the interactive game is a car racing game, one or more of the meters are displayed on the car so that the player can play the game and gauge the player's progress at the same time.

In one embodiment, the gaming machine displays the wagering awards during the play of the interactive game such that the player may play the interactive game and view one, a plurality or each of the wagering awards while playing the interactive game without interfering with the interactive game. In one embodiment, the plurality of wagering awards move in a direction across the display of the interactive game.

In one embodiment, the gaming machine displays the wagering awards on, around or originating from an object or location of the interactive game. For example, the gaming machine displays the wagering awards on the same display device that displays the interactive game over a portion of the displayed interactive game. In one embodiment, the wagering awards are displayed in a plurality of locations. In one such embodiment, as the gaming machine generates more wagering awards, the gaming machine displays one or more of the previously displayed wagering awards each in a new location. In one such embodiment, the wagering awards are displayed heading in a designated direction. That is, the gaming machine displays the wagering awards in a stream of symbols, such as numbers, that continues in a designated direction where the symbols shift to new locations or positions. Each time a new wagering award is generated, the previously displayed wagering award is displayed in a new location and the newly generated wagering award is displayed in the prior location of the previously generated wagering award resulting in a stream of wagering awards displayed to the player.

For example, in a car racing game, a gaming machine displays a first wagering award of 10 in the middle of the race track in a first location. When the gaming machine generates a second wagering award of 15, the gaming machine displays the first wagering award of 10 in a second location and the second wagering award of 15 at the first location. When the gaming machine generates a third wagering award of 5, the gaming machine displays the first wagering award of 10 in a third location, the second wagering award of 15 in the second location and the third wagering award of 5 at the first location.

In another embodiment, the gaming machine displays the wagering awards in a stream originating from a location and extending towards another location. The origination location or the termination location of the stream may change based on any suitable factor. In one embodiment, the wagering award stream origination location is the player symbol. As the player symbol moves, the origination location changes. In one such embodiment, the wagering award stream termination location is a stationary location, such as the wagering award display. In one such embodiment, the wagering award stream shifts or is displayed in a new location every time the gaming machine displays the player symbol in a new location. However, the award stream continues to extend in the direction of the wagering award display. In one such embodiment, the wagering award stream termination location is a stationary location, such as the credit display. In one such embodiment, the wagering award stream shifts or is displayed in a new location every time the gaming machine displays the player symbol in a new location. That is, the wagering award stream originates from the location the player symbol is displayed and shifts with the player symbol as the player symbol changes locations. However, in one embodiment, the award stream continues to extend in the direction of the wagering award display.

It should be appreciated that the gaming machine may simultaneously display any suitable number of wagering awards. The gaming machine may only display certain wagering awards, such as the 10 wagering awards highest in value that are won by the player. In one embodiment, the gaming machine displays the wagering awards in different colors. In another embodiment, the wagering awards are hollow or transparent such that the player may partially view the interactive game through one or more of the displayed wagering awards. In one embodiment, the gaming machine initially displays each of the wagering awards in a same first location. In another embodiment, the gaming machine displays wagering awards based on one or more interactive game factors. For example, if the interactive game is associated with different wagering triggering events, the wagering awards generated from each of the triggering events are displayed differently. The wagering awards may be displayed in any suitable manner.

In one embodiment, the player is required to fund the gaming machine with a certain amount of money or credits to play the interactive game. For example, the player must fund the gaming machine with enough money to cover the amount of the wagering events if the player does not win any credits from the wagering events for a certain amount of time. That is, there is a predetermined required initial fund to play the interactive game. In another embodiment, if the player runs out of money or credits during the play of the interactive game, the gaming machine enables the player to insert more money or credits to further fund the gaming machine. In an alternative embodiment, if the player runs out of money during the play of the interactive game, the gaming machine ends the interactive game.

In certain embodiments, the gaming system includes a common display device or a leaderboard to display the interactive game outcomes of one or more players or to communicate with the players. In one embodiment, the common display device displays the rankings of the players. In other embodiments, the ranks are displayed to the players on the individual gaming devices. In another embodiment, the gaming system does not display the ranks of the players. In one embodiment, upon a triggering event, such as the expiration of an amount of time, the gaming system provides awards for one or more players with names displayed on the common display device.

It should be appreciated that the gaming system may include any suitable number of processors which may perform any suitable functions of the gaming system. In one embodiment, the processors are located at a plurality of geographic locations and are connected over a network. In one embodiment, the gaming system is server based. It should also be appreciated that the gaming system may be integrated with any suitable number of other gaming systems and/or processors which may determine one or more aspects of the game. For example, a first gaming system enables the player to play the interactive game and a second gaming system determines any awards to provide any players for the interactive game outcomes.

It is therefore an advantage of the gaming system to provide an interactive game and wager component placed during the interactive game to a player.

It is also an advantage of the gaming system to enable a player to receive wagering outcomes during play of an interactive game.

Other objects, features and advantages of the disclosure will be apparent from the following detailed disclosure, taken in conjunction with the accompanying sheets of drawings, wherein like numerals refer to like parts, elements, components, steps and processes.

DETAILED DESCRIPTION

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by a central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any games are communicated from the central server to the gaming device in a thick client configuration and computerized instructions for controlling any secondary games or bonus functions are executed by a central server in a thin client configuration.

Figure 1A:
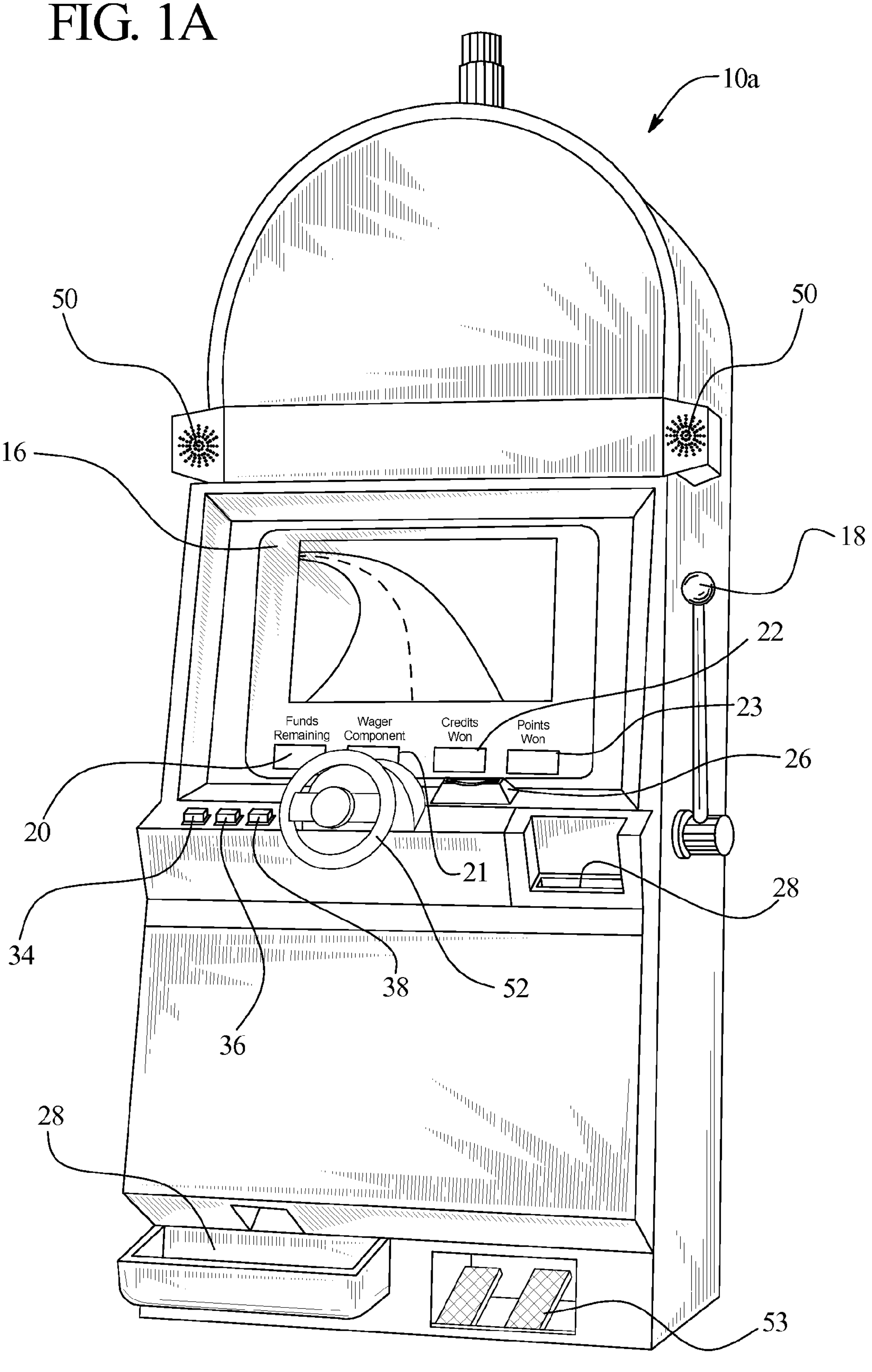
FIGS. 1A and 1B are perspective views of alternative embodiments of the gaming devices of the present disclosure.
Figure 1B:
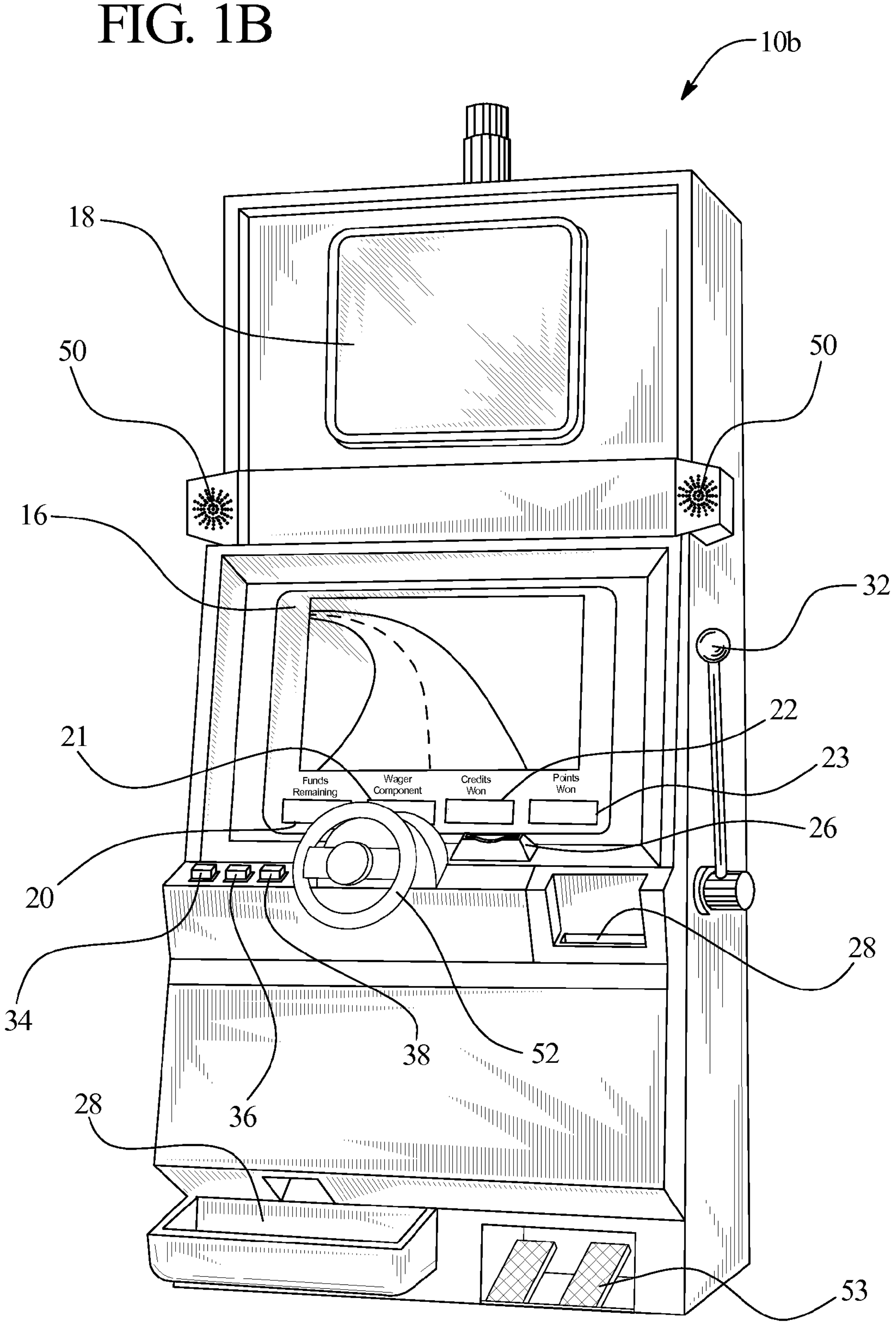

Referring now to the drawings, two example alternative embodiments of the gaming device of the disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
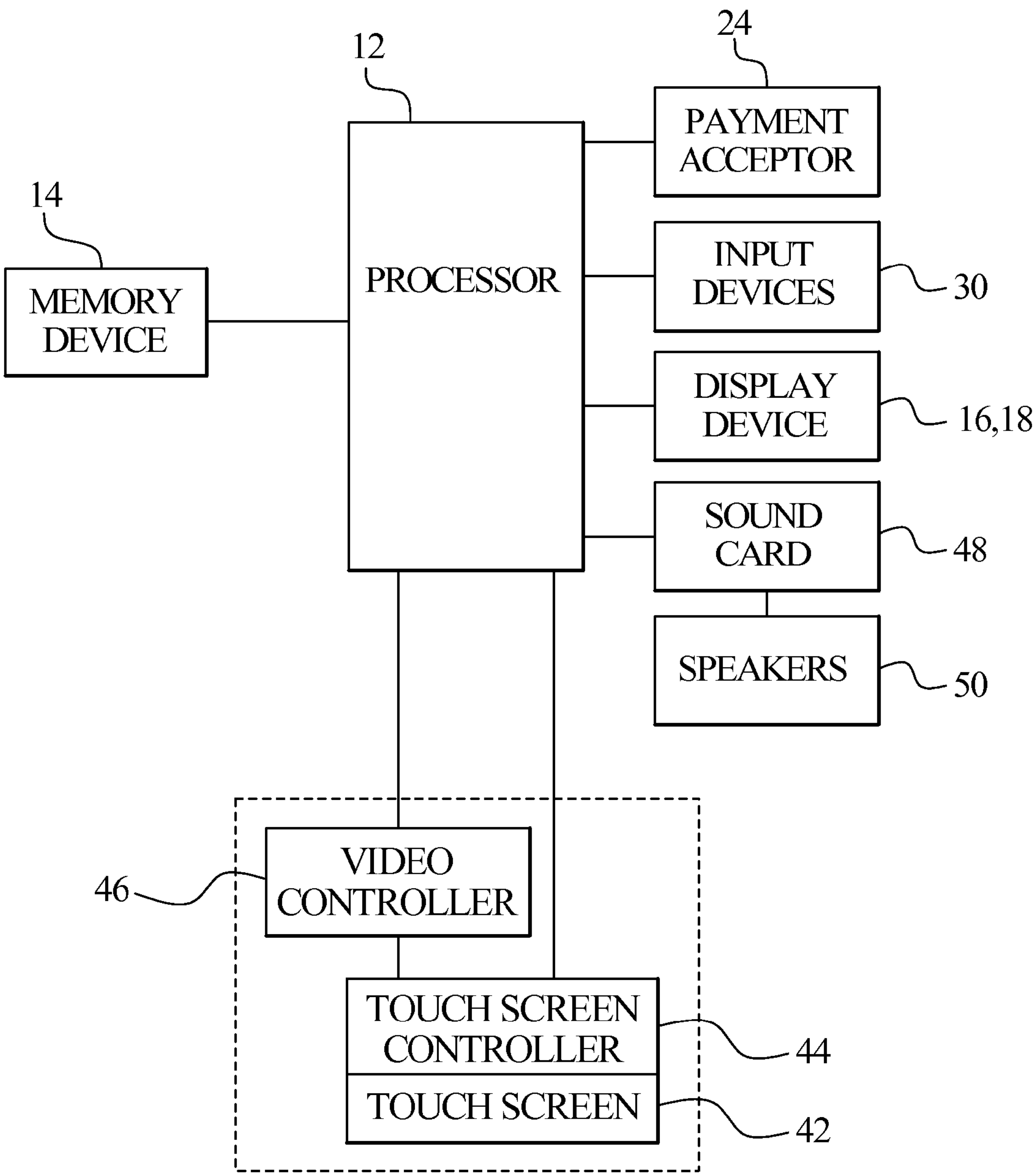
FIG. 2A is a schematic block diagram of the electronic configuration of one embodiment of the gaming devices of the present disclosure.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates bonus awards, wagering outcomes or awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a game. This display device may also display any suitable secondary game as well as information relating to the interactive game, wager triggering event or wagering outcome. The alternative embodiment shown in FIG. 1B includes a central display device 16 and an upper display device 18. The upper display device may display any wagering outcome, any wagering outcome, any suitable secondary game associated or not associated with the interactive game and/or information relating to the interactive games. These display devices may also serve as digital glass operable to advertise games or other aspects of the gaming establishment. As seen in FIGS. 1A and 1B, in one embodiment, the gaming device includes a credit or fund display 20 which displays a player's current number of credits, cash, account balance or the equivalent or the original number of credits the player funded the gaming machine with. In one embodiment, the gaming device includes a wager component display 21 which displays the amount of the wager component. In one embodiment, the gaming device includes an amount of credits won display 22 which displays a player's amount won. In one embodiment, the gaming device includes an interactive game display, such as a points display 23 which displays a player's points for the interactive game.

In another embodiment, at least one display device may be a mobile display device, such as a PDA or tablet PC, that enables play of at least a portion of the games at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a pull arm 32 or a play button 34 which is used by the player to start any game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager component permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier (or other suitable redemption system) or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a conventional touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the interactive and/or secondary game as a game image, symbol or indicia.

Gaming device 10 can incorporate any game. The gaming machine or device may include some or all of the features of conventional gaming machines or devices. The interactive may comprise any suitable reel-type game, card game, cascading or falling symbol game, number game, poker game, shooting game, driving game, selection game, video blackjack, video keno, video bingo, sporting game, trivia game, puzzle game, arcade game or other game susceptible to representation in an electronic or electromechanical form. The wagering outcome in one embodiment is a random outcome based on probability data at the time of or after placement of a wager component.

In one embodiment, the gaming machine may provide the player with one or more bonus games. In one embodiment, the bonus game may be a slot game with one or more paylines. The paylines may be horizontal, vertical, circular, diagonal, angled or any combination thereof. In this embodiment, the gaming device includes at least one and preferably a plurality of reels, such as three to five reels, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels. Each reel displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the bonus game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines a wagering outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager component on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to activate symbol positions in a bonus game. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player selects one or more reels, a player may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel.

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a bonus game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the bonus game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a bonus game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, the triggering event or qualifying condition may be a selected outcome in the interactive game or a particular arrangement of one or more indicia on a display device in the interactive game, such as the player obtaining a certain interactive game outcome. In other embodiments, the triggering event or qualifying condition may be by exceeding a certain amount of game play (such as number of games or an amount of time), a wagering outcome, or reaching a specified number of points earned during game play.

In another embodiment, the gaming device processor 12 or central server 56 randomly provides the player one or more plays of one or more secondary or bonus games and the gaming device does not provide any apparent reasons to the player for qualifying to play a secondary or bonus game. In this embodiment, qualifying for a bonus game is not triggered by an event in or based specifically on any of the plays of any interactive game. That is, the gaming device may simply qualify a player to play a secondary game without any explanation or alternatively with simple explanations. In another embodiment, the gaming device (or central server) qualifies a player for a secondary game at least partially based on a game triggered event, such as at least partially based on a wagering outcome.

In one embodiment, the gaming device includes a program which will automatically begin a bonus round after the player has achieved a triggering event or qualifying condition in the interactive game. In another embodiment, after a player has qualified for a bonus game, the player may subsequently enhance his/her bonus game participation through continued play on the interactive game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the interactive game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the interactive game thus, encouraging play of the interactive game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount to qualify for the secondary game. In this embodiment, the secondary game triggering event must occur and the side-wager (or designated wager amount) must have been placed to trigger the secondary game.

Figure 2B:
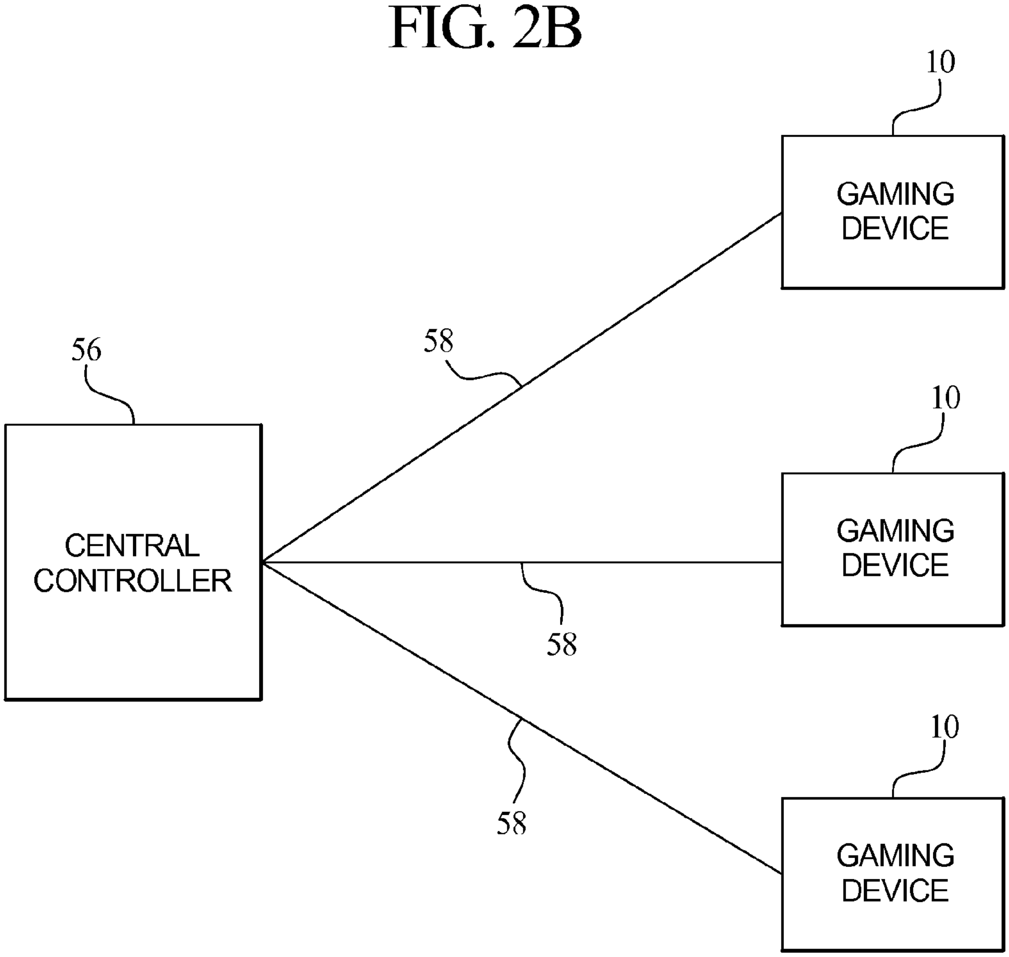
FIG. 2B is a schematic block diagram illustrating a plurality of gaming terminals in communication with a central controller.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the wagering outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a wagering outcome based on probability data. In another embodiment, the central server or controller randomly generates an outcome for the secondary game based on probability data. In another embodiment, the central server or controller randomly generates a game outcome for both the wagering outcome and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined wagering outcomes. In this embodiment, the central server or controller receives the game outcome request and independently selects a predetermined wagering outcome from a set or pool of game outcomes. The central server or controller flags or marks the selected game outcome as used. Once a wagering outcome is flagged as used, it is prevented from further selection from the set or pool and cannot be selected by the central controller or server upon another wager. The provided outcome can include a wagering outcome, a secondary game outcome, wagering and secondary game outcomes, or a series of game outcomes such as free games.

The central server or controller communicates the generated or selected wagering outcome to the initiated gaming device. The gaming device receives the generated or selected wagering outcome and provides the wagering outcome to the player. In an alternative embodiment, how the generated or selected wagering outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined wagering outcome value or predetermined wagering outcome is determined for each of a plurality of linked or networked gaming devices based on the results of a bingo or keno game. In this embodiment, each individual gaming device utilizes one or more bingo or keno games to determine the predetermined wagering outcome value provided to the player at that gaming device. In an alternative embodiment, the bingo or keno game is displayed to the player. In one embodiment, the bingo or keno game is not displayed to the player, but the results of the bingo or keno game determine the predetermined wagering outcome value.

In the various bingo embodiments, as each gaming device is enrolled in the bingo game, such as upon an appropriate wager triggering event or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a wagering outcome is determined for each of the enrolled gaming devices based, at least in part, on the selected elements on the provided bingo cards. As described above, the wagering outcome determined for each gaming device enrolled in the bingo game is utilized by that gaming device to determine the predetermined wagering outcome provided to the player. For example, a first gaming device to have selected elements marked in a predetermined pattern is provided a first waging outcome of win $10 which will be provided to a first player and a second gaming device to have selected elements marked in a different predetermined pattern is provided a second wagering outcome of win $2. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more wagering outcomes may be employed.

In one example of the above-described embodiment, the predetermined wagering outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined wagering outcome. For example, if the four corners of a bingo card are marked within the first twenty selected elements, a supplemental award of $10 is provided to the player as part of the predetermined wagering outcome or award. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. In this embodiment, the gaming device and/or player tracking system tracks any players gaming activity at the gaming device. In one such embodiment, the gaming device and/or associated player tracking system timely tracks when a player inserts their playing tracking card to begin a gaming session and also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information, such as any amounts wagered, the interactive game outcomes, wagering outcomes, average wager components and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for an interactive game, a secondary game or both. In another embodiment, the game program may be executable as a secondary game to be played simultaneous with the play of an interactive game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager component may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a wagering outcome or a bonus game outcome. In other embodiments, the progressive award triggering event or qualifying condition may be by exceeding a certain amount of game play (such as number of games or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any game. That is, a player is provided a progressive award without any explanation or alternatively with simple explanations. In another embodiment, a player is provided a progressive award at least partially based on a game triggered or symbol triggered event, such as at least partially based on the play of a game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount (i.e., the player need not place the maximum bet and the side bet to be eligible to win one of the progressive awards). In one such embodiment, the greater the player's wager or wager component (in addition to the placed side bet), the greater the odds or probability that the player will win one of the progressive awards. It should be appreciated that one or more of the progressive awards may each be funded, at least in part, based on the wager components, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager component level is required for a gaming device to qualify to be selected to obtain one of the progressive awards. In one embodiment, this minimum wager component level is the maximum wager level in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Interactive Game with Wager Triggering Events

One embodiment of the present disclosure provides an interactive game involving skill, partial skill or pseudo skill requiring one or more player inputs. The player inputs result in an interactive game outcome. The gaming machine or the player selects a wager component amount for the gaming machine to automatically wager one or more times. During play of the interactive game, upon the occurrence of each wager triggering event, the gaming machine causes a wagering event to occur. For each of the wagering events, the gaming machine randomly determines a wagering outcome for the player. The gaming machine provides the players awards or prizes based on the wagering outcomes during the interactive game. Upon an interactive game outcome triggering event or upon the end of the interactive game, in one embodiment if the interactive game outcome meets certain criteria, the gaming machine provides the player with an award from marketing dollars.

Figure 3:
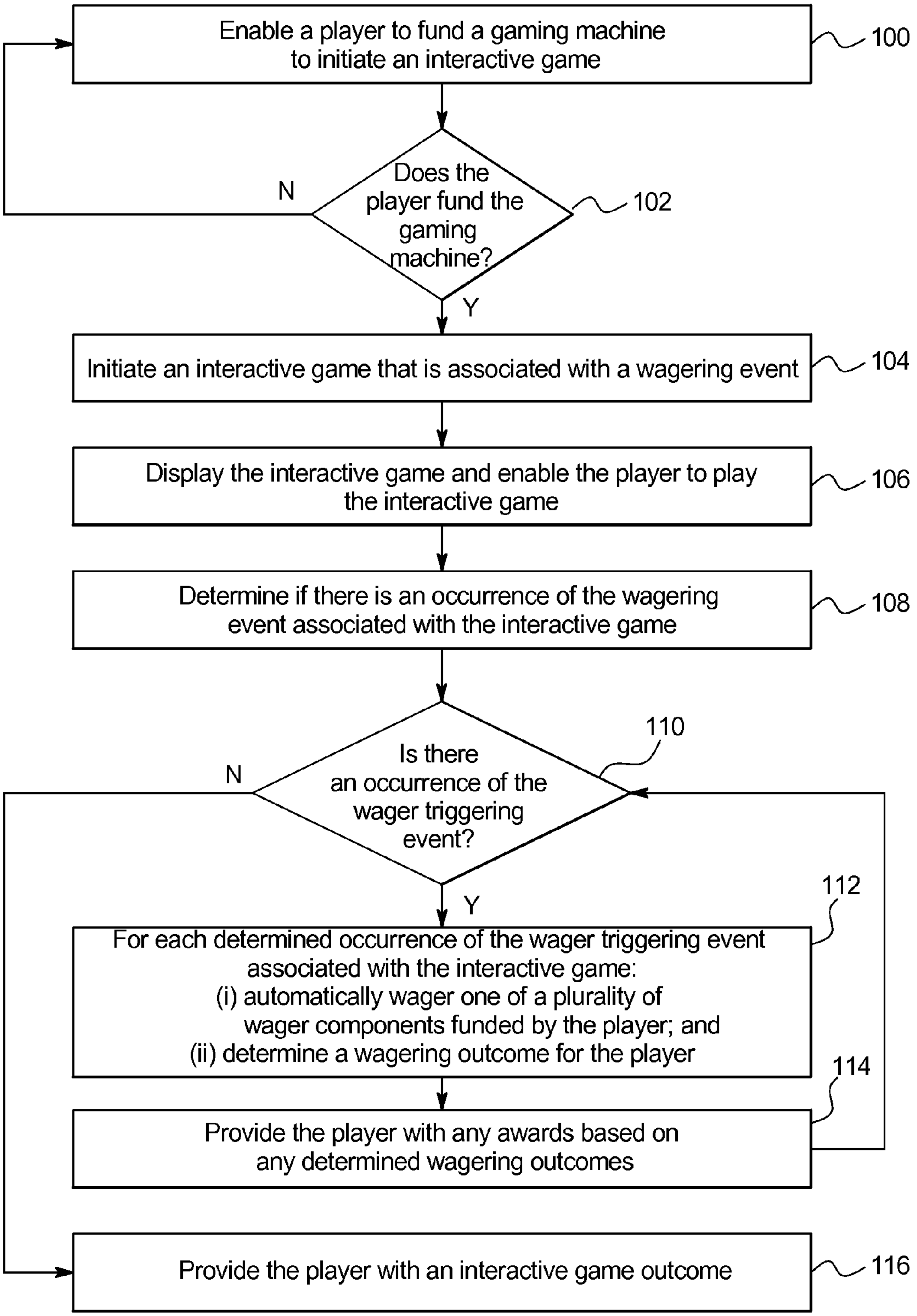
FIG. 3 is a flow chart of the method of one embodiment of the present disclosure.

Referring now to FIG. 3, in one embodiment, a gaming system enables a player to fund the gaming machine to initiate an interactive game as illustrated in block 100. The gaming system determines if the player funds the gaming machine as illustrated in diamond 102. If the player does not fund the gaming machine, the gaming system further enables a player to fund the gaming machine to initiate an interactive game, as illustrated in block 100. If the player funds the gaming machine, the gaming system initiates an interactive game that is associated with a triggering event as illustrated in block 104. The gaming system displays the interactive game and enables the player to play the interactive game as illustrated in block 106, while continuing to provide the interactive game the gaming system determines if there is an occurrence of the wager triggering event associated with the interactive game as illustrated in diamond 108. If there is not an occurrence of the wager triggering event, the gaming system provides the player with an interactive game outcome as illustrated in block 116. If there is an occurrence of the wager triggering event, for each occurrence of the wager triggering event, the gaming system automatically causes placement of one of a plurality of wager components funded by the player and determines a wagering outcome for the player as illustrated in block 112. This occurs while the interactive game continues. In one embodiment, the gaming system provides the player with any awards based on any determined wagering outcomes as illustrated in block 114. It should be appreciated that the gaming system may provide the player with awards based on the determined wagering outcomes as the awards are won or at the end of the interactive game. The gaming system continues to determine if there is an occurrence of the wager triggering event, as illustrated in diamond 110. When there are not any more occurrences of the wagering triggering event, the gaming system provides the player with an interactive game outcome as illustrated in block 116. It should be appreciated that the interactive game outcome may be any suitable outcome. The interactive game outcome may be determined based on any suitable factor such as points obtained in the interactive game. The interactive game outcome may be additionally based on the outcomes of other players, such as a rank based on the points obtained by other players in the interactive game.

It should be appreciated that the interactive game and the wagering events may occur in any suitable manner. As illustrated in FIGS. 4A, 4B, 4C, 4D, 4E, 4F, 4G, 4H, 4I and 4J, in one embodiment, at certain stages of the interactive game, which may include one or more wagering events, or upon an occurrence of the wagering event, the gaming machine discontinues play of the interactive game and provides the wagering outcome and/or the current interactive game outcomes to the player. Though in FIGS. 4A to 4J the gaming device stops play of the interactive game to display to the player the wagering outcome between stages of the interactive game, it should be appreciated that in other embodiments the interactive game is continuous or continues during the wagering events. In one such embodiment, the gaming system provides the player all of the wagering outcomes at the end of the interactive game. In another such embodiment, the gaming system updates meters or displays of the wagering awards on a meter or secondary display, as illustrated in FIGS. 5A, 5B, 5C, 5D, 5E, 5F and 5G, but does not interrupt play of the interactive game. It should be appreciated that the wager triggering events may be displayed to the player or not displayed to the player. Likewise, the wagering events may be displayed to the player or not displayed to the player.

Figure 4A:
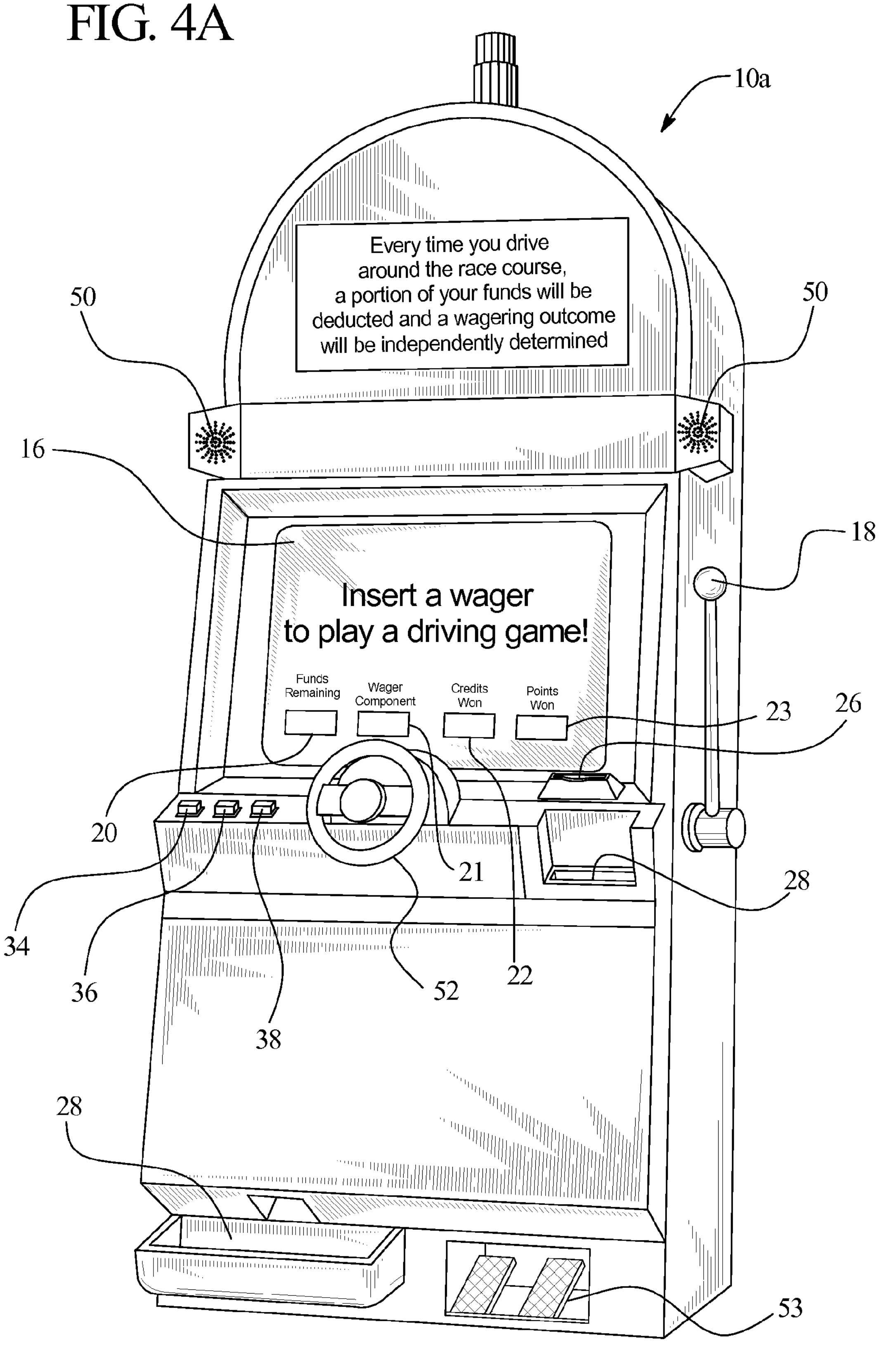
FIG. 4A is a perspective view of one embodiment of an interactive driving game of the present disclosure.

FIGS. 4A, 4B, 4C, 4D, 4E, 4F, 4G, 4H, 4I and 4J illustrate one embodiment of a gaming system including an interactive driving or racing game. The interactive game requires player inputs as in a conventional arcade game, as generally illustrated in FIG. 4A. In this embodiment, the gaming system enables the player to make an input at the gaming device to choose the amount of each of the wager components. In one embodiment, each of the wager components are the same. In other embodiments, one or more of the wager components may vary. In this embodiment, the wager triggering event is when the player drives around the race course or a lap around the race course. Upon completing a lap, the gaming device automatically causes placement of the selected wager component. The gaming device randomly determines for the player a wagering outcome for such wagering event.

More specifically, in one embodiment, the gaming device includes a funds remaining display 20, a wager component display 21, a credits won display 22 and a points won display 23. It should be appreciated that the gaming devices may include any suitable number of credit and point displays and meters. The gaming device enables a player to use the steering wheel 52 and other inputs such as pedals 53 to maneuver a on or around the displayed race course in a conventional manner. This interactive game thus requires a plurality of inputs by the player. The gaming device determines the outcome of the interactive game based, at least in part, on the player's performance in the interactive game.

Figure 4B:
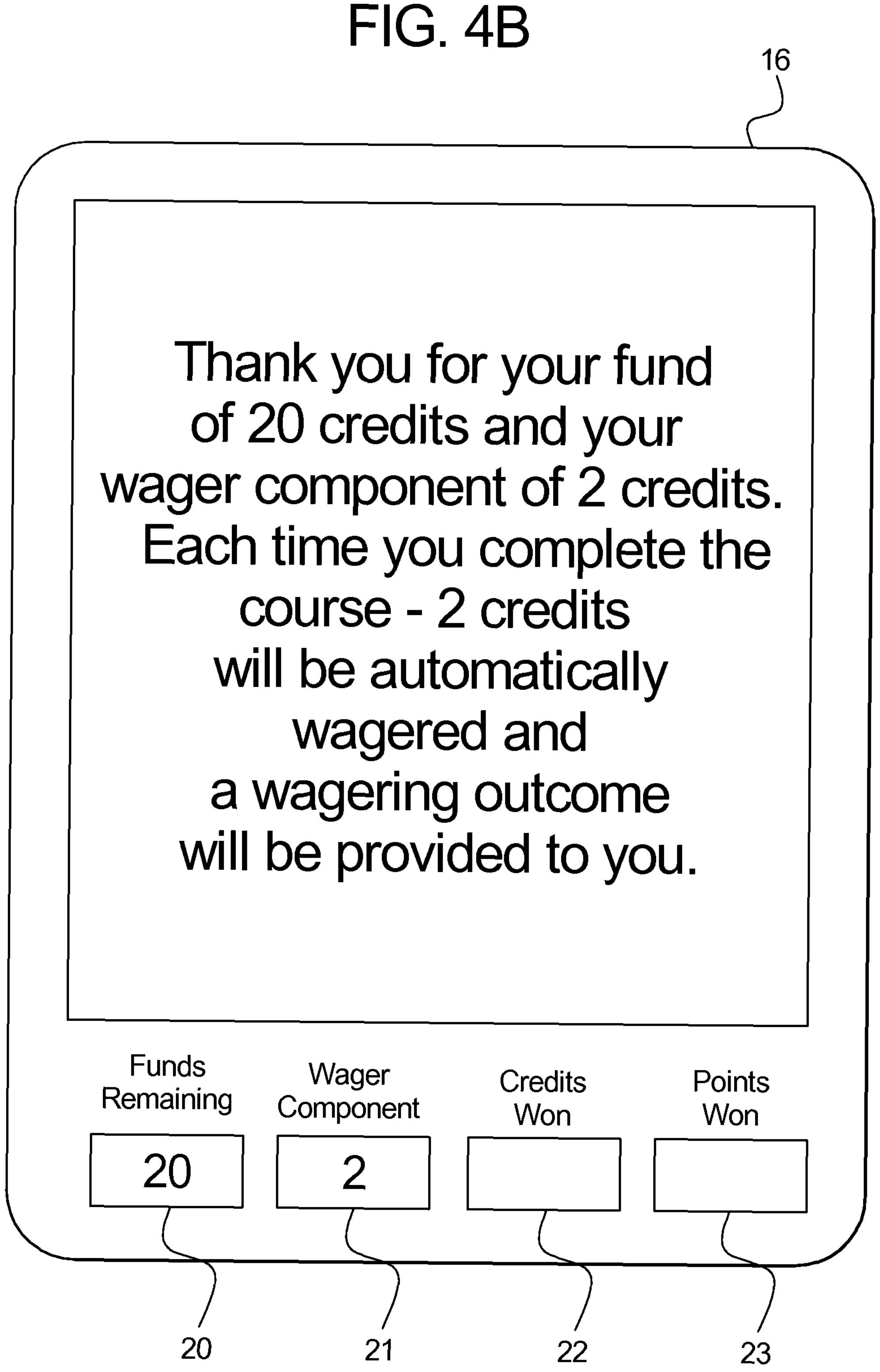
FIGS. 4B, 4C, 4D, 4E, 4F, 4G, 4H, 4I and 4J are screen shots of the interactive driving game of FIG. 4A.

The object of this example of the interactive game is to achieve the highest place finish, such as by being the first car to cross a finish line on the race course without crashing. As illustrated in FIG. 4B, a player funds the gaming machine with 20 credits and selects a wager component of two credits. That is, each time the player completes the course, the gaming device automatically causes the placement of the two credits and randomly determines a wagering outcome.

Figure 4C:
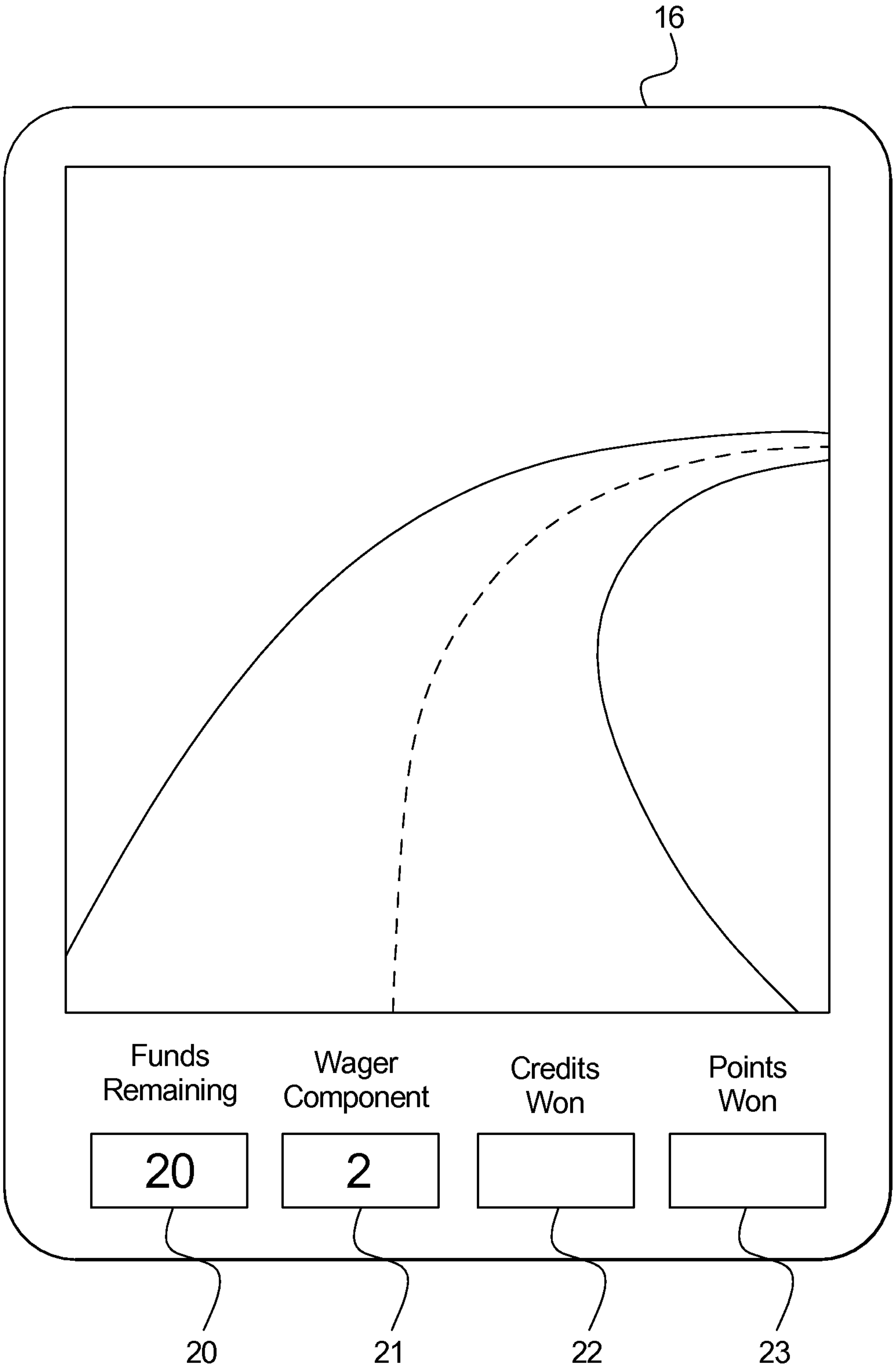
Figure 4D:

The player plays the racing game by using the steering wheel 52 to maneuver on the displayed racetrack. As illustrated in FIG. 4C, in one embodiment, the gaming device displays the race course to the player. In another embodiment, the gaming device displays other vehicles the player is racing against. As illustrated in 4D, the gaming device informs the player that the player finished the first course. The gaming device automatically causes the placement of a two credit wager component and randomly determined that the player's wagering outcome is a winning outcome associated with an award of 10 credits. As illustrated in FIG. 4D, the wager amount display displays a value of 18, and the wager component display displays a value of two. The credits won display displays a value of 10 and the points won display displays a value of 50 because the player won 50 points in the interactive game.

Figure 4E:
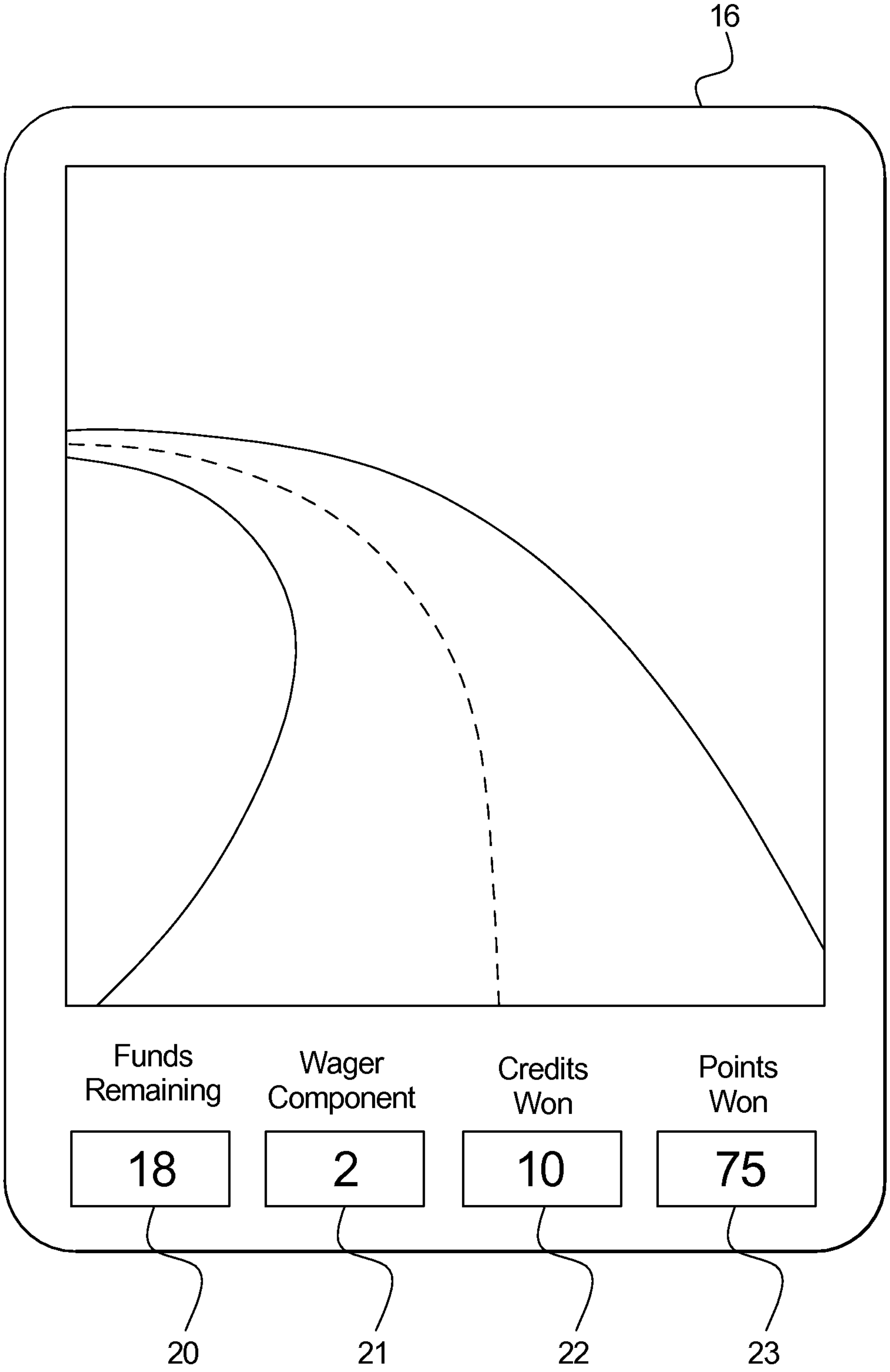
Figure 4F:
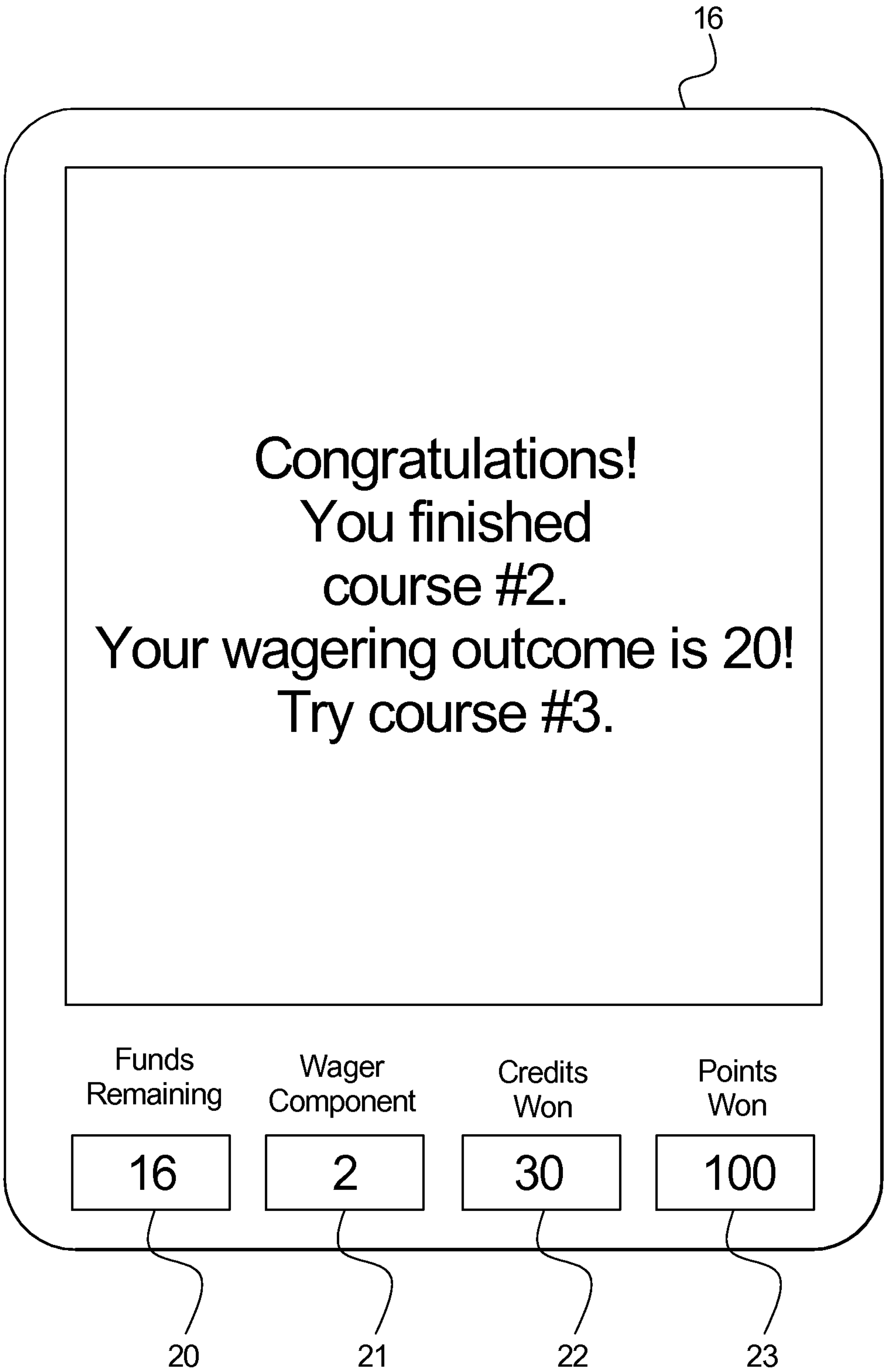

As illustrated in FIG. 4E, the player continues play of the interactive game. The points won display 23 now displays 75 points. As illustrated in FIG. 4F, the player finishes the second course. Therefore, the gaming device automatically causes the placement of the wager component and provides the player with a winning wagering outcome associated with an award of 20 credits. The funds remaining display 20 now displays a value of 16 credits. The wager component display 21 now displays a value of 2 credits. The credits won display 22 now displays a value of 30 credits and the points won display 23 now displays a value of 100 points.

Figure 4G:
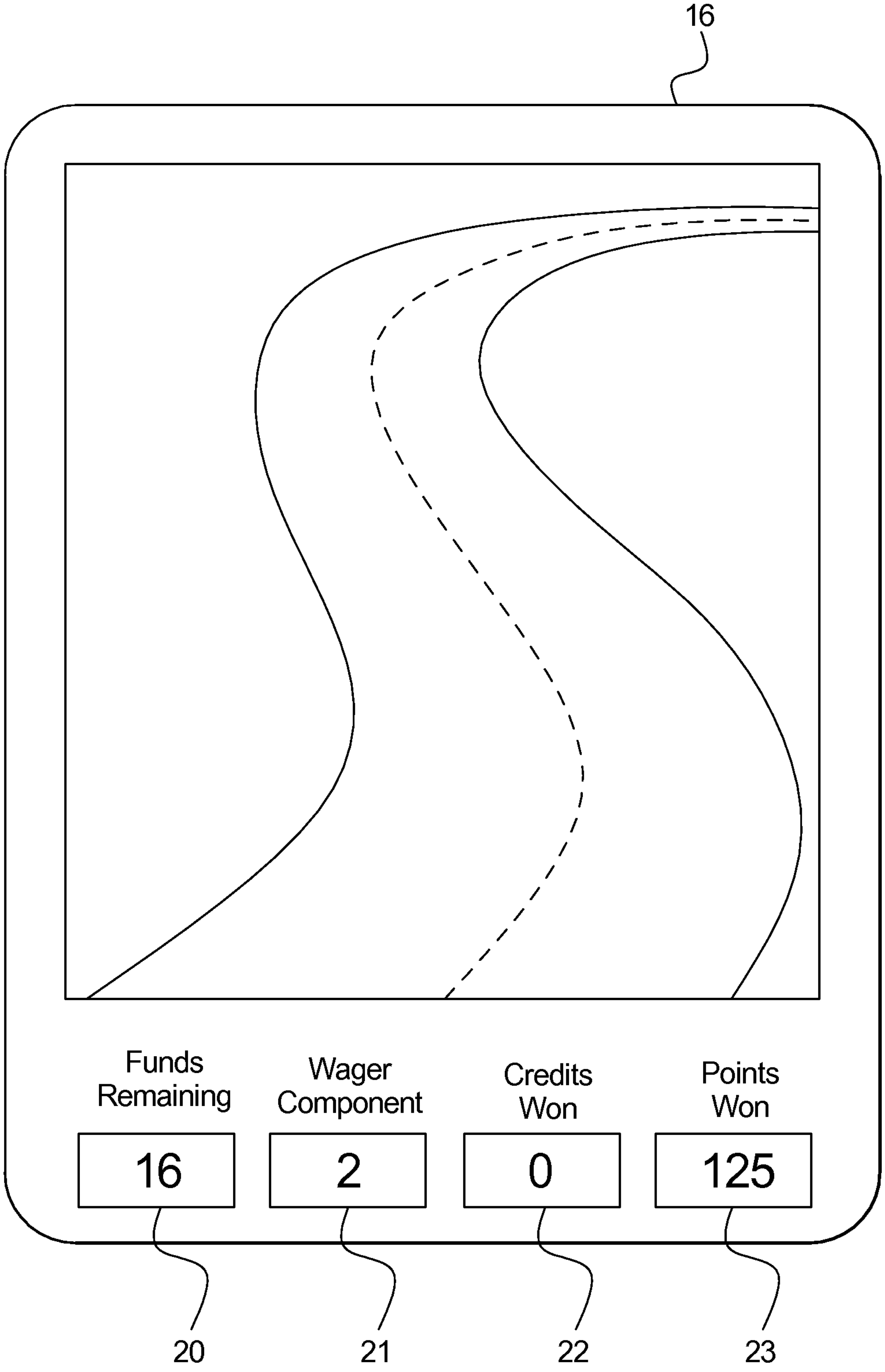
Figure 4H:

As illustrated in FIG. 4G, the player continues play of the interactive game. As illustrated in FIG. 4H, the player finishes the third course. Therefore, the gaming device automatically causes the placement of the wager component and provides the player with a winning wagering outcome associated with an award of 8 credits. The funds remaining display 20 now displays a value of 14 credits. The wager component display 21 now displays a value of 2 credits. The credits won display 38 now displays a value of 30 and the points won display 23 now displays a value of 160 points.

Figure 4I:
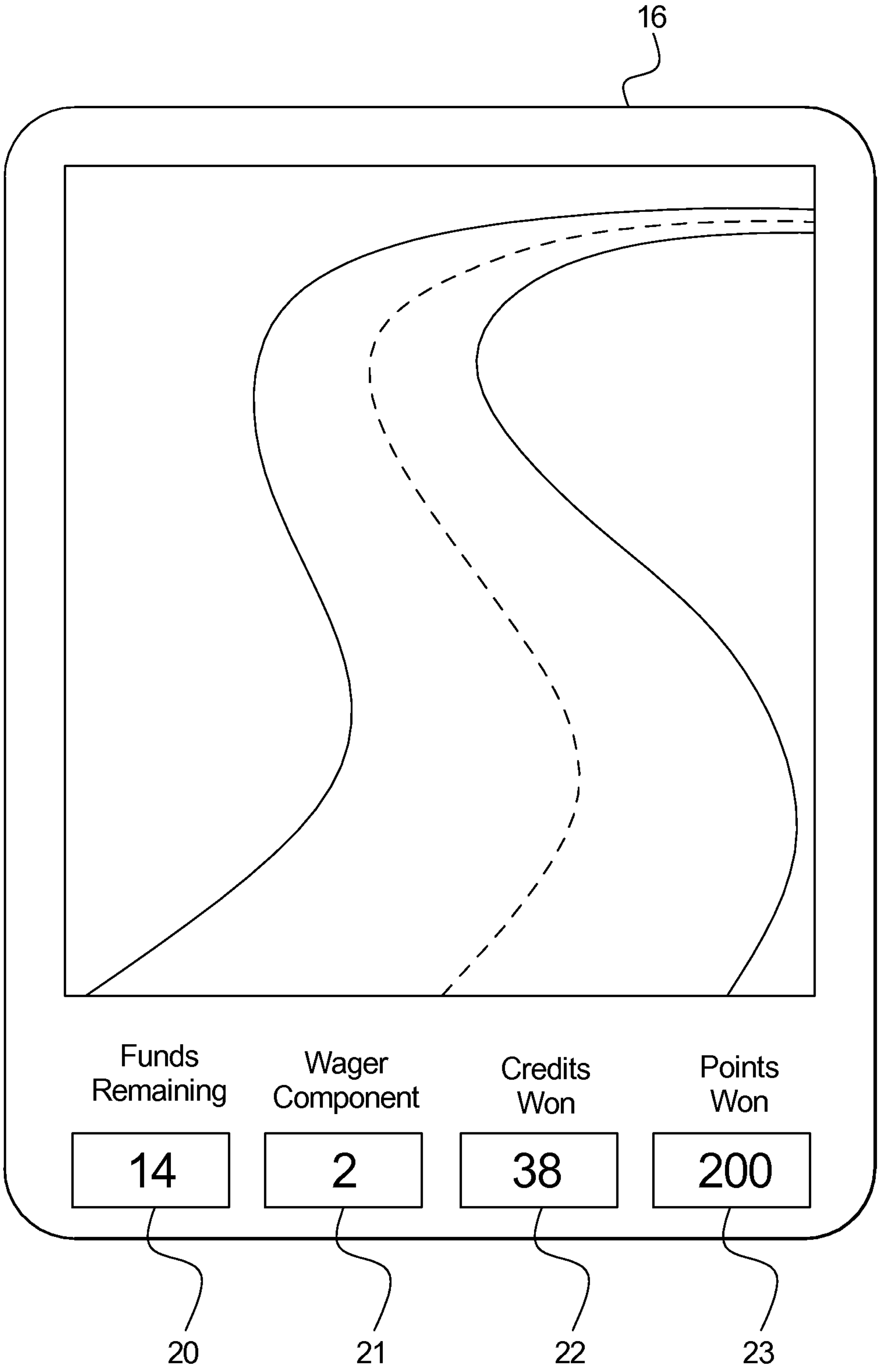
Figure 4J:

As illustrated in FIG. 4I, the player continues play of the interactive game. As illustrated in FIG. 4J, the player does not finish the fourth course. The player crashed. Therefore, the gaming device terminates the interactive game. The funds remaining display 20 now displays a value of 14 credits. The wager component display 21 now displays a value of 2 credits. The credits won display 38 now displays a value of 30 credits and the points won display 23 now displays a value of 160 points.

It should be appreciated that the gaming devices may include any suitable number of meters. In one embodiment, the gaming system or device maintains the total cumulative credits in one meter and the interactive game outcome, such as a number of points, in a separate meter. The interactive game and the wagering outcomes are therefore completely independent. In another embodiment, the gaming system or device includes a total cumulative credits meter or a funds remaining or a stakes remaining meter, a wager component meter and a separate points meter.

In another embodiment, the gaming system or machine provides one or more awards to a player based on the interactive game outcome. The gaming system or device may reward the player in any suitable manner.

Now referring to FIGS. 5A, 5B, 5C, 5D, 5E, 5F and 5G, in one embodiment, the gaming system includes a plurality of gaming devices and a common display or a leaderboard. Each of the gaming devices includes an interactive game. In this illustrated embodiment, the interactive game is a driving game. When a player funds one of the gaming devices, the gaming device enables the player to play the interactive game.

In this illustrated embodiment, the wager triggering event is a time period of two seconds. In one embodiment, every time two seconds passes during play of the interactive game, the gaming device automatically causes the placement of 1 credit wager component and determines for the player a wagering outcome. The gaming device determines the wagering outcome independently from the interactive driving game. If the interactive game rank is high enough, the gaming system displays the player's name on the common display or leaderboard. Randomly or upon the occurrence of a triggering event, the gaming system provides one, a plurality or all of the players on the leaderboard prizes with marketing dollars based on results of the interactive game.

As illustrated in FIGS. 5A, 5B, 5C, 5D, 5E, 5F and 5G, each of the gaming machines 104*a*, 104*b* and 104*c* is in attract mode informing the players to play the interactive game. The leaderboard or the central display 102 displays the top five players of the interactive game. For example, Joe is #1 and Kara is #2. In this embodiment, once in a time interval, such as every day, the gaming system provides the #1 ranked player an award of $100, the #2 ranked player an award of $50, the #3 ranked player an award of $25, the #4 ranked player an award of $10, and the #5 ranked player an award of $5. In this embodiment, these awards are funded by marketing or advertising dollars accounts. That is, in one embodiment, unlike the interactive game outcome awards, the wager triggering event and wagering outcome and awards are associated with a paytable that has a predetermined payback percentage, such as 91%. That is, on average 91% of the money wagered will be won back by the player in the form of wagering outcome awards. The funding for the interactive game is from the gaming establishment's own marketing budget. That is, it is not a predetermined average percentage of the amount wagered that the gaming establishment is required to payback to the players; it is a form of advertising. Therefore, the paytable for the wager triggering event and outcome remains the same as a conventional paytable and is not changed. In one embodiment, the marketing dollars that fund interactive game awards may be based on coin-in or wagers-in. That is, the marketing dollars may be based on wagers made by players but are not required to be paid back to players. For example, if the gaming machines pay back on average 91% of coin-in or wagers-in, the gaming machines may pay an additional 1% back of coin-in or wagers-in to the players in marketing dollars for interactive game awards. That is, the gaming establishment is paying back 92% of the coin-in to the players but 1% of that 92% is by choice. This extra percentage of coin-in or wagers-in is profit for the gaming establishment that they may choose to pay back to the players but are not required to pay back to the players.

Figure 5A:
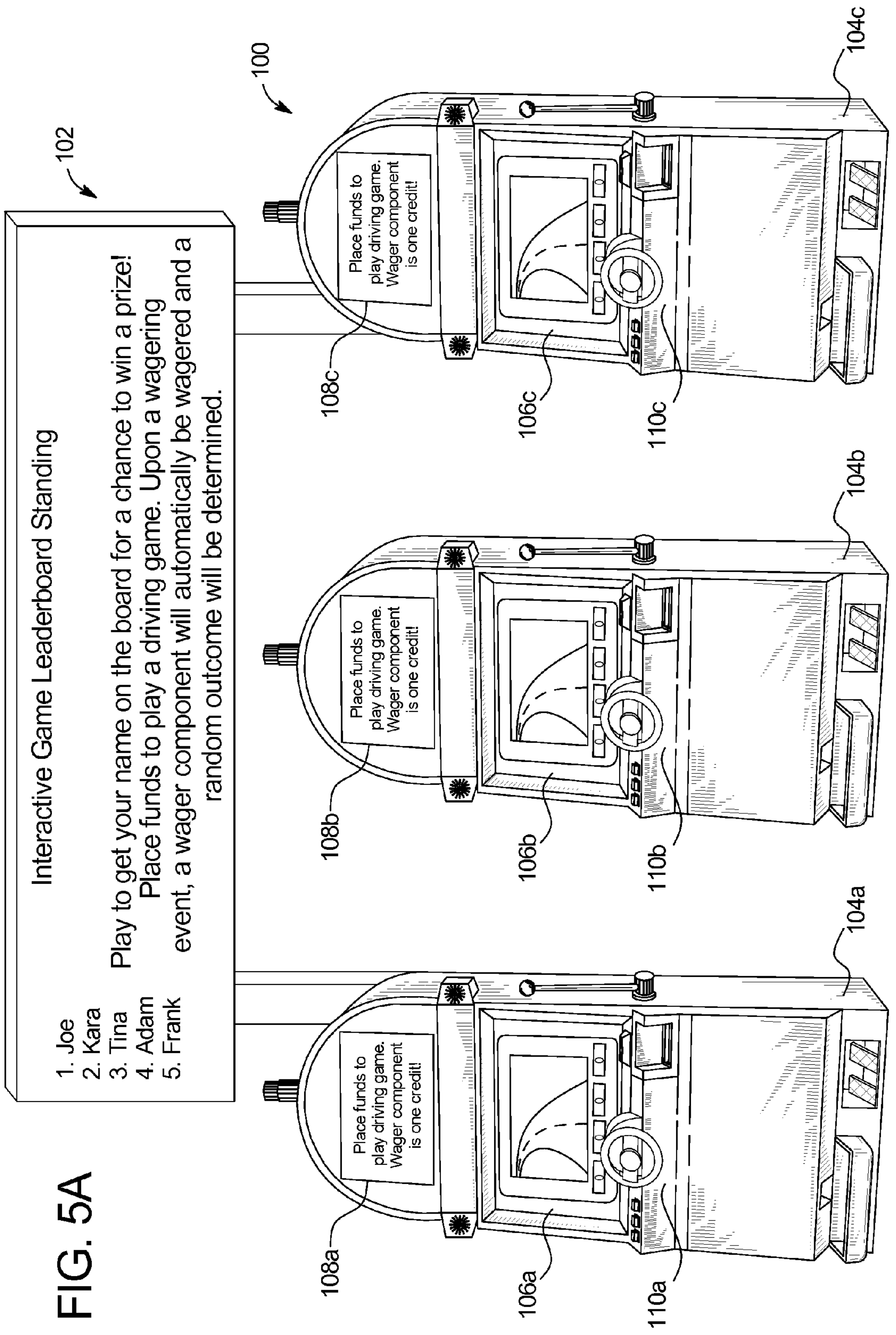
FIGS. 5A, 5B, 5C, 5D, 5E, 5F and 5G are perspective views of the common display and of the gaming devices of one embodiment of the gaming system.
Figure 5B:
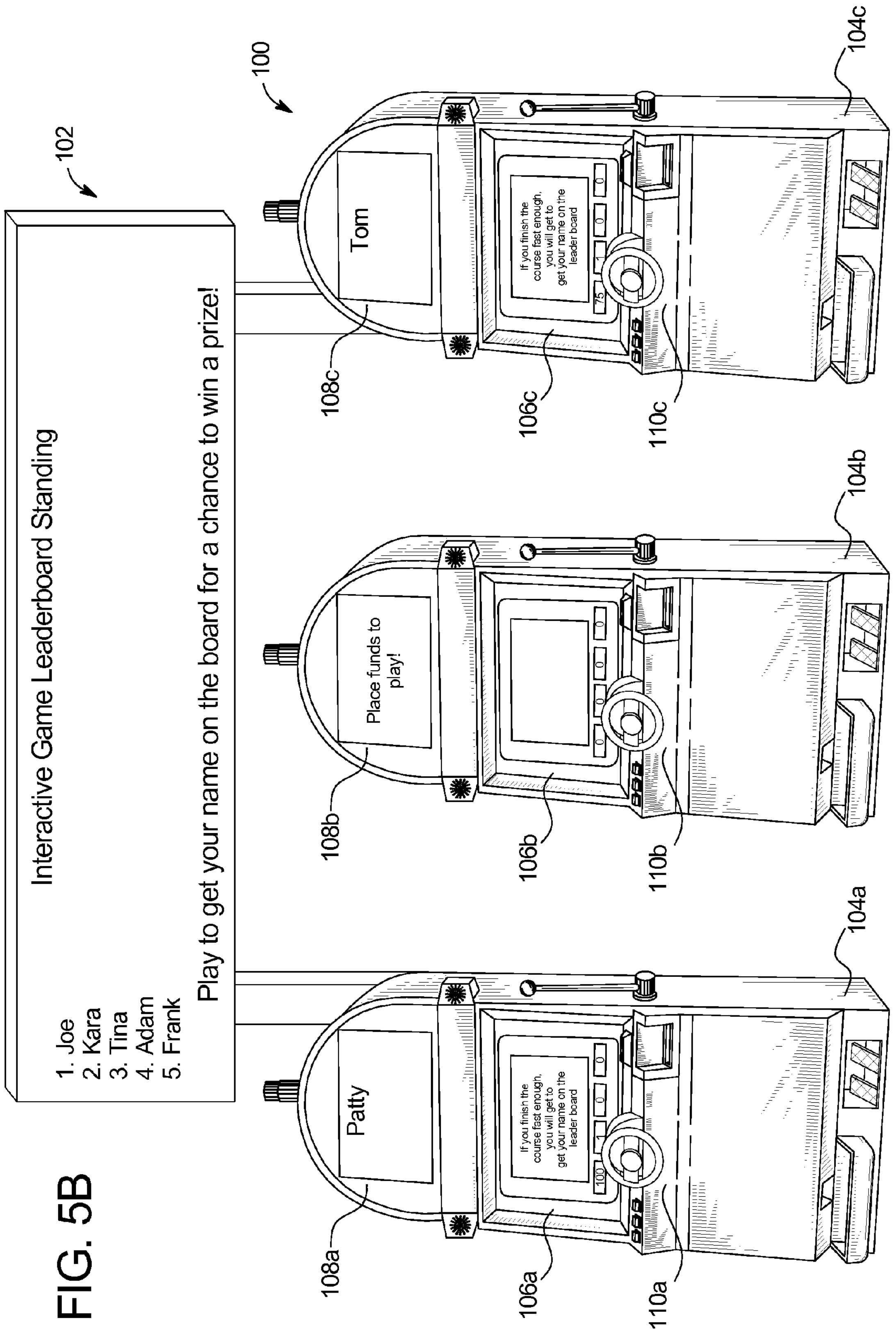

A player at the first gaming machine 104*a* and a player at the third gaming machine 104*c* fund the gaming machine (not illustrated). As illustrated in FIG. 5B, the second display of each of the gaming machines 108*a* and 108*c* respectively, displays the player's name. If the player finish's the course fast enough, the player has a chance for his or her name to be on the leaderboard 102. In this embodiment, at a random time of the day, the gaming system awards the ranked players of the leaderboard with a monetary prize, as described above. Upon awarding the players a prize, in one embodiment, the gaming system resets the leaderboard.

Figure 5C:
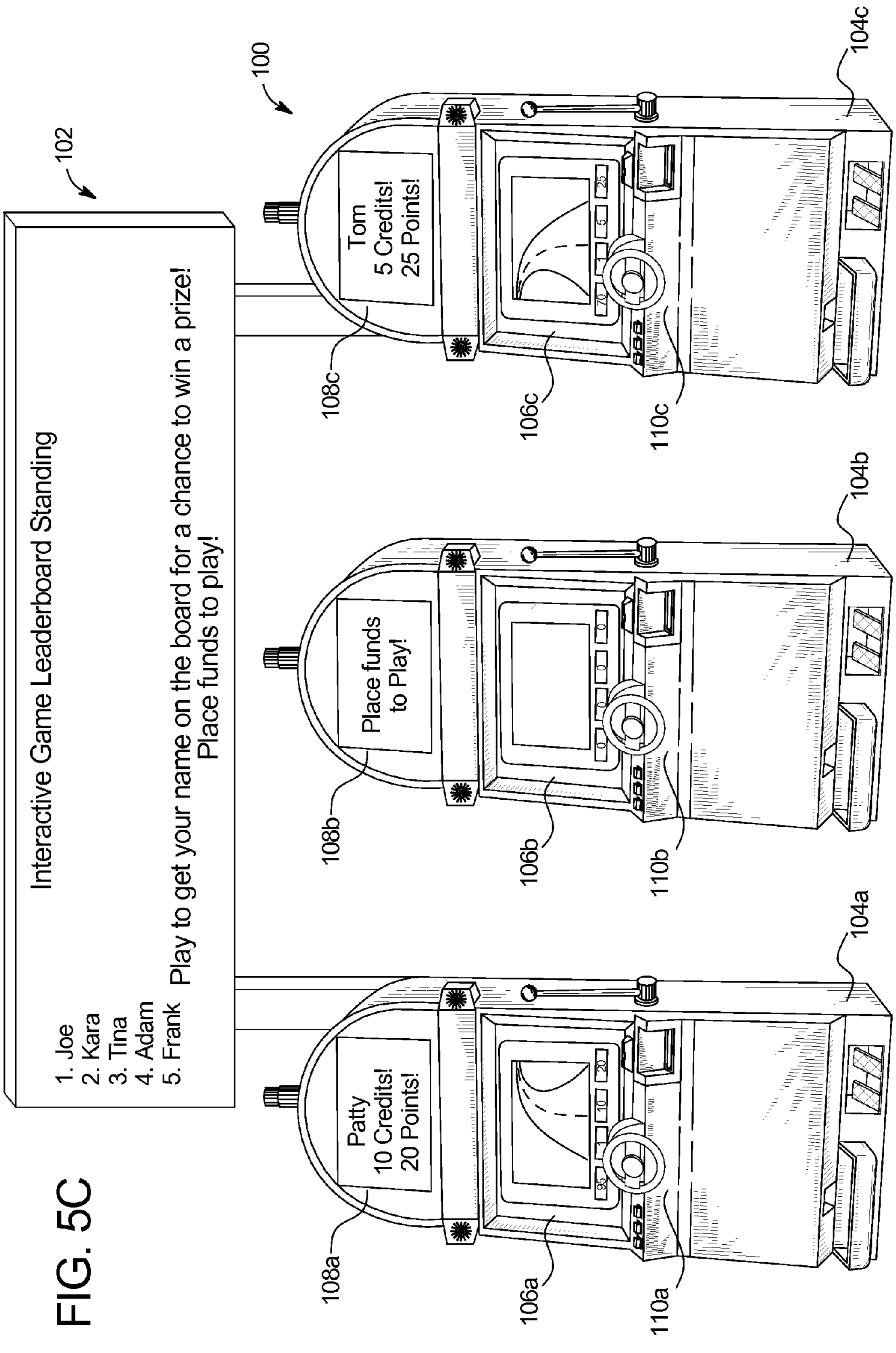
Figure 5D:
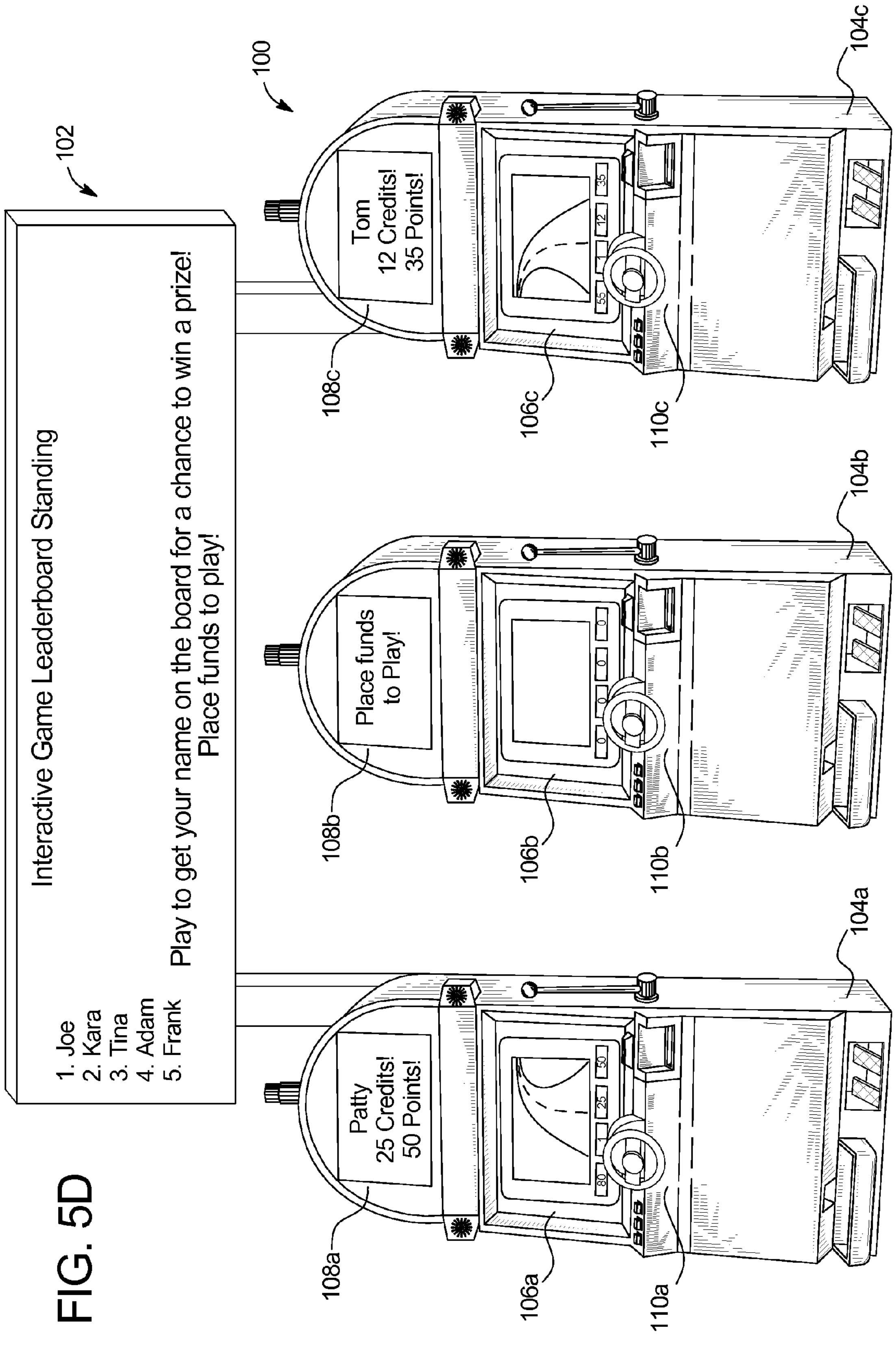

As illustrated in FIG. 5C, each of the players of the gaming machines 104*a* and 104*c* play a driving game. The players use the attached steering wheels, 110*a* and 110*c* respectively, to control or maneuver on the racetrack in an attempt to reach the finish line under a designated amount of time. As illustrated in FIG. 5C, the gaming machines 104*a* and 104*c* display the current totals of the gaming machine. The player of the first gaming machine, Patty, won 10 credits and 20 points. The player of the last gaming machine 104*c*, Tom, won five credits and 25 points. As illustrated in FIG. 5C, the driving game is continuous. In the illustrated embodiment, the wagering event occurs without interrupting play of the interactive game, and the secondary display 108*a* and 108*c* displays the points and wagering outcomes. In other embodiments, the points and wagering outcomes are displayed on the meters only. As illustrated in FIG. 5D, Patty has won 25 credits and 50 points. Tom has won 12 credits and 35 points.

Figure 5E:
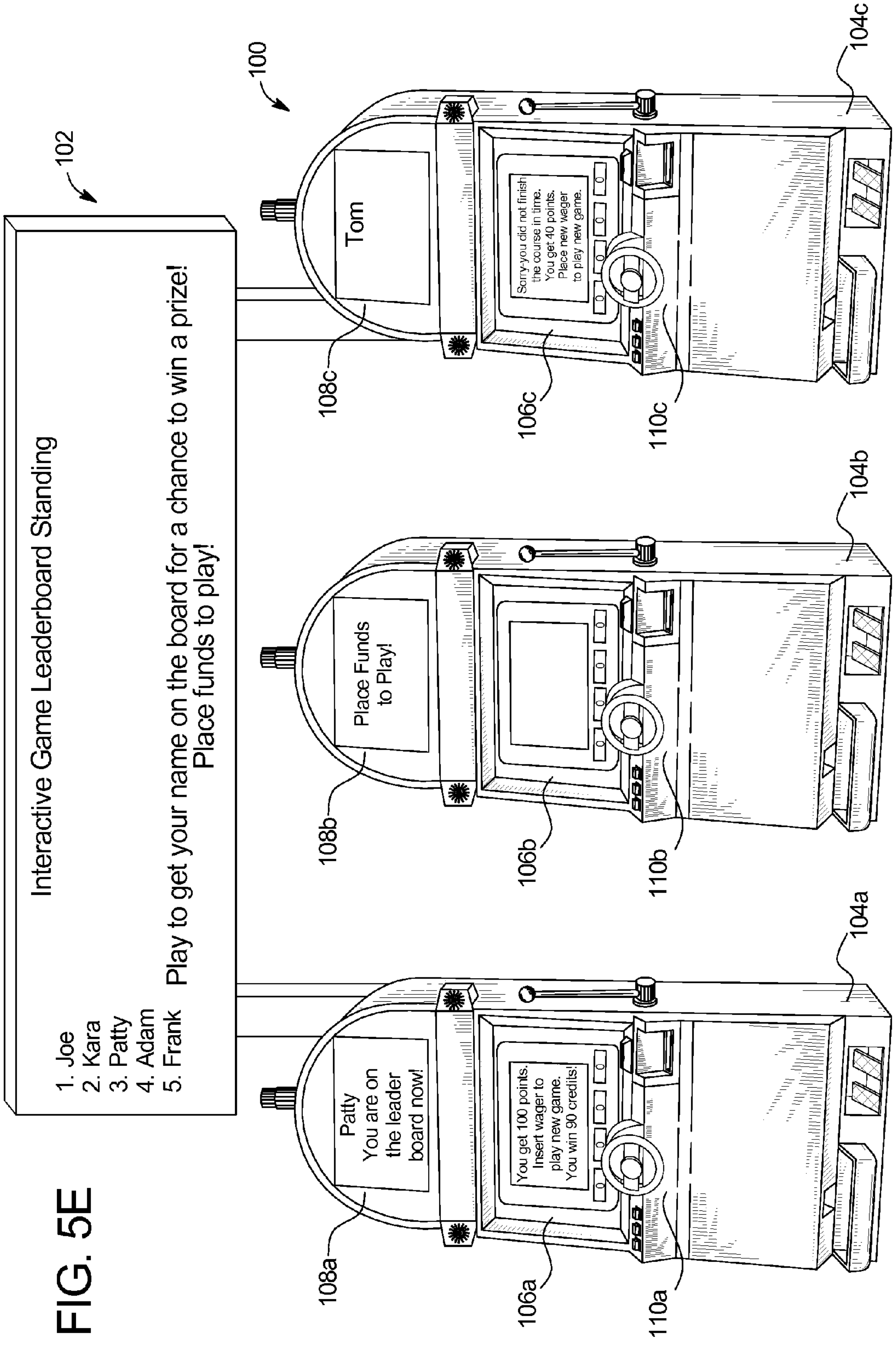
Figure 5F:
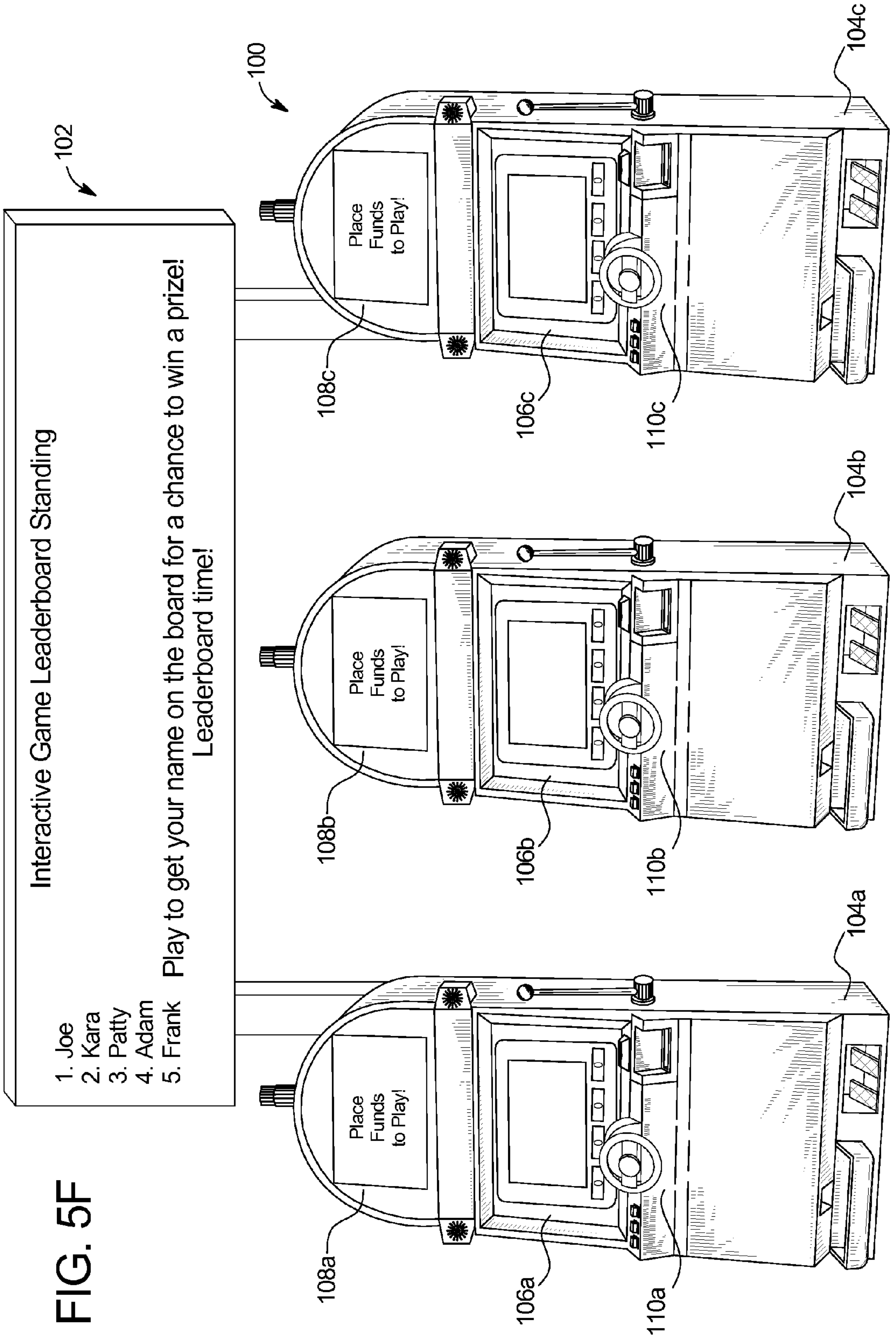

As illustrated in FIG. 5E, the players' interactive games end. Patty has the #3 spot on the leaderboard. That is, Patty is ranked #3 out of all of the players in the interactive game. As illustrated in FIG. 5F, the gaming system enables the players to play again to try to win wagering outcome awards and to get their name on the leaderboard or improve their rank.

Figure 5G:
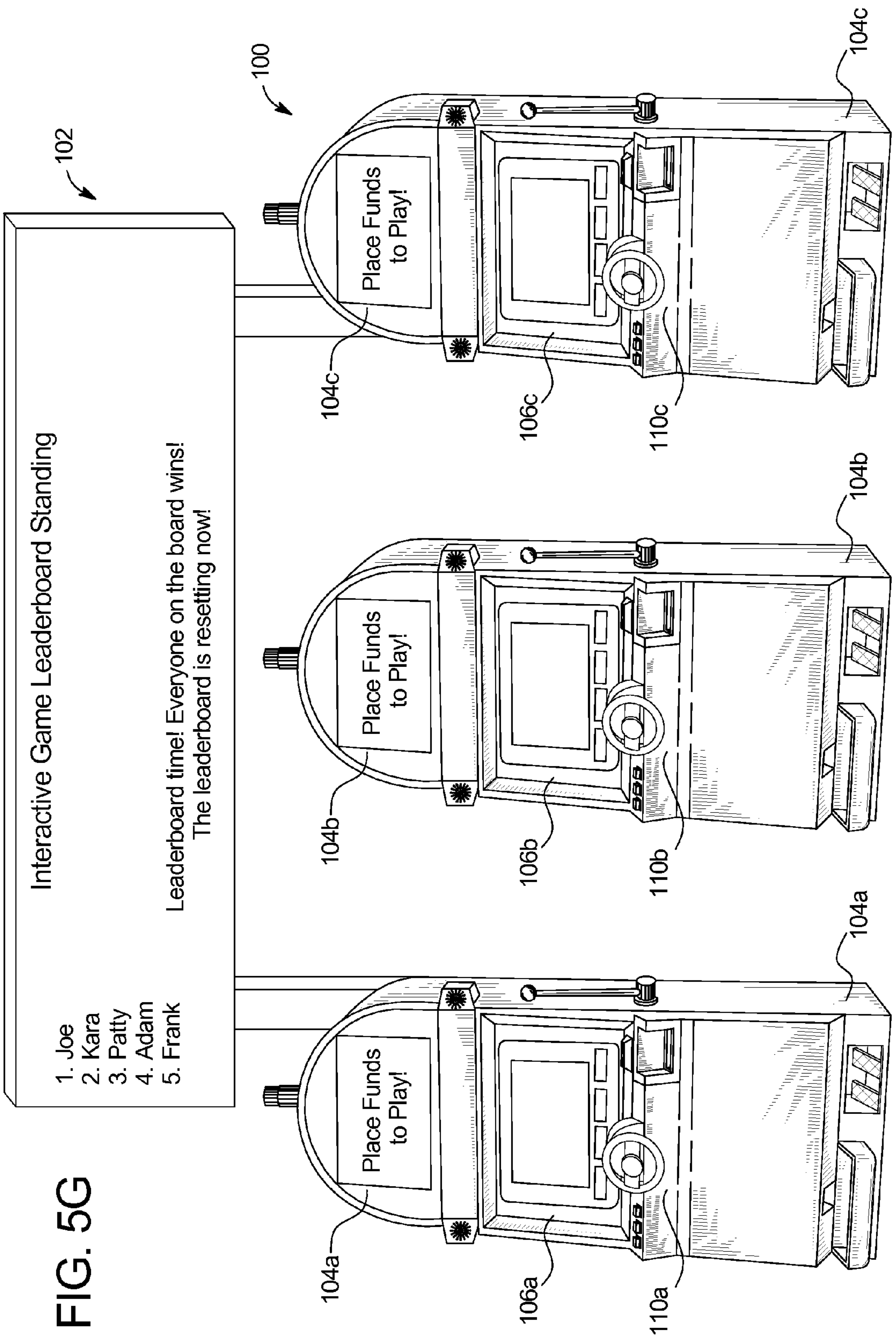

As illustrated in FIG. 5G, the leaderboard 102 informs the players that everyone on the leaderboard wins a prize. That is, in one embodiment, during this 24 hour time period, the gaming system randomly determines that it is time to reward the top ranked players with awards from a marketing account. Therefore, the top five ranked players each receive the awards. It should be appreciated that any number of suitable players may receive an award from a marketing account based on any suitable event.

Figure 6A:
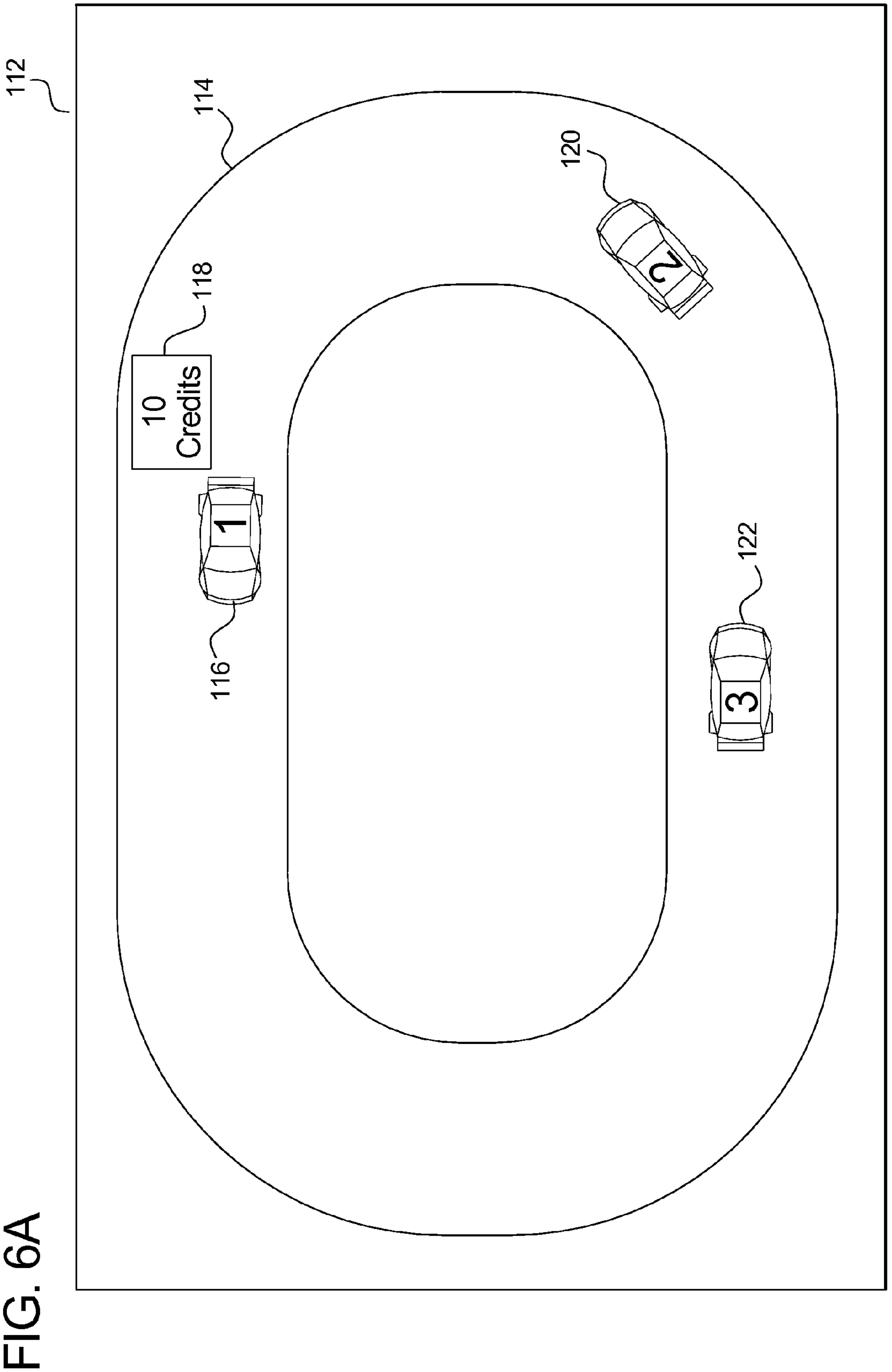
FIGS. 6A and 6B are top perspective view displaying the wagering awards displayed in association with the player's symbol in the interactive game.
Figure 6B:
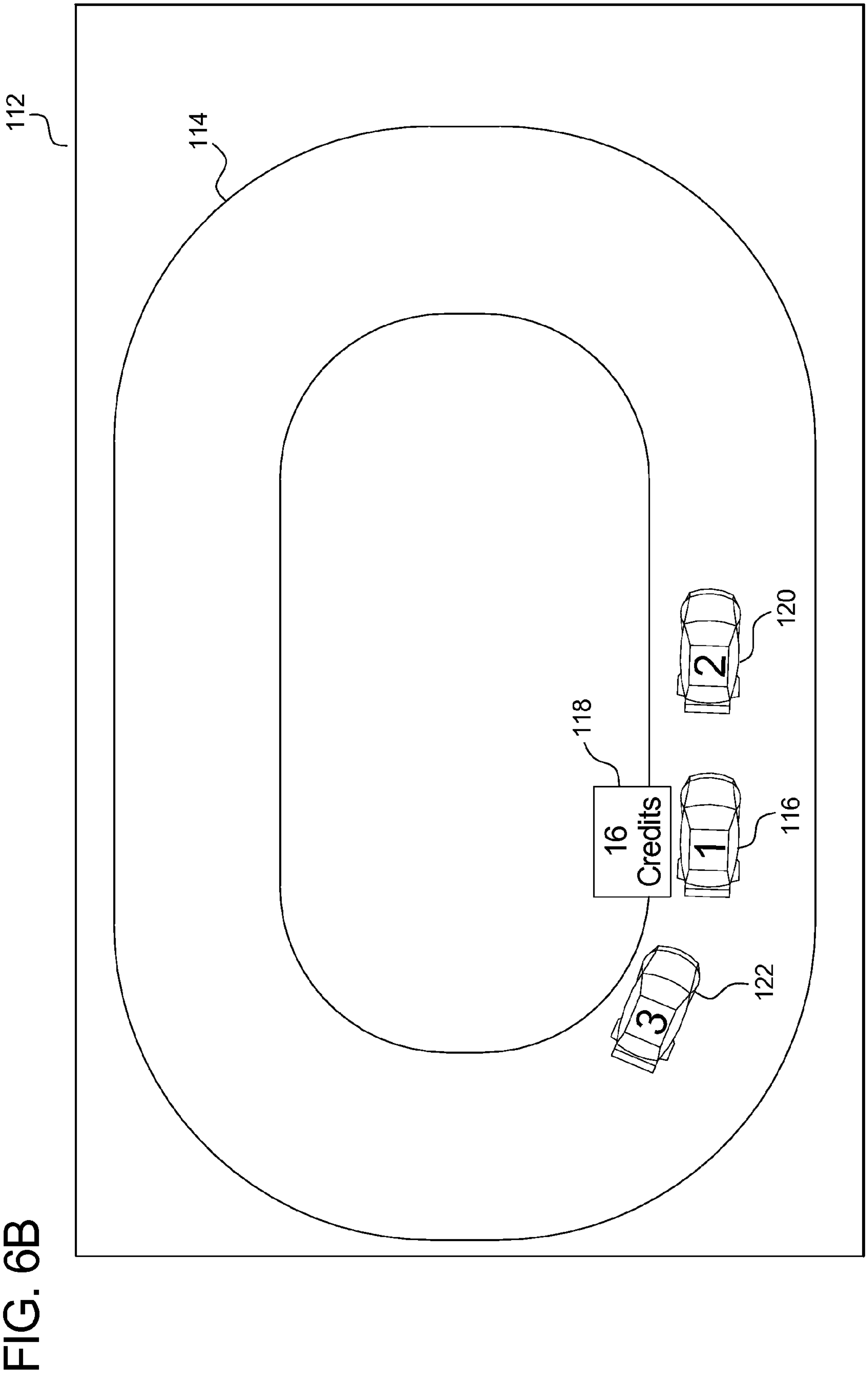

It should be appreciated that the gaming machines may display the meters in any suitable manner. As illustrated in FIGS. 6A and 6B, in one embodiment, the gaming machines display the wagering award total meter in association with the interactive game. FIGS. 6A and 6B illustrate an enlarged top perspective view of a display device 112 that displays a racetrack 112 and plurality of vehicles, the player's symbol, car #1 116, car #2 120 and car #3 122 in a race. The gaming machine displays the total wagering awards for the player in a display 118 that moves with the player's symbol. In this embodiment, the amount displayed in the awards display is the wagering awards provided to the player, though it should be appreciated that the gaming machine may display any suitable meters or information in the displays.

As illustrated in FIG. 6A, the display 118 associated with the player symbol 116 displays a wagering award of 10 credits. As illustrated in FIG. 6B, the player continues playing the game. One or more wagering events occur during the play of the interactive game. As illustrated in 6B, the display associated with the player symbol now displays 16 credits.

It should be appreciated that the gaming system may display one or more meters in any suitable manner. In one embodiment, the gaming machine displays one or more meters inside a player symbol or icon. In another embodiment, the gaming machine displays one or more meters in a display associated with a player symbol or icon. In one embodiment, the gaming machine displays wagering outcomes or awards for a certain period of time. For example, when a player wins wagering credits, the gaming machine displays the wins for an amount of time on the display of the interactive game. For example, the gaming machine displays wins in the middle of the racetrack of FIGS. 6A and 6B. It should be appreciated that the gaming machine may display meters, wagering outcomes, interactive game outcomes and any awards associated with wagering awards or interactive game outcomes in any suitable manner.

As illustrated in FIGS. 7A, 7B, 7C, 7D, 7E, 7F, 7G and 7H, in one embodiment, the gaming machine displays one or more wagering awards originating from a same location in the interactive game. When the gaming machine generates a first wagering award, the gaming machine displays the first wagering award in a first location. When the gaming machine generates a second wagering award, the gaming machine displays the first wagering award in a second location and displays the second wagering award at the first location. It should be appreciated that the gaming machine may simultaneously display any suitable number of wagering awards in any suitable arrangement.

Figure 7A:
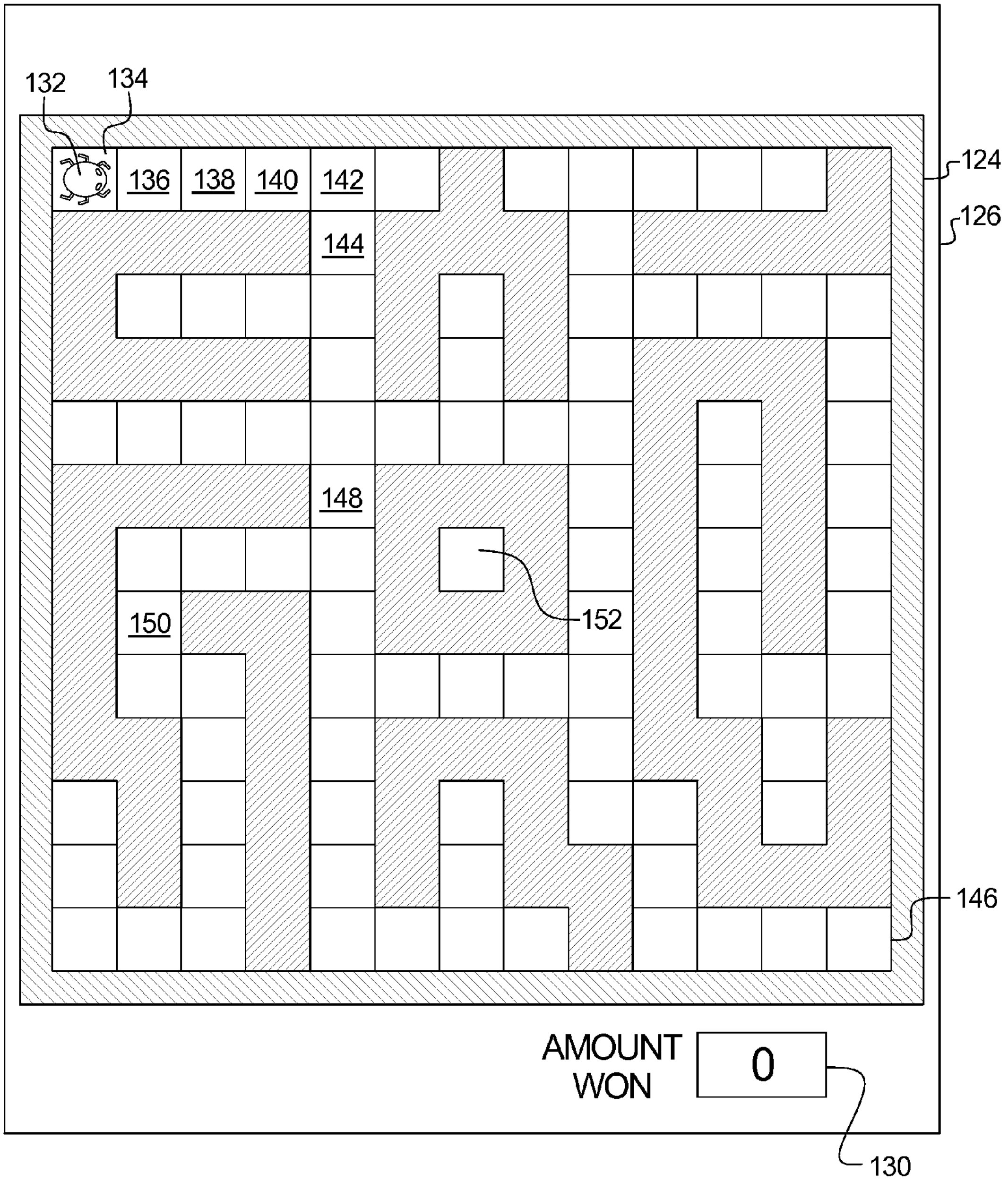
FIGS. 7A, 7B, 7C, 7D, 7E, 7F, 7G and 7H are screen shots of the gaming machine displaying one way of streaming the wagering awards.

FIG. 7A illustrates a beginning of an interactive game 124 and amount won display 130 displayed by the display device 126. The game may be any suitable game. In the illustrated game, the player symbol 132 attempts to reach a certain point or location in the maze interactive game 124. For example, the player symbol 132 must get to a certain square 146 in a time period.

Figure 7B:
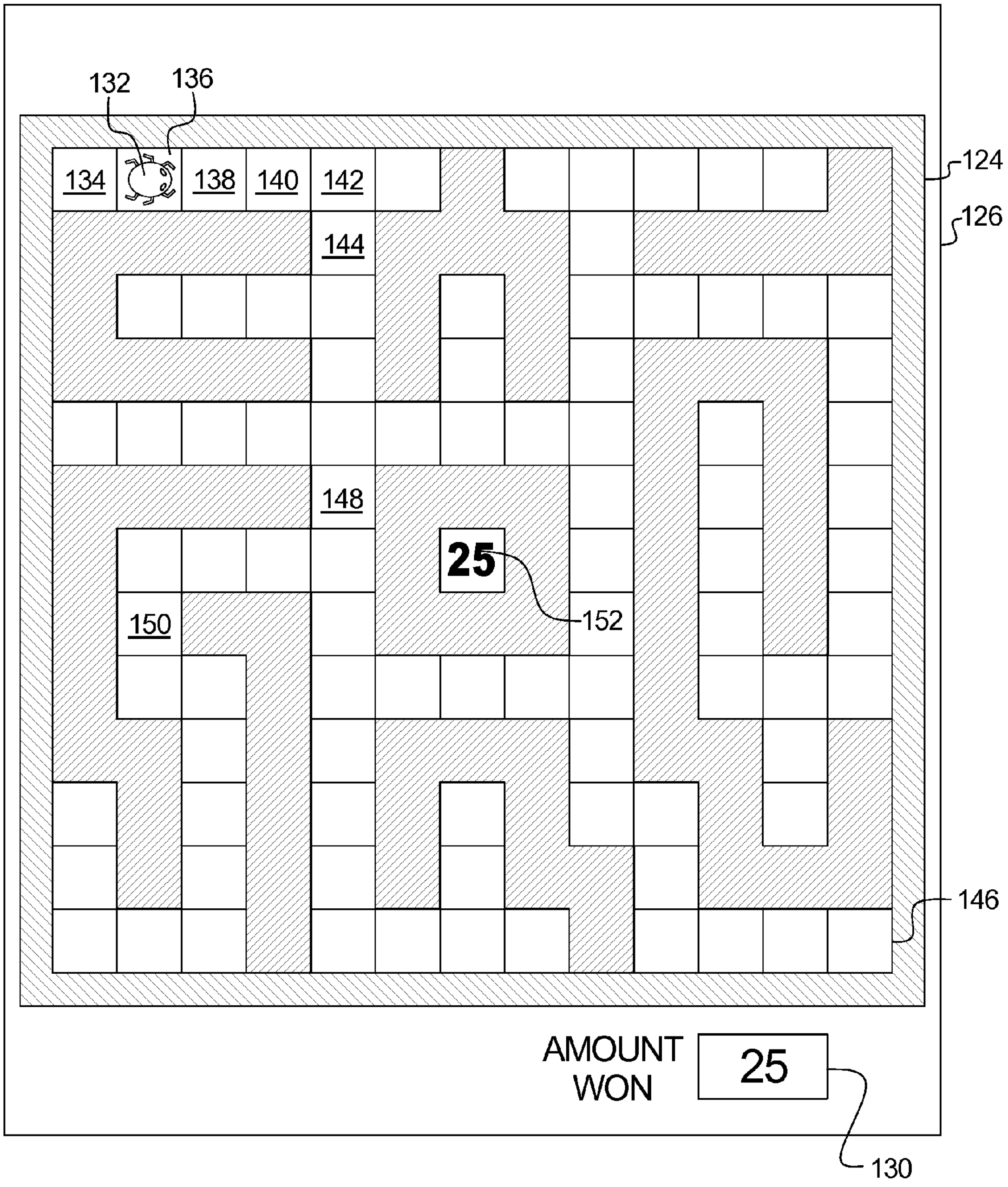
Figure 7C:
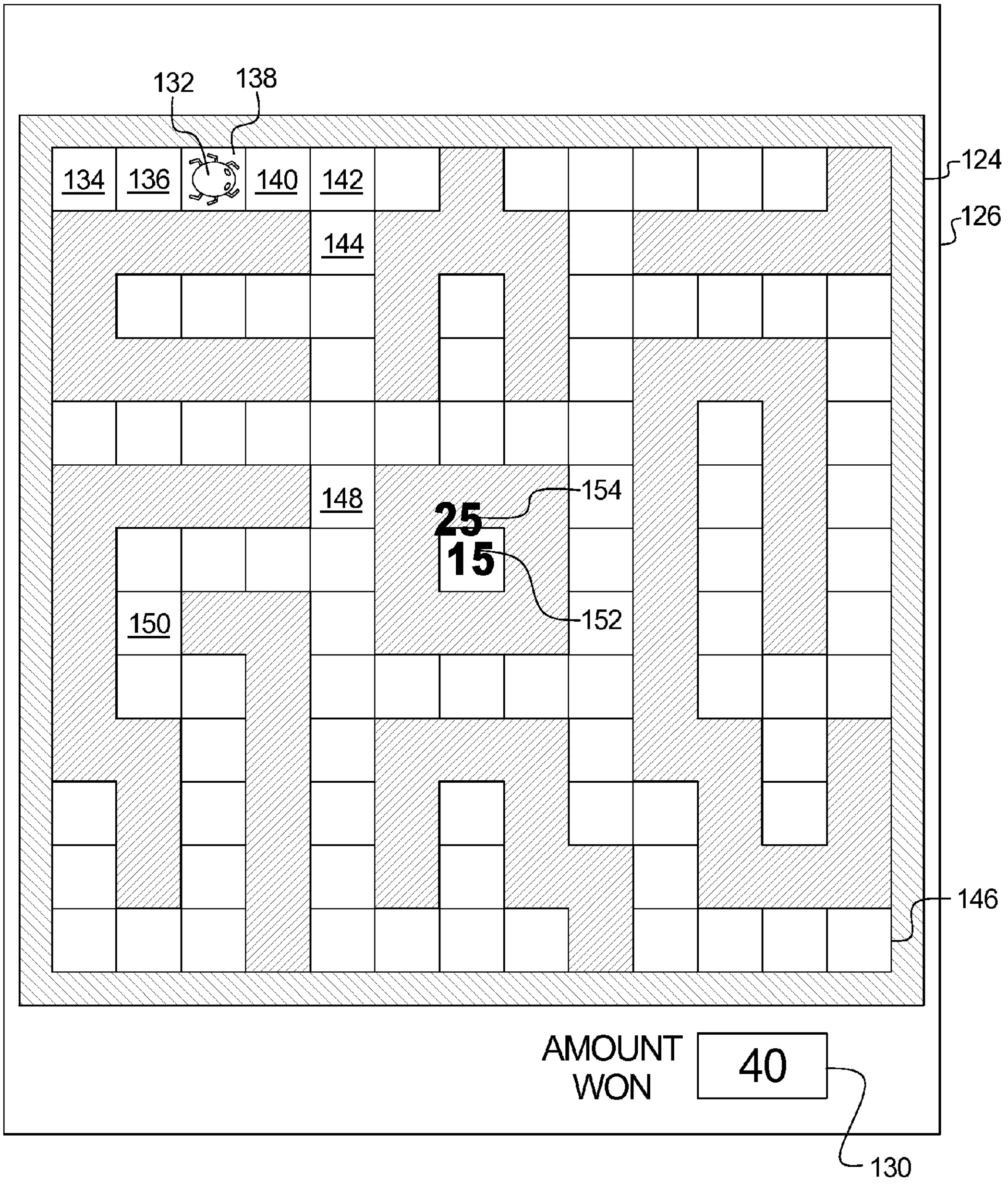

As illustrated in FIG. 7B, in one embodiment, the wager triggering event is the player symbol 132 moving to a new square. For example, the player symbol 132 moves from the first square 134 to the second square 136. The gaming machine independently generates a wagering outcome associated with a wagering award of 25 credits displayed at a first location 152 in the middle of the interactive game. The amount won display displays an award of 25 credits. As illustrated in FIG. 7C, the player symbol 132 moves to a third square 136 causing another wager triggering event. The gaming machine automatically places a wager and determines a wagering outcome associated with a wagering award of 15. The gaming machine displays the first wagering award 25 at a second location 154 and the second wagering award of 15 at the first location 152. That is, the first wagering award moves such that the second wagering award can be displayed in the same spot or location that the first wagering award was initially displayed. In this example, each of the wagering awards originate from or are initially displayed at a same first location.

Figure 7D:
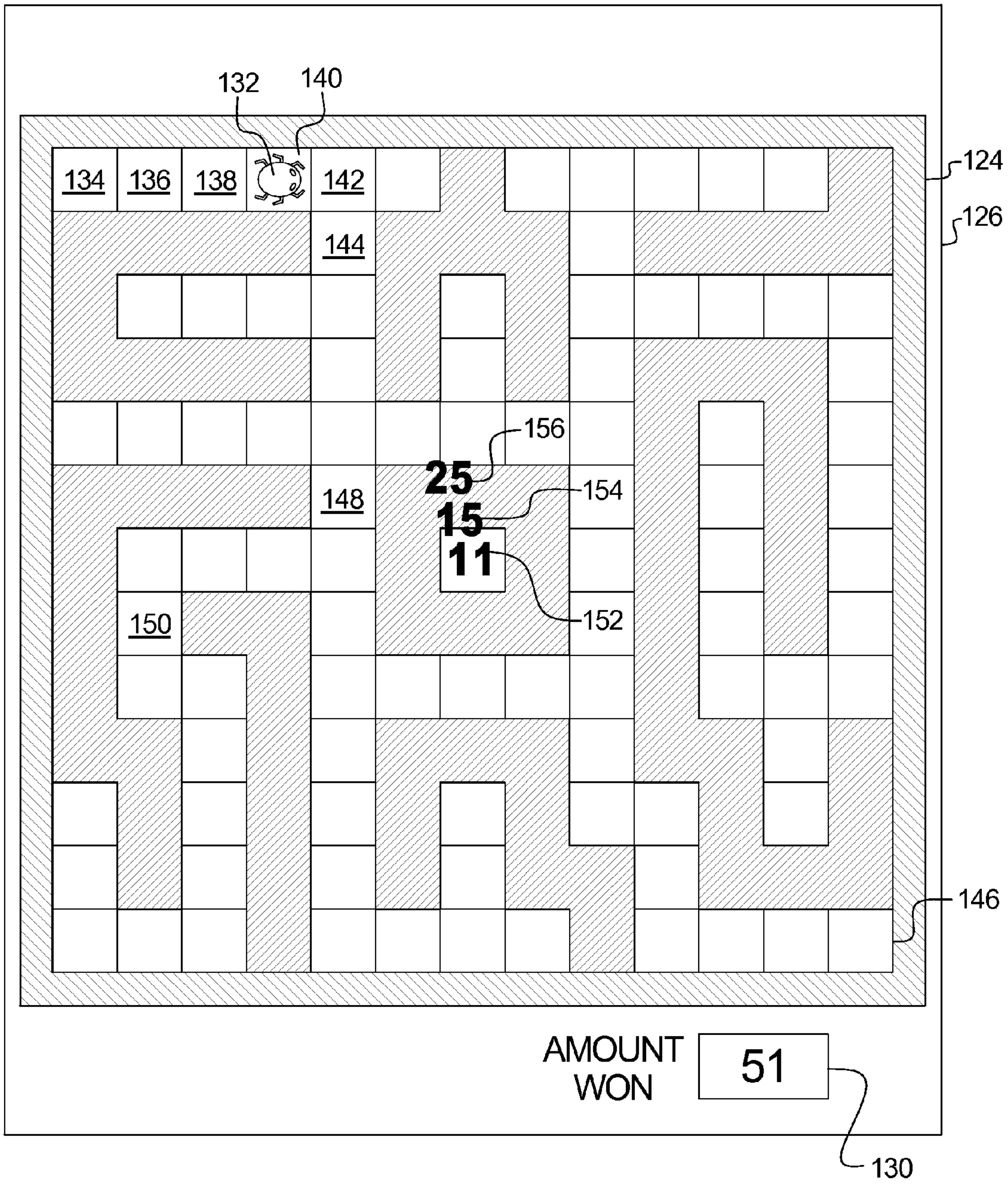

As illustrated in FIG. 7D, the player symbol 132 moves to another square 140. The gaming machine automatically wagers a wager component and determines another wagering outcome associated with a wagering award of 11. The gaming machine displays the wagering award of 11 at the first location 152, the second wagering award of 15 moves up or is displayed at the second location 154. The first wagering award of 25 moves up or is displayed at a third location 156.

Figure 7E:
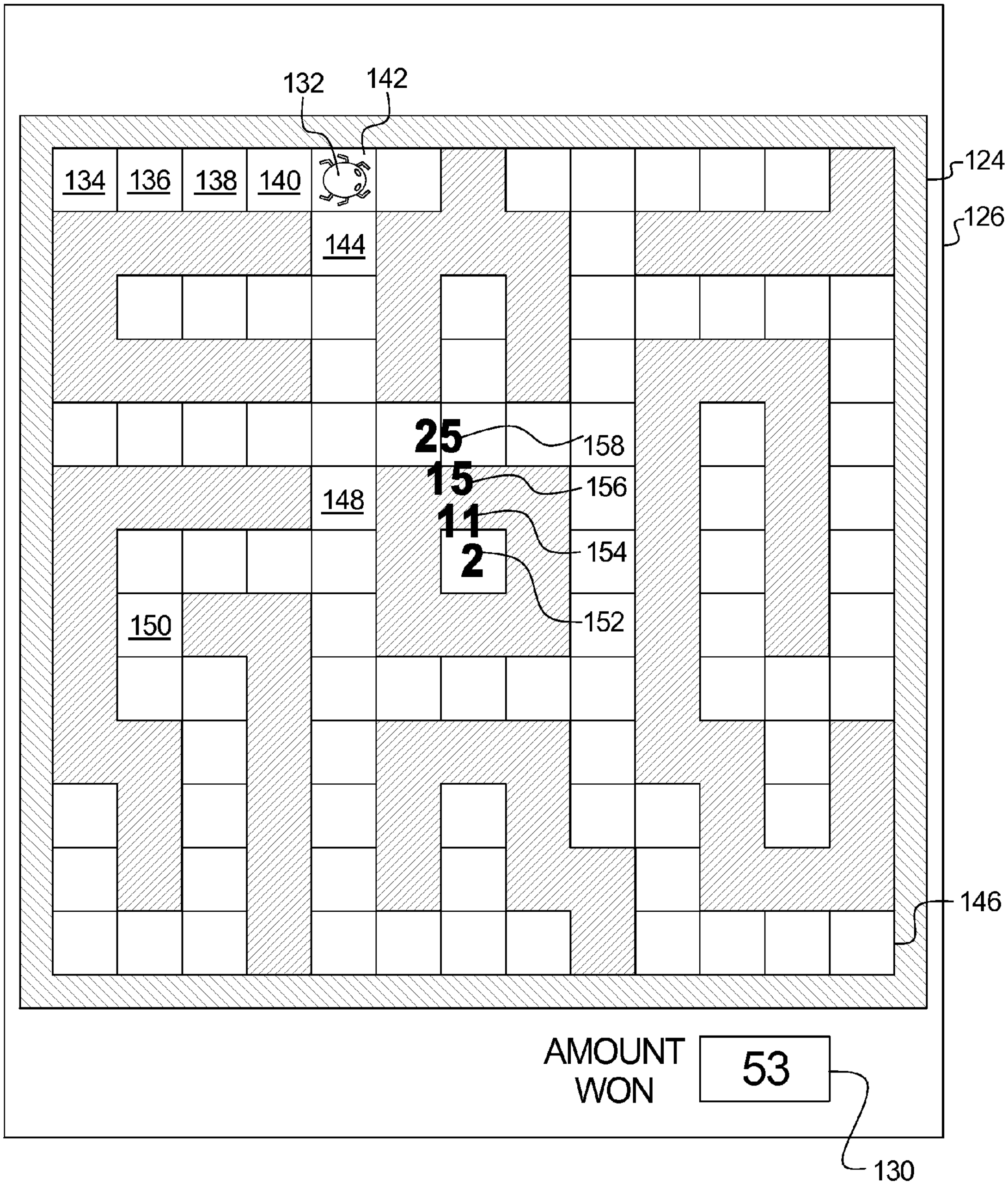

As illustrated in FIG. 7E, the player symbol 132 moves to another square 142. The gaming machine automatically wagers a wager component and determines another wagering outcome associated with a wagering award of 2. The gaming machine displays the wagering award of 2 at the first location 152. The gaming machine displays the third wagering award of 11 at the second location 154. The gaming machine displays the second wagering award of 15 at the third location 156. The gaming machine displays the first wagering award of 15 at the fourth location 158.

Figure 7F:
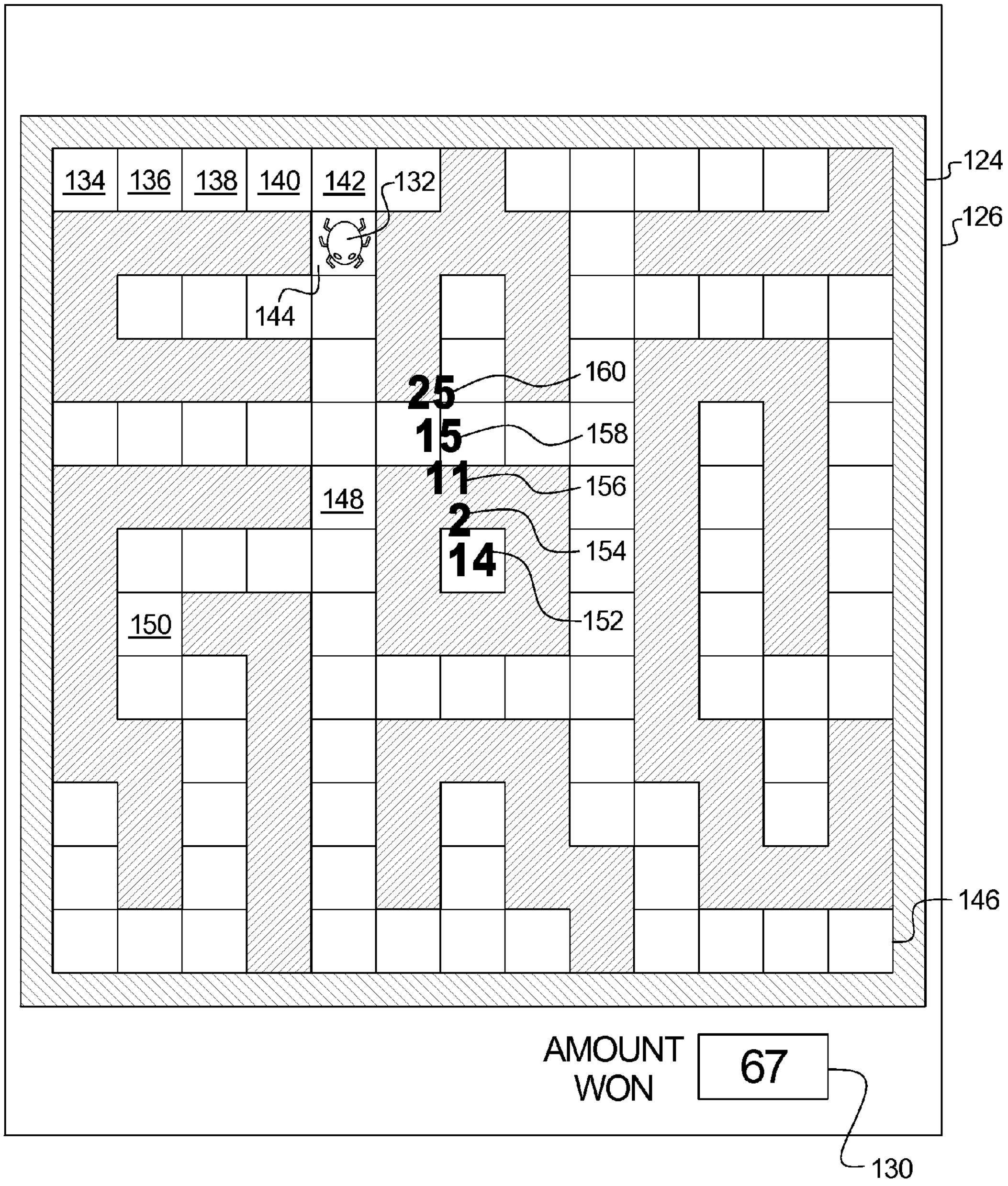

As illustrated in FIG. 7F, the player symbol 132 moves to another square 144. The gaming machine automatically wagers a wager component and determines another wagering outcome associated with a wagering award of 14. The gaming machine displays the wagering award of 14 at the first location 152. The gaming machine displays the fourth wagering award of 2 in the second location 154, the third wagering award of 11 in the third location 156 and the second wagering award of 15 wagering fourth location 158. The gaming machine displays the first wagering award of 25 in a fifth location 160.

Figure 7G:
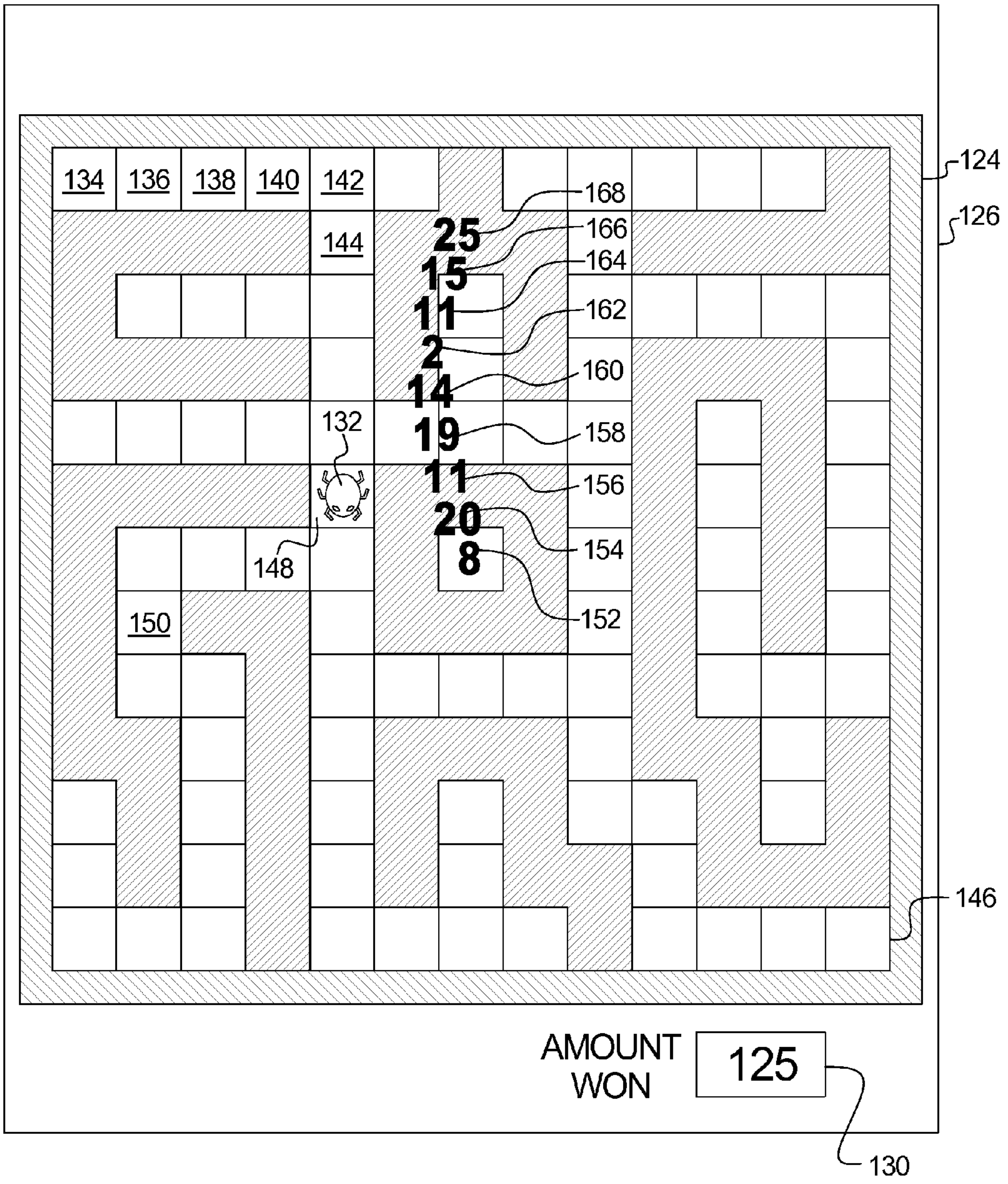

FIG. 7G illustrates a progression in the interactive game where the player symbol moves a plurality of squares to a new square 148. With each square, the gaming machine generates a wagering outcome and displays any associated wagering awards in certain locations 152 to 168. In this example, as each new wagering award is generated, the gaming machine displays the previously won wagering awards in a new location. For example, the first wagering award of 25 is displayed at new location 168. In one embodiment, each time the gaming machine generates a wagering award, the amount won display displays the sum the wagering awards won by the player to the player.

Figure 7H:
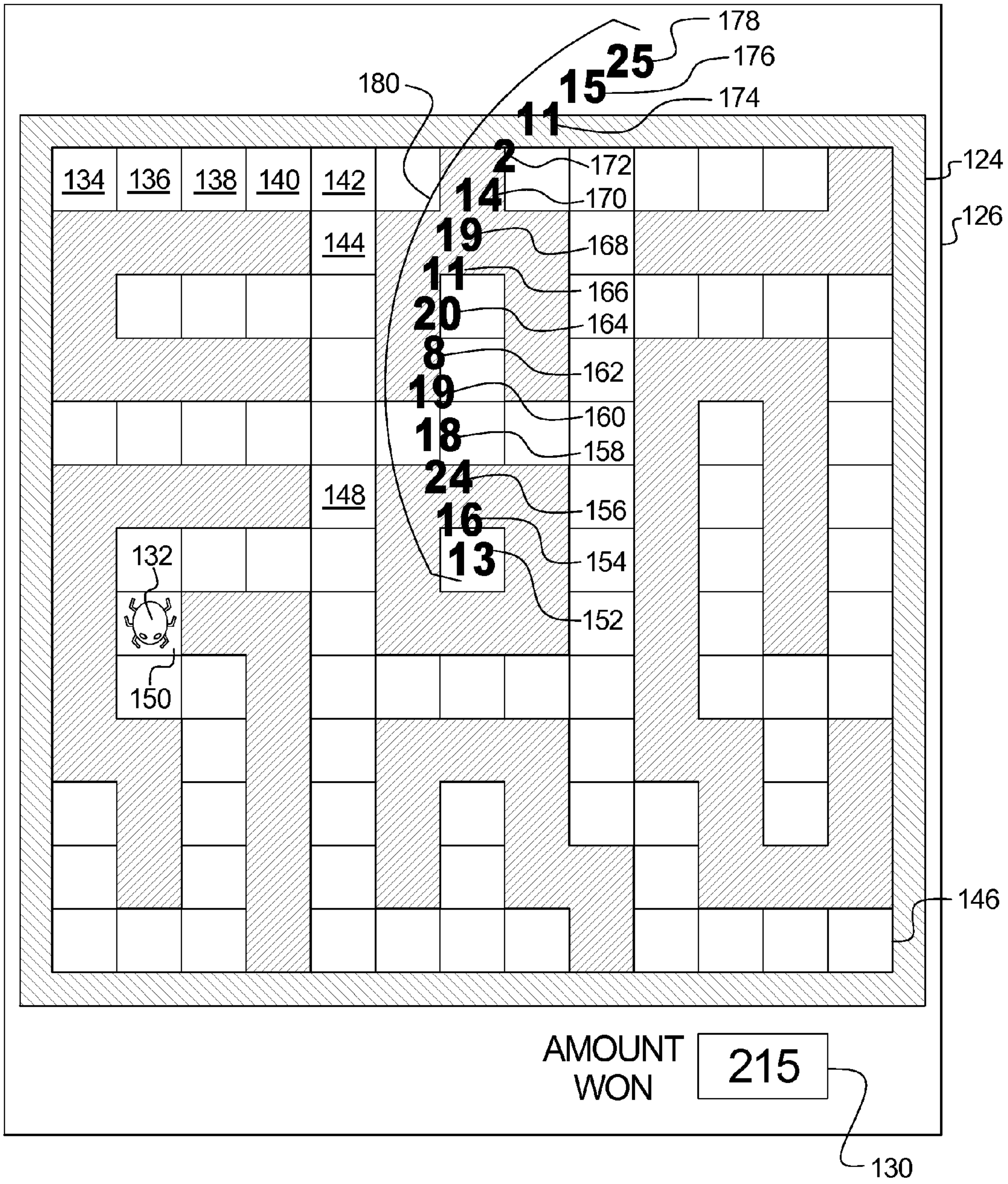

FIG. 7H illustrates a further progression in the interactive game where the player symbol moves a plurality of squares to a new square 150. With each square, the gaming machine generates a wagering outcome and displays any associated wagering awards in certain locations 152 to 178. In this example, as each new wagering award is generated, the gaming machine displays the previously won wagering awards in a new location. For example, the first wagering award of 25 is now displayed at a new location 180. In one embodiment, the gaming machine displays a stream or an arrangement 180 of the wagering awards.

Figure 8:
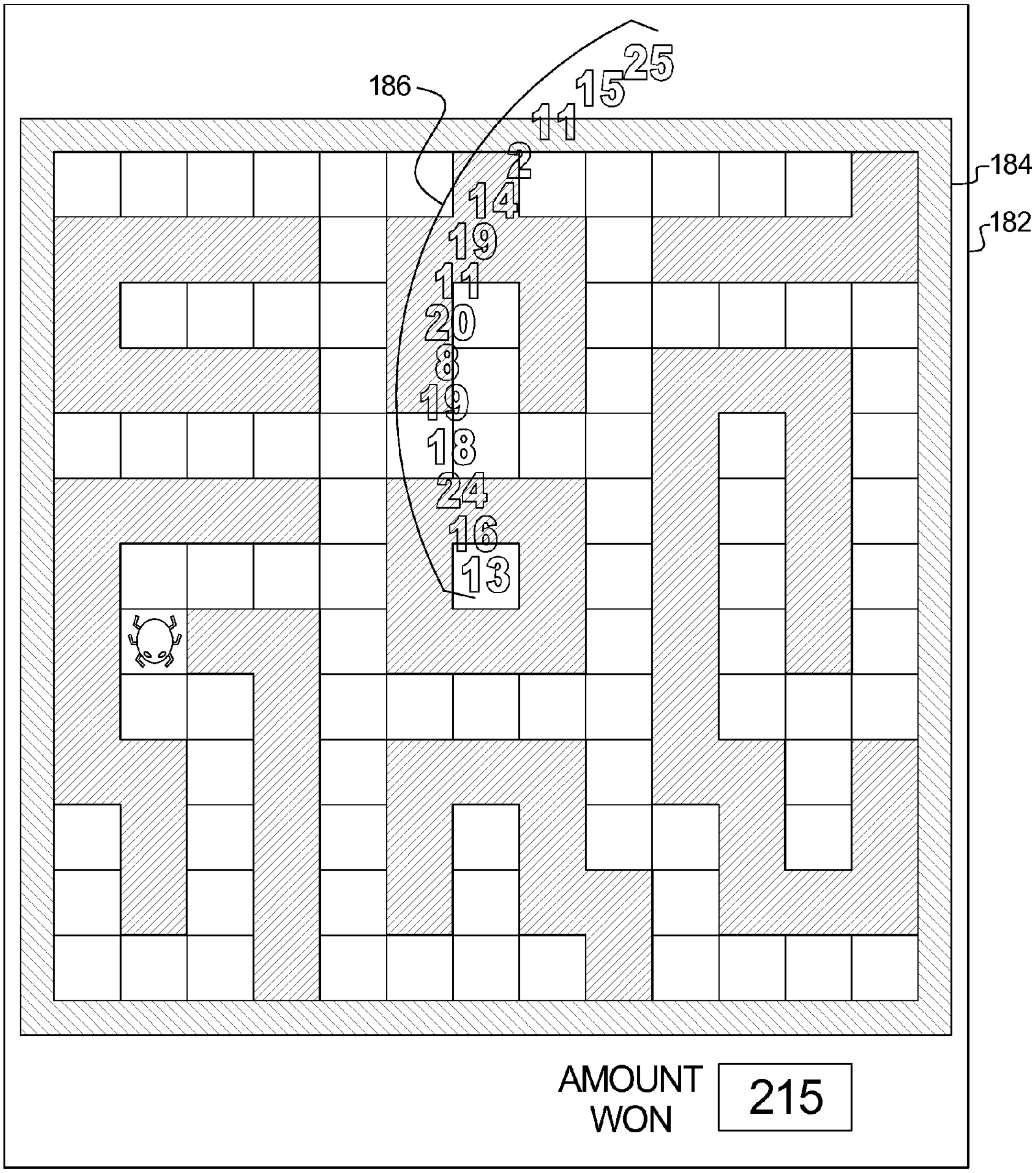
FIG. 8 is a screen shot of the gaming machine displaying the wagering awards streaming in a transparent format.

FIG. 8 illustrates one embodiment where the wagering awards 186 won by the player are displayed in a hollow or transparent format, enabling the player to view the interactive game 184 behind or through the wagering awards 186. It should be appreciated that the gaming machine may enable the player to view the interactive game behind the awards in any suitable manner. It should be appreciated that this displayed arrangement of awards may be displayed in any suitable manner.

It should be appreciated that the stream or arrangement of awards may be located in any suitable location of the display device or the interactive game. In one embodiment, the wagering awards are displayed in a stream that originates from a same location as illustrated in FIGS. 7A to 7H. As a new wagering award is displayed a plurality or each of the previously displayed wagering awards in the stream shifts to a new location. In one embodiment, the wagering awards are displayed in a single stream. In another embodiment, the gaming machine displays the wagering awards in multiple streams.

Figure 9A:
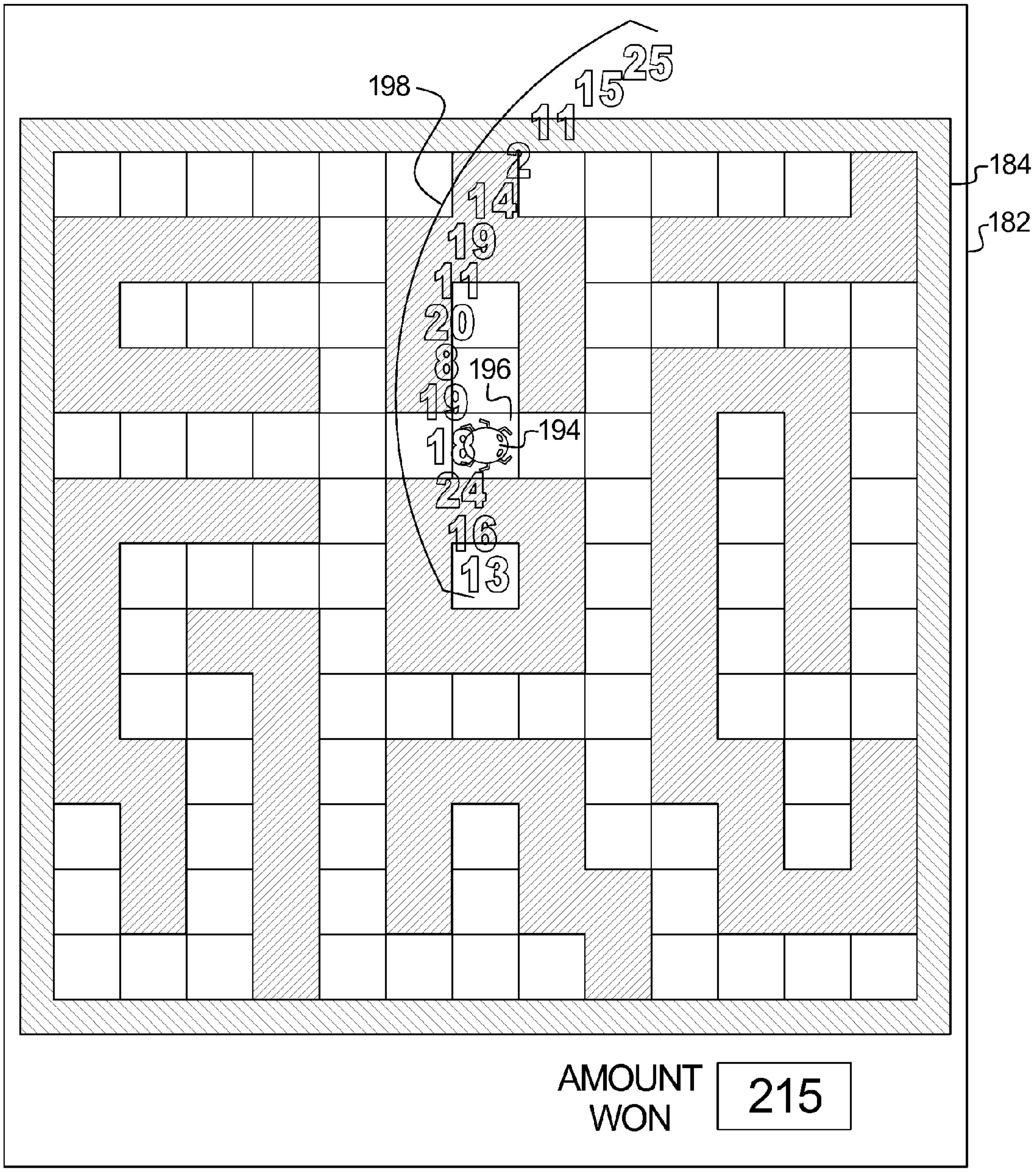
FIGS. 9A and 9B are screen shots of the gaming machine displaying the wagering awards streaming in different directions.
Figure 9B:
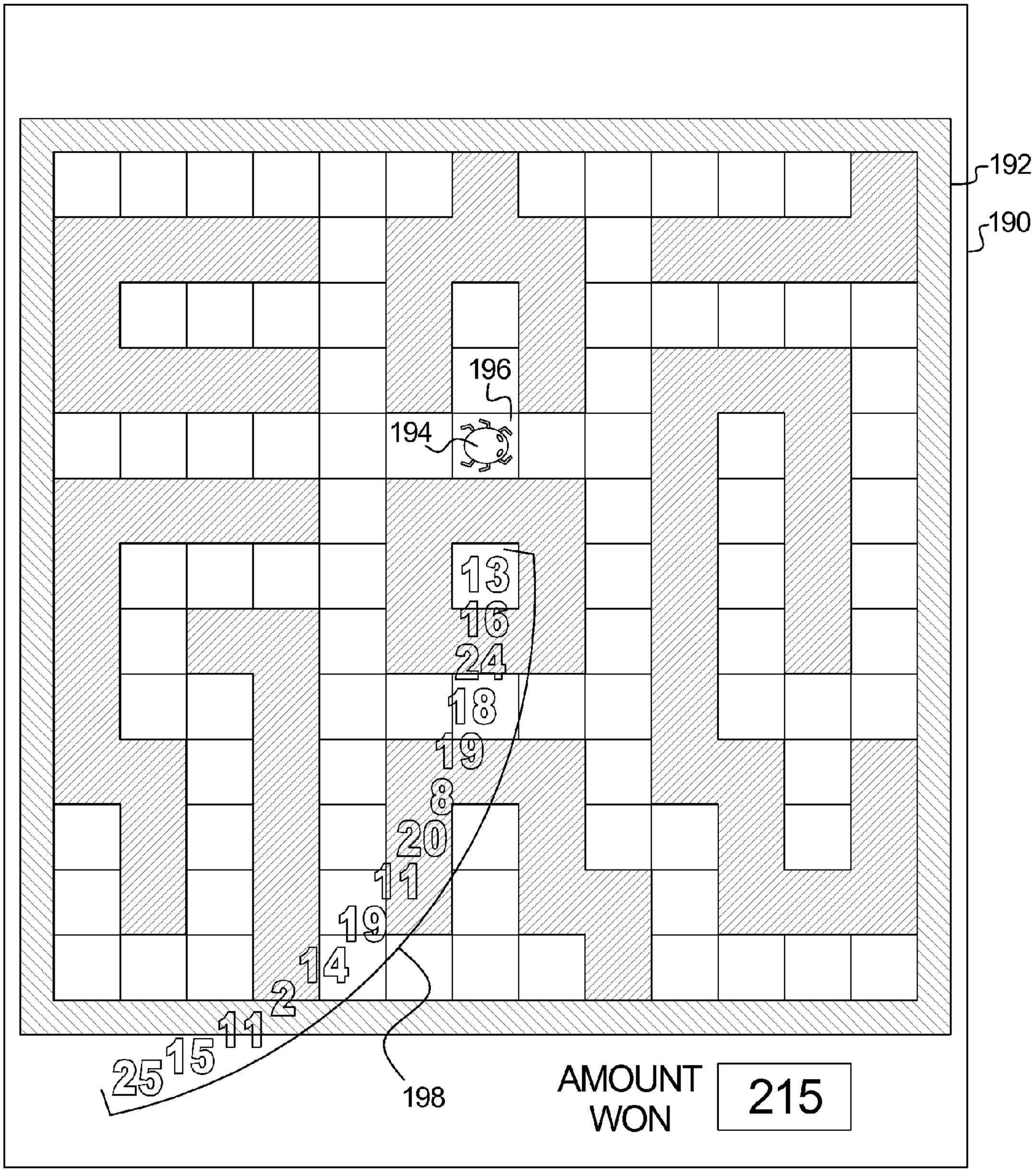

As illustrated in FIGS. 9A and 9B, in one embodiment, the gaming machine moves or shifts the steam based on one or more factors of the interactive game. For example, when the gaming machine displays a player symbol in the section of the interactive game covered or obstructed by the displayed stream of symbols, the gaming machine shifts the stream 198 of wagering awards to a new location or position such that the player may view the section of the interactive game without any obstruction from the displayed wagering awards. As illustrated in FIG. 9A, the player symbol moves 194 to a new location 196 and is partially covered by the stream 198 of wagering awards. As illustrated in FIG. 9B, the gaming machine displays the stream of wagering awards in one or more new locations such that the player symbol is visible to the player. Though in the illustrated embodiment, the gaming machine displays most of the wagering awards in a new location, it should be appreciated that the gaming machine may display any suitable number of wagering awards in a new location.

Figure 10A:
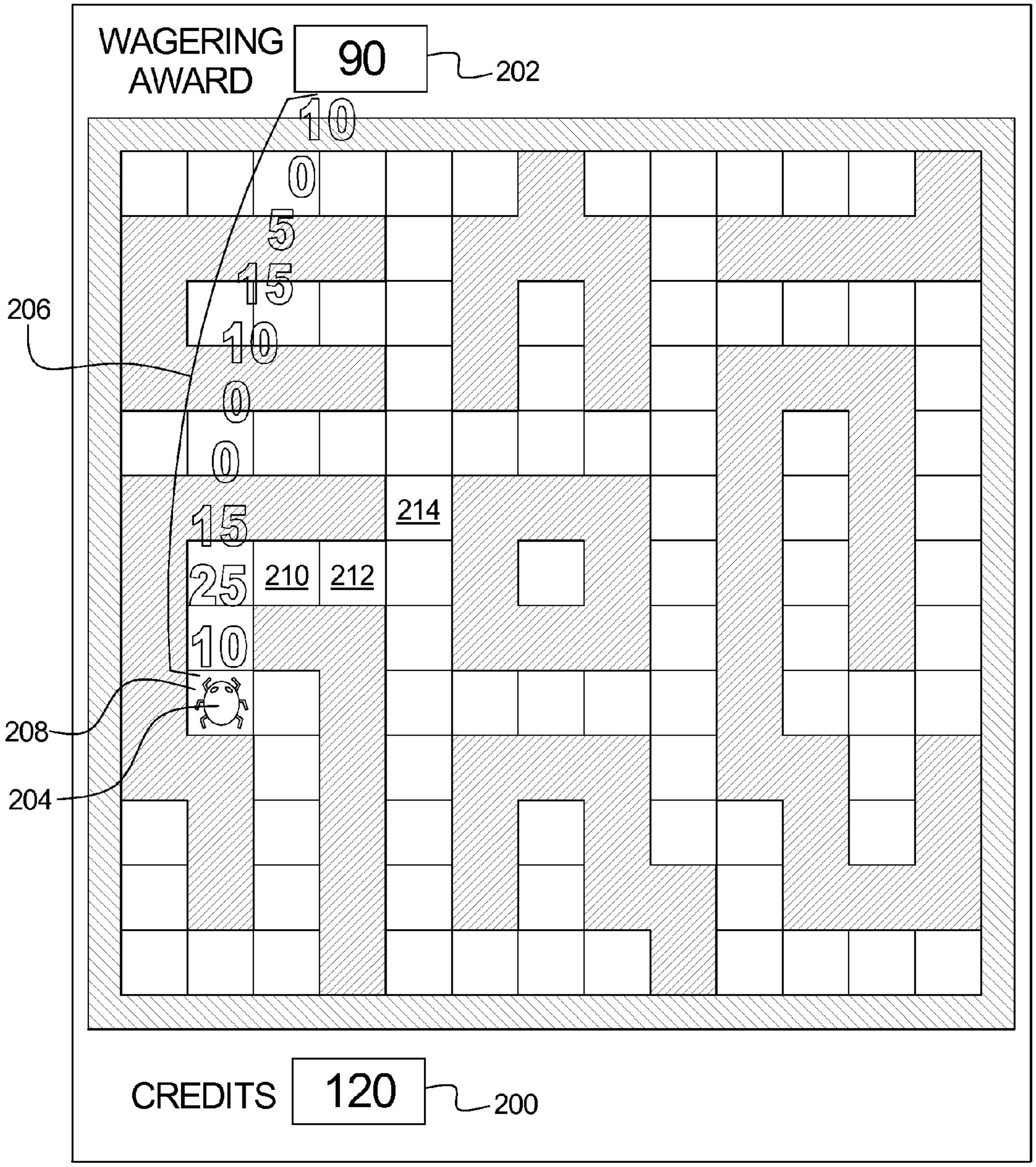
FIGS. 10A, 10B, 10C and 10D are screen shots of the gaming machine displaying the wagering awards in a stream originating from the location of the player symbol, as the player symbol is displayed in new locations, to the wagering award display.
Figure 10B:
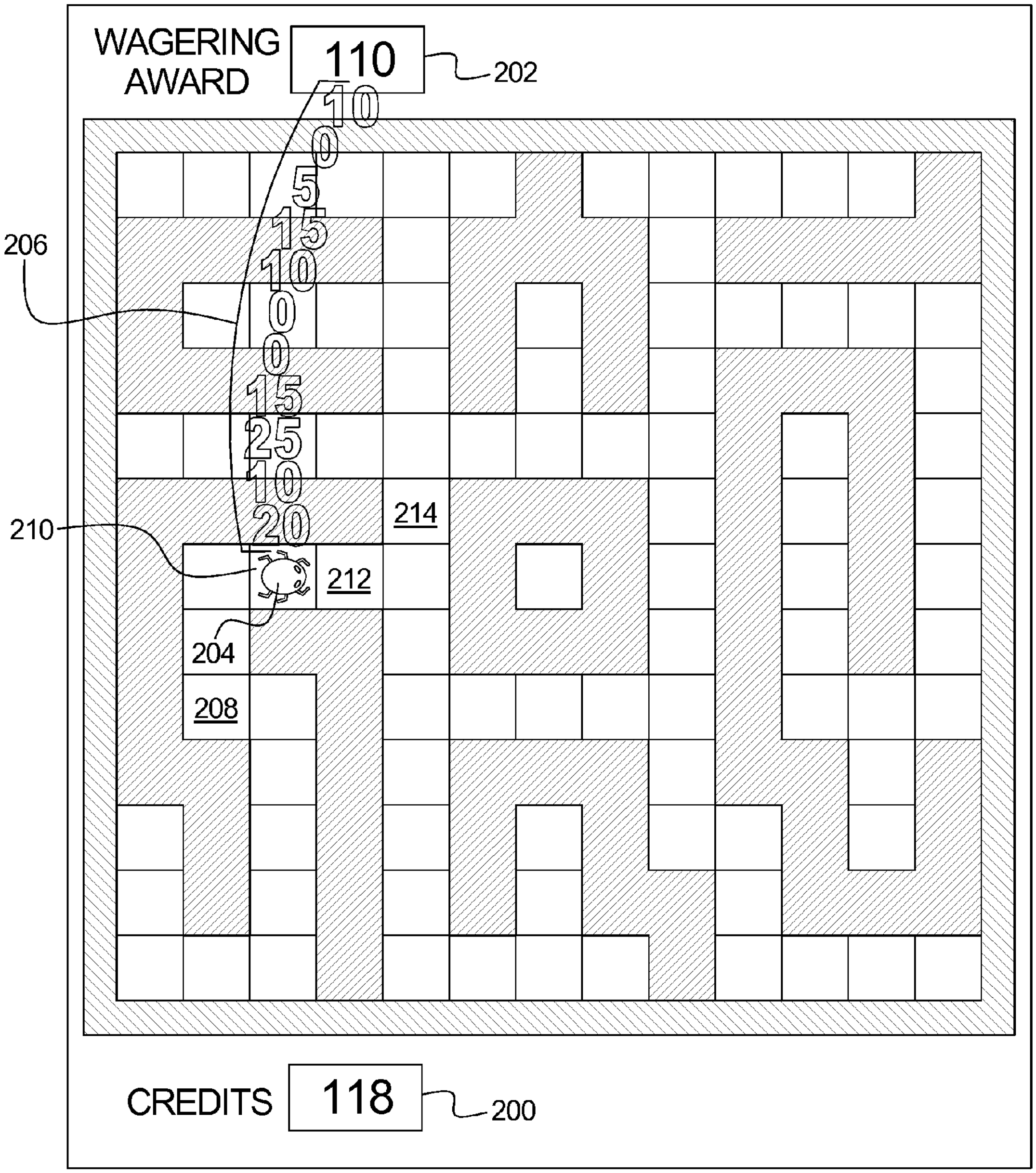
Figure 10C:
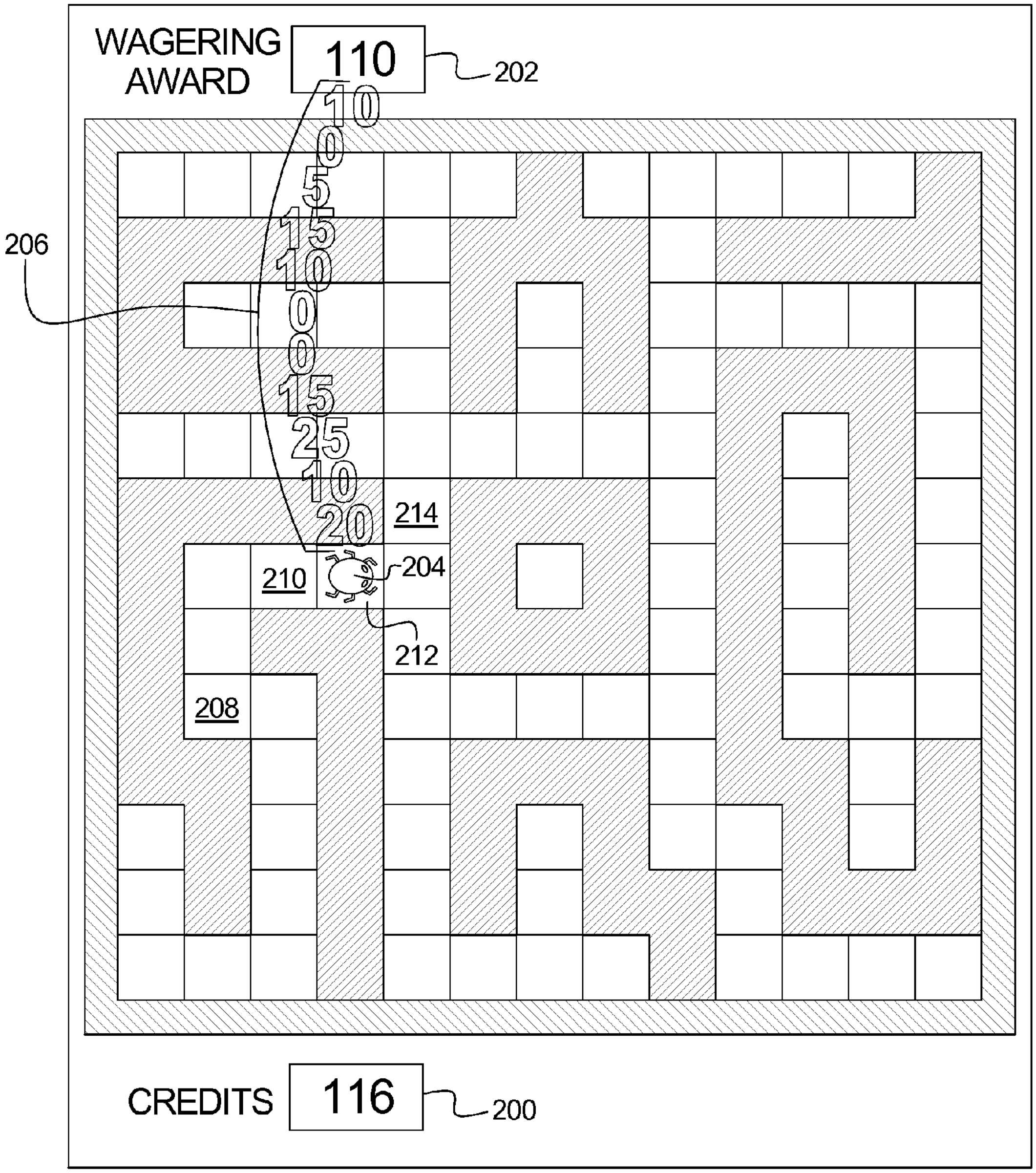

As illustrated in FIGS. 10A, 10B and 10C, in one embodiment the gaming machine displays a credit display 200 and a wagering award display 202. The gaming machine displays a player symbol 204. Upon the occurrence of a triggering event, the gaming machine automatically wagers one of a plurality of wagering components and randomly determines a wagering award. The wagering award is first displayed in a first location near where the player symbol is located when the triggering event occurred. The gaming machine displays the wagering awards in other locations upon the occurrence of another wager triggering event and the display of another wagering awards. The gaming machine displays wagering awards in a stream that shifts with the movement of the player symbol. The gaming machine displays the wagering awards in a stream towards the wagering award display.

FIGS. 10A, 10B and 10C illustrate the play of the interactive game mid-game where the gaming machine has generated a plurality of wagering awards 10, 25, 15, 0, 0, 10, 15, 5, 0 and 10. The wagering award display 202 displays the sum of the displayed wagering awards, which is 80. In one embodiment, the triggering event is the player symbol moving three squares. As illustrated in FIG. 10B, the player symbol 204 moves three squares from the first square 208 to a second square 210. After the player symbol moves the three squares, the gaming machine automatically wagers one of the wagering components, which in the illustrated example is 2 credits. The credits display 200 changes from displaying an award of 120 credits as illustrated in FIG. 10A to displaying an award of 118 credits as illustrated in FIG. 10B. The gaming machine randomly determines a wagering award of 20 and displays the wagering award of 20 in a first location near the location 210 of the player symbol 204 when the wager triggering event occurred. The gaming machine shifts the stream of wagering awards 106 to the new location of the player symbol.

As illustrated in FIG. 10C, the gaming machine displays the player symbol in another location, the next square 212. As illustrated in FIG. 10C, the gaming machine displays the stream of wagering awards 106 in a new location originating from the new location of the player symbol 212.

Figure 10D:
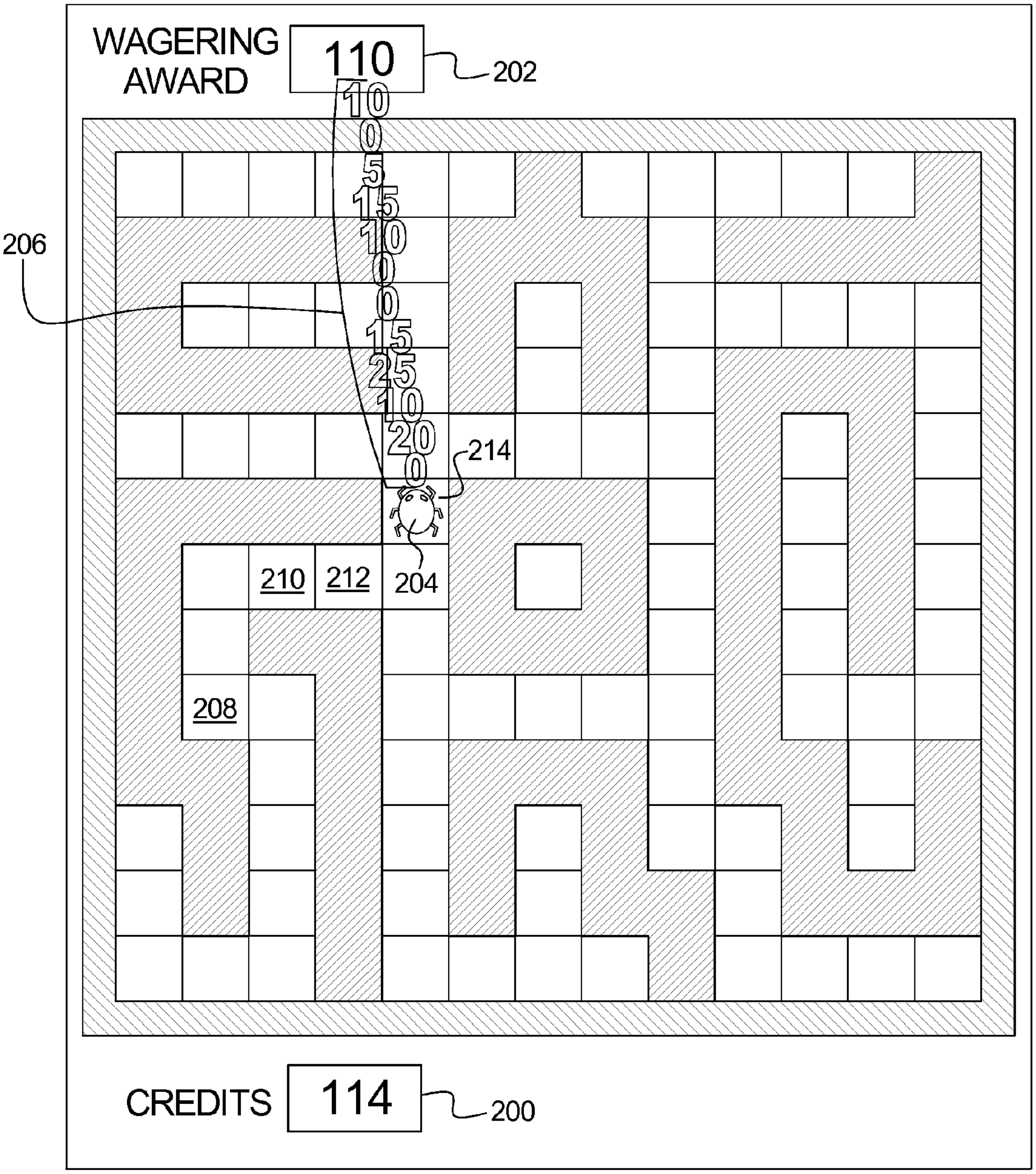

As illustrated in FIG. 10D, the player symbol moves two more squares to a new square 212 and therefore another wager triggering event occurred because the player symbol has moved a total of three squares. The gaming machine automatically wagers one of the wagering components and randomly determines a wagering award. As illustrated in FIG. 10D, the wagering award is 0 credits. The gaming machine displays an award of 0 next to the player symbol 204. The gaming machine displays the stream of the wagering awards 206 in another location that originates from the player symbol up towards the wagering award display.

In another embodiment, the gaming machine displays the wagering awards originating from the player symbol that is displayed extending towards the credits display. That is the credit display is the termination location of the stream of wagering awards. It should be appreciated that the wagering awards may originate from the location of the player symbol and be displayed toward any suitable object or in any suitable direction.

It should be appreciated that the gaming machine may display the stream or arrangement of wagering awards in a new location or position based on any suitable factor. For example, in one embodiment, the gaming machine displays the stream in a new location based on an event in the interactive game, such as upon the player winning a certain number of points. In another embodiment, the gaming machine displays the stream of wagering awards in a new location based on time intervals. In another embodiment, the gaming machine displays the stream of wagering awards in a new location based on a player input. In one embodiment, the gaming machine displays the stream of the wagering awards for a certain period of time, such as the duration of the interactive game or gaming session. In another embodiment, the gaming machine displays the stream of the wagering awards at different locations through-out an interactive game or gaming session. For example, if the stream is a circle in the upper left side of the display device and the player needs to view that area for play of the interactive game, the gaming machine displays the circle of wagering awards in the upper right side of the display device. The gaming machine changes the location of the arrangement. Likewise, the gaming machine may initially display the wagering awards in any suitable number of locations. For example, for a first interactive game level, the wagering awards are initially displayed in a single first location. For a second interactive game level, the wagering awards are initially displayed in two separate locations. For example, certain of the wagering awards are initially displayed at a first location and certain other of the wagering awards are initially displayed at a second location. In another example, one or more of the wagering awards are displayed in more than one location. Each of the wagering awards may be displayed at one or more suitable locations in any suitable numbers of arrangements or streams.

In one embodiment, the displayed arrangement of the wagering awards includes each of the wagering awards won by the player during that interactive game or that gaming session. In another embodiment, the displayed arrangement of wagering awards includes a limited number of wagering awards. For example, the displayed arrangement of wagering awards only displays the five most recently won wagering awards. In another example, the displayed arrangement of wagering awards displays the currently won wagering award and the five won wagering awards with the highest value. In one embodiment, the gaming machine displays only positive wagering awards won by the player. That is, if a wagering outcome is associated with a wagering award of zero, the gaming machine does not display that wagering award. In another embodiment, the gaming machine displays all wagering awards. For example, if the player receives a wagering outcome associated with the wagering award of zero, the gaming machine displays a wagering award of zero.

It should be appreciated that the wagering awards may be displayed in any suitable arrangement. In one embodiment, the wagering awards originate from a same location or are first displayed in a same location. In another embodiment, the wagering awards originate from different locations. For example, the wagering awards are displayed on or near a player's symbol such that as the player symbol moves around a display device, the displayed wagering awards move around the display device with the player symbol. The wagering awards may be displayed in any suitable shape including but not limited to a circle, arc, semi-circle, triangle, square, rectangle, star, line, semi-circle, triangle, hexagon, octagon, or any combination thereof.

In one embodiment, the gaming machine displays the wagering awards in a plurality of arrangements or streams. For example, the gaming displays the first 10 wagering awards in a first arrangement and the second 5 wagering awards in a second arrangement. It should be appreciated that the type of the arrangements or streams or the numbers of arrangements or streams may be based on any suitable criteria such as an interactive game event, an amount wagered, an amount of one or more wagering awards, an input from the player, a random selection, an interactive game level or outcome or any other suitable criteria.

The wagering awards may be displayed in any suitable font or color. In one embodiment, the gaming machine displays one or more of the wagering awards in a different color. In one embodiment, some of the wagering awards are less visible than some of the other wagering awards. In another embodiment, some of the wagering awards are displayed at different sizes.

It should be appreciated that the gaming system may determine one or more awards based on the interactive game outcomes in any suitable manner. In one embodiment, if the player achieves a designated interactive game outcome, the gaming system provides the player an award immediately. In another embodiment, if the player plays a certain number of games, the gaming system provides the player an award. In another embodiment, the gaming system provides the player an award based on the interactive game outcomes of other players. For example, at the end of a week, the top ranked player of each individual gaming machine wins a prize. In one embodiment, the gaming system includes a triggering event or an interactive game outcome triggering event. In one embodiment, the triggering event is a random determination by the gaming system. In another embodiment, the triggering event is predetermined or based on a suitable factor. The triggering event may include but is not limited to: (i) a designated time period; (ii) an amount wagered on the gaming system; (iii) a number of gaming machines simultaneously being played; (iv) one or more player's scores or interactive game outcomes; or (v) a combination of any number of suitable events.

It should be appreciated that the gaming system may provide the players an award based on the interactive game outcomes in any suitable manner. In one embodiment, the player has to be a member of a player tracking system to win the award. Therefore, if the player is not playing at one of the gaming machines, the gaming system may identify the player and notify the player in any suitable manner. In another embodiment, the gaming system places the award directly into a player account. In another embodiment, if the player makes it to the leaderboard, the player must leave identifying information to receive an award. In another embodiment, a player must be in the gaming establishment to win an award. In another embodiment, the interactive game award is sent to the player or alternatively redeemed by a player when the player returns to the gaming establishment.

It should be appreciated that the common display or the leaderboard may be any suitable type of display apparatus. In one embodiment, the common display is adjacent to the gaming machines. In another embodiment, the gaming machines are not adjacent and the common display is located away from at least one gaming machine. In another embodiment, the common display displays other information in addition to player standings. In one embodiment, the common display is part of a messaging system of the gaming establishment and only displays the player ranks for a short period of time.

The common display device may display any suitable information. In one embodiment, the player's are ranked according to their performance in the interactive game. Upon an occurrence of a triggering event or an interactive game outcome triggering event, the gaming machine or system provides one or more players with their names displayed on the common display device an award. For example, at the end of each week, each player whose name is displayed on the common display device receives a prize. In one such embodiment, when the gaming system awards players based on ranking, the gaming system resets the ranking. For example, after the gaming system awards one or more players with names displayed on the leaderboard, the gaming system resets the leaderboard to not display any names.

It should be appreciated that the gaming system may include any suitable number of gaming machines. In one embodiment, the gaming machines are located at different gaming establishments.

The interactive game can be any suitable interactive skill game, interactive partial skill game or interactive pseudo skill game. In one embodiment, the interactive game may include any suitable type and any suitable number of skill events, such as hand-eye coordination events or dexterity events. For example, the interactive game is any suitable type of racing or competitive game, a sports-based game or a shooting game. In another embodiment, the interactive game involves mental skill, knowledge, logical deduction, strategy or any suitable combination thereof. For example, the interactive game may be a trivia game or a memory game.

In one embodiment, the interactive game is an arcade game. In one embodiment, the gaming device includes an arcade game which is physically similar in appearance and function to a conventional arcade game or arcade machine. For example, the interactive game may be a boxing game and the wager triggering event is the player placing a punch. In another embodiment, the interactive game is a maze game where the player moves an animated symbol to try to accumulate stationary symbols while navigating around a maze without encountering other enemy animated symbols. The wager triggering event may be accumulating one or more stationary symbols. In one such embodiment, the goal of the interactive game is to accumulate as many stationary symbols as possible.

The gaming device may include additional inputs of a conventional slot or other wagering gaming machine such as player bet or wager inputs, player tracking card input(s), monetary acceptors, and cash out buttons. In one embodiment, the gaming device includes additional outputs such as ticket or money dispensers and one or more additional displays for any bonus game. In one embodiment, each gaming device includes an extra input device for the interactive game. It should be appreciated that the gaming devices may or additionally include any suitable type of input device, including but not limited to: joysticks, keyboards, buttons, wheels, guns and rollerballs. In one embodiment, the display that displays the interactive arcade-type game may be used to display one or more bonus games. It should be appreciated that these gaming devices which include arcade-type interactive games may be placed in any suitable location in a casino or a gaming establishment. In one embodiment, these arcade-type interactive gaming machines are located in separate or designated gaming rooms.

In one embodiment, the gaming machine and system include more than one interactive game. In one such embodiment, a player may choose which interactive game to play. In a multi-interactive game embodiment, all the players may be ranked against each other for the interactive game based on any suitable means, such as total points in a game. For example, the interactive games include a driving game, a shooting game and a boxing game. In one embodiment, the gaming system scores the interactive games such that it would be fair to rank players against each other based on their performance for different types of games. In another embodiment, there are different and separate rankings for each type of game played. For example, the interactive games include a driving game, a shooting game and a boxing game. In one embodiment, the gaming system ranks the players of a driving game in a first ranking, the players of the shooting game in a separate second ranking and the players of the boxing game in a separate third ranking. The gaming system may reward the players of the separate rankings in any suitable manner. For example, in one embodiment, upon the occurrence of a triggering event, the gaming system rewards one or more players in each ranking. In another embodiment, the gaming system selects a ranking and provides one or more players on that ranking awards or prizes.

The interactive game may terminate in any suitable manner. In one embodiment, the interactive game terminates based on performance or input of the player. For example, if the player does not reach a certain goal, such as place all of the pieces of a puzzle in the designated spots in a certain amount of time, the interactive game ends. In this embodiment, a player who has a higher skill level will receive more wager triggering events and thus have the possibility of winning greater awards. In another embodiment, the player is allowed to play the interactive game as long as the player is funding the wager components. Therefore, the player has a chance of receiving a better interactive game outcome the longer the player continues to play the interactive game. In one such embodiment, when the player runs out of credits, instead of terminating the interactive game, the gaming machine enables the player to insert more credits to continue play of the interactive game. For example, upon running out of credits, the gaming machine provides the player a countdown of time to insert more credits to continue play of the interactive game.

It should be appreciated that the wager components or microwagers may be determined in any suitable manner. In one embodiment, the wager component amounts are predetermined and the player funds the gaming machine with a certain amount of credits to play the interactive game. In another embodiment, the gaming system enables the player to select the wager component denomination. For example, the gaming enables the player to select among ½ of a cent, ¼ of a cent, $0.01, $0.05, $0.10, $0.25, $0.75 and $1 as the wager components. In one such embodiment, the same amount of credits are wagered for every player for each occurrence of a wager triggering event. In another embodiment, the gaming system enables the player to select the number of credits to wager per wager triggering event. For example, the gaming system enables the player to first select the denomination of the credit and then select to wager 1, 3 or 5 credits for the wager component. In another embodiment, the denomination of the wager component remains the same but the gaming system enables the player to select the number of credits to wager. For example, the wager denomination is $0.25, but the player may select to wager 1, 3 or 5 credits for the wager component. It should be appreciated that the wagering credits may range in suitable value. In one embodiment, the wager component amount is very small but the wager triggering events occur frequently.

In one embodiment, the wager components are different amounts. For example, the player or the gaming system may determine that the wager component for the first five wagering events is a first amount and the wager component for the second five wagering events is a second amount. The wagering outcomes then reflect the different wagering amounts.

In another embodiment, the wager component includes a threshold amount, such as a maximum bet for the wager component. In one embodiment, the wagering of the threshold amount qualifies the player to play a bonus game or to win a progressive award.

It should be appreciated that the wager triggering event may be any suitable event. In one embodiment, the wager triggering event is based on the skill of the player. For example, the wager triggering event is the player achieving a certain number of points in the interactive game. In another example, the wager triggering event is an event that occurs in the interactive game. For example, the wager triggering event is a symbol appearing in a game. In another embodiment, the wager triggering event is an event in the interactive game caused by the skill of the player. For example, the wager triggering event is successfully completing a task, such as hitting a golf ball a certain distance.

In other embodiments, the wager triggering event is independent of the any events occurring in the interactive game. For example, the wager triggering event is a passage of time or a random determination.

In another embodiment, the gaming system enables the player to choose the wager triggering event. In one such embodiment, the gaming system provides the player choices of wager triggering events. In one such embodiment, the gaming system enables the player to choose events that occur less frequently or more frequently, therefore enabling the player to further customize the betting and gaming experience.

In one embodiment, the gaming machine includes a plurality of different wager triggering events. In one such embodiment, the different wager triggering events cause different wager events to occur. For example, a first wager triggering event can cause the placement of a first amount of a first wager component and a second wager triggering event can cause the placement of a second amount of a second wager component. In one embodiment, at least one of the wager triggering events is based on a skill event in the game and at least one of the wager triggering components is based on a non-skill event or random event. It should be appreciated that the gaming machine may include any suitable number of wager triggering events. It should also be appreciated that the wager triggering events may affect any suitable aspect of the interactive game and/or the wagering event in any suitable manner.

In one embodiment, a wager triggering event is the end of an interactive game. In one such embodiment, even if the player does not have enough funding to cover a wager component, the gaming machine may enable the player to wager whatever the player has left in the player's fund. For example, the minimum wager component amount is 10 cents and the player has 7 cents left in the player's fund. In one embodiment, the interactive game is therefore over. In another embodiment, the gaming machine game enables to the player to wager the player's 7 cents in an "all-or-nothing" last-chance wager. In this type of wager, the game may give the player a 7% (7 percent) chance of winning one dollar. If the player is lucky, he can turn his 7 cents into one dollar, which would then allow him to play some more. However, with such a low chance of success, the player may lose the last 7 cents and the interactive game ends or the gaming machine enables the player to further fund the interactive game.

The wagering outcomes may be any suitable outcomes. In one embodiment, the wagering outcomes are winning and losing outcomes that are associated with awards. For example, if the player receives a losing wagering outcome, the player may receive 0 credits. If the player receives a winning wagering outcome, the player may receive five credits. In another embodiment, the wagering outcomes are associated with awards of prizes such as plane tickets or a free hotel room. In another embodiment, the wagering outcomes are associated with awards of free games, multipliers, bonus games or free wager triggering events.

It should be appreciated that the wagering outcomes and any associated awards may be determined in any suitable manner. For example, the wagering outcomes and any associated awards may be determined based on any of the methods described herein with regard to the bonus games. In one embodiment, the wagering outcomes and any associated awards are determined via a paytable. In another embodiment, the wagering outcomes and any associated awards are determined by a central pool. In another embodiment, the wagering outcomes and any associated awards are based on the amount of the wager component. In one embodiment, the method of the determination of the wagering outcomes and any associated awards is based on the wager triggering event. For example, in one embodiment, the wagering outcome and any associated award for a first wager triggering event is determined by a paytable. For example, in one embodiment, the wagering outcome and any associated award for a first wager triggering event is determined by a bingo game.

It should also be appreciated that part or all of the random determination of the wagering outcome and/or any associated wagering awards can be displayed in any suitable manner.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of providing an interactive wagering game, said method comprising:

(a) causing at least one display device to display a play of an interactive game;

(b) enabling a player to make at least one input in the play of interactive game;

(c) causing at least one processor to determine any occurrence of at least one wager triggering event during the play of the interactive game, wherein the at least one wager triggering event can occur multiple times during the play of the interactive game;

(d) for each determined occurrence of the at least one wager triggering event during the play of the interactive game:

(i) causing the at least one processor to automatically cause a wager of one of a plurality of wager components funded by the player;

(ii) causing the at least one processor to randomly determine a wagering outcome for said wager component independently of the interactive game; and (iii) causing the at least one processor to determine if said wagering outcome is associated with a wagering award from a plurality of wagering awards;

(e) if the at least one processor determines that any of said wagering outcomes are associated with one of said wagering awards, causing the at least one display device to display said wagering award in a first location and then causing the at least one display device to display said wagering award in a second location; and (f) causing the at least one display device to display an interactive game outcome for the play of the interactive game.

2. The method of claim 1, wherein the at least one wager triggering event is selected from the group consisting of: a point accumulation, a length of time, a stage in the interactive game, a random determination and an interactive game event.

3. The method of claim 1, wherein the interactive game is selected from the group consisting of: a skill game, a partial skill game or a pseudo skill game.

4. The method of claim 1, which includes causing the at least one processor to randomly determine any wagering outcomes.

5. The method of claim 1, which includes causing the at least one display device to simultaneously display a plurality of wagering awards.

6. The method of claim 1, which includes causing the at least one display device to display a plurality of wagering awards in an arrangement.

7. The method of claim 1, which includes causing the at least one display device to display a plurality of wagering awards in a stream originating from said first location.

8. The method of claim 7, which includes causing the at least one display device to display the stream in a new position originating from said first location.

9. The method of claim 1, which includes causing the at least one display device to display a plurality of wagering awards over a portion of the display of the interactive game.

10. The method of claim 1, which includes causing the at least one display device to display a plurality of streams of wagering awards.

11. The method of claim 1, which includes causing the at least one display device to individually initially display a plurality of wagering awards in said first location.

12. The method of claim 1, wherein the at least one display device is located remote from the at least one processor.

13. The method of claim 1, which is provided through a data network.

14. The method of claim 13, wherein the data network is the internet.

15. A method of providing an interactive wagering game, said method comprising:

(a) initiating and causing a play of an interactive game, wherein the play of the interactive game can include multiple occurrences of one or more of a plurality of wager triggering events and includes causing at least one display device to display a player symbol;

(b) causing at least one processor to determine any occurrence of the wager triggering events during the play of the interactive game;

(c) for each determined occurrence of the wager triggering events during the play of the interactive game:

(i) causing the at least one processor to automatically wager one of a plurality of wager components funded by a player;

(ii) causing the at least one processor to determine a wagering outcome for said wager component; and (iii) causing the at least one processor to determine if said wagering outcome is associated with a wagering award from a plurality of wagering awards;

(d) if the at least one processor determines that any of said wagering outcomes are associated with one of said wagering awards, causing the at least one display device to display said wagering award in a first location and then causing the at least one display device to display said wagering award in a second location, wherein said locations are located between a location of the displayed player symbol and the award display; and (e) causing the at least one display device to display an interactive game outcome for the play of the interactive game.

16. The method of claim 15, wherein the at least one wager triggering event is selected from the group consisting of: a point accumulation, a length of time, a stage in the interactive game, a random determination and an interactive game event.

17. The method of claim 15, wherein the interactive game is selected from the group consisting of: a skill game, a partial skill game or a pseudo skill game.

18. The method of claim 15, which includes causing the at least one processor to randomly determine any wagering outcomes.

19. The method of claim 15, which includes causing the at least one display device to simultaneously display a maximum number of wagering awards.

20. The method of claim 15, which includes causing the at least one display device to simultaneously display a plurality of the wagering awards in an order that the wagering awards were determined.

21. The method of claim 15, wherein the first location is a location near the location of the player symbol.

22. The method of claim 15, which includes causing the at least one display device to display the player symbol in a plurality of different locations.

23. The method of claim 22, which includes causing the at least one display device to display a plurality of determined wagering awards in a stream originating from an origination location near the location of said player symbol and terminating at a termination location near the award display.

24. The method of claim 23, which includes causing the at least one display device to display the stream originating from a plurality of different origination locations as the player symbol is displayed in different locations.

25. The method of claim 15, which includes causing the at least one display device to display a plurality of wagering awards over a portion of a display of the interactive game.

26. The method of claim 15, wherein the at least one display device is located remote from the at least one processor.

27. The method of claim 15, which is provided through a data network.

28. The method of claim 27, wherein the data network is the internet.

* * * * *

UNITED STATES PATENT AND TRADEMARK OFFICE

CERTIFICATE OF CORRECTION

PATENT NO. : 8,430,735 B2
APPLICATION NO. : 13/093382
DATED : April 30, 2013
INVENTOR(S) : Michael Oberberger It is certified that error appears in the above-identified patent and that said Letters Patent is hereby corrected as shown below:

IN THE CLAIMS

In Claim 1, Column 37, Line 25, between “of” and “interactive” insert --the--.
In Claim 5, Column 37, Line 64, between “of” and “wagering” insert --the--.
In Claim 6, Column 37, Line 66, between “of” and “wagering” insert --the--.
In Claim 7, Column 38, Line 2, between “of” and “wagering” insert --the--.
In Claim 9, Column 38, Line 8, between “of” and “wagering” insert --the--.
In Claim 9, Column 38, Line 9, between the second instance of “the” and “interactive” insert --play of the--.
In Claim 11, Column 38, Line 16, between “of” and “wagering” insert --the--.
In Claim 14, Column 38, Line 22, replace “the” with --an--.
In Claim 15, Column 38, Line 51, replace “the” with --an--.
In Claim 16, Column 38, Line 55, delete the second instance of “the”.
In Claim 25, Column 39, Line 20, between “of” and “wagering” insert --the--.
In Claim 28, Column 39, Line 28, replace “the” with --an--.

Signed and Sealed this
Eleventh Day of March, 2014

Michelle K. Lee
*Deputy Director of the United States Patent and Trademark Office*